United States Patent
Ignatovich et al.

(12) 
(10) Patent No.: US 10,109,010 B2
(45) Date of Patent: Oct. 23, 2018

(54) SYSTEM AND METHOD FOR MODELING AND VERIFYING FINANCIAL TRADING PLATFORMS

(71) Applicant: Aesthetic Integration Limited, London (GB)

(72) Inventors: Denis Ignatovich, London (GB); Grant O. Passmore, London (GB)

(73) Assignee: AESTHETIC INTEGRATION LTD., London (GB)

( * ) Notice: Subject to any disclaimer, the term of this patent is extended or adjusted under 35 U.S.C. 154(b) by 0 days.

(21) Appl. No.: 14/854,922

(22) Filed: Sep. 15, 2015

(65) Prior Publication Data

US 2016/0078539 A1    Mar. 17, 2016

Related U.S. Application Data

(60) Provisional application No. 62/050,544, filed on Sep. 15, 2014, provisional application No. 62/052,125, filed on Sep. 18, 2014.

(51) Int. Cl.

| | |
|---|---|
| *G06Q 40/04* | (2012.01) |
| *G06Q 40/06* | (2012.01) |
| *G06F 11/263* | (2006.01) |
| *G06F 11/36* | (2006.01) |
| *G06F 17/50* | (2006.01) |
| *G06Q 10/06* | (2012.01) |

(52) U.S. Cl.
CPC .......... *G06Q 40/04* (2013.01); *G06F 11/263* (2013.01); *G06F 11/3672* (2013.01); *G06F 17/5009* (2013.01); *G06Q 10/0639* (2013.01); *G06Q 40/06* (2013.01)

(58) Field of Classification Search
CPC .............................. G06Q 40/04; G06Q 40/06
USPC ............................................................ 705/37
See application file for complete search history.

(56) References Cited

U.S. PATENT DOCUMENTS

| | | | |
|---|---|---|---|
| 6,343,376 B1* | 1/2002 | Saxe .................... | G06F 11/3608 706/14 |
| 2008/0243572 A1 | 10/2008 | Amos et al. | |
| 2010/0088661 A1* | 4/2010 | Langworthy ............. | G06F 8/10 717/100 |
| 2011/0047060 A1* | 2/2011 | Borden .................. | G06Q 40/04 705/37 |

OTHER PUBLICATIONS

International Search Report and Written Opinion for PCT/IB2015/001870, dated Jan. 20, 2016 (12 pages).

(Continued)

*Primary Examiner* — Robert R Niquette
*Assistant Examiner* — Liz P Nguyen
(74) *Attorney, Agent, or Firm* — K&L Gates LLP

(57) ABSTRACT

A computer-implemented method assesses operation of a financial computing system (FCS). An assessment computer system generates code for a model of the FCS that comprises a model specification for the FCS and a model environment for the FCS. The code for the model uses a type-system based logical programming language that supports typed recursive functions. The assessment computer system generates mathematical axioms that describe the operation of the FCS by compiling the code for the model and assesses the operation of the financial computer system by analyzing the mathematical axioms.

30 Claims, 31 Drawing Sheets

(56) References Cited

OTHER PUBLICATIONS

Minsky, Yaron: "Talk at CMU describing the experiences that Jane Street has had using OCaml as its primary development language," Dec. 31, 2011, 1 page, retrived from the Internet: URL: https://vimeo.com/14317442 [retrieved on Jan. 8, 2015].

Xavier, Leroy et al., "The OCaml System Release 3.12 Documentation and User's Manual," retrieved from the Internet: URL:http://caml_inria_fr/distrib/ocaml-3_1, retrieved on Jan. 7, 2016.

* cited by examiner

FIG. 9

```
Order Book Type                                          > Expand
                                                           source
"exchange_period": [
  "PREOPENING",
  "OPENING",
  "MAIN_TRADE",
  "CLOSING",
  "POST_TRADE"
], "book_state": [
  "BS_NON_OPENING",
  "BS_DELAY_OPEN",
  "BS_OPENABLE",
  "BS_AVALANCHE",
  "BS_NO_UNDERLIER",
  "BS_STOP_TRADE",
  "BS_NORMAL"
],
"mode": [
  "CONT_TRADE",
  "AUCTION"
],
"exchange_state": {
  "period" : "exchange_period",
  "book_state" : "book_state",
  "mode" : "mode",
  "stop_trading_button_pressed" : "bool",
  "match_price_out_of_bounds" : "bool",
  "ref_price" : "price",
  "ref_price_bound" : "float",
  "order_book" : "order_book",
  "fill_stack" : "fill_stack",
  "shadow_order_book" : "order_book",
  "shadow_msgs" : "msg_buffer",
  "in_fill_stack_mode" : "bool",
  "fill_log" : "fill list",
  "unprocessed_msgs" : "msg_buffer",
  "processed_msgs" : "msg_buffer"
  }

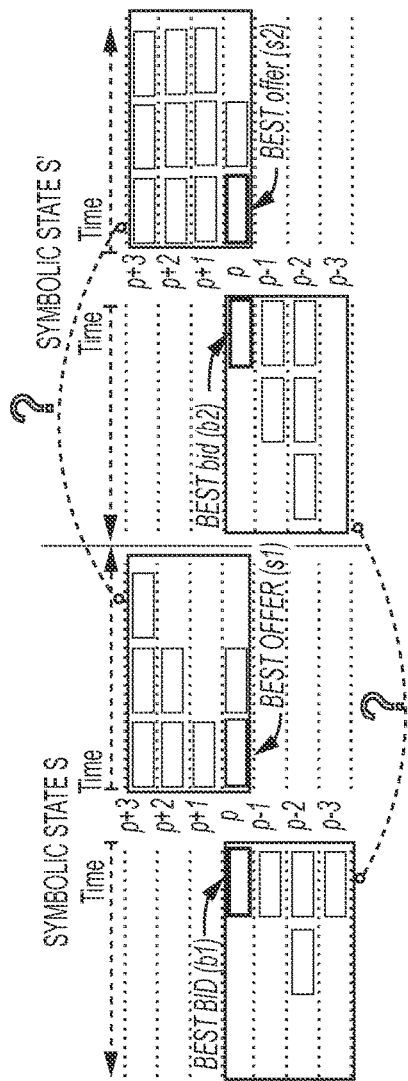
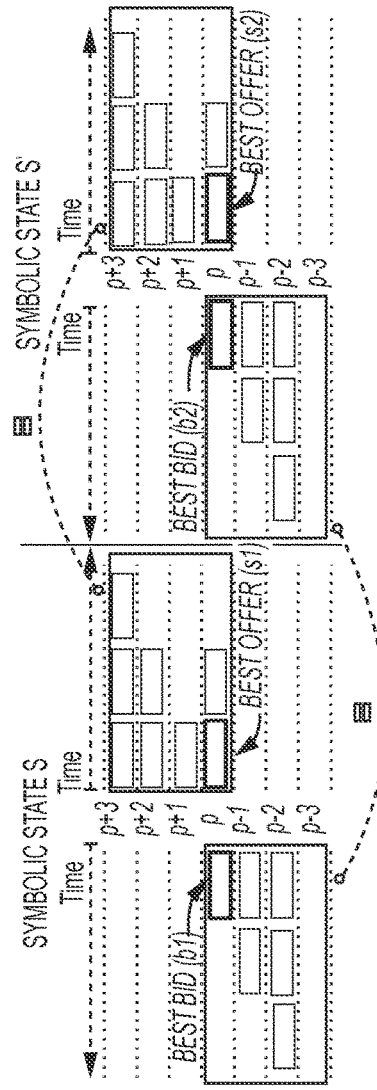
FIG. 27
FIG. 28

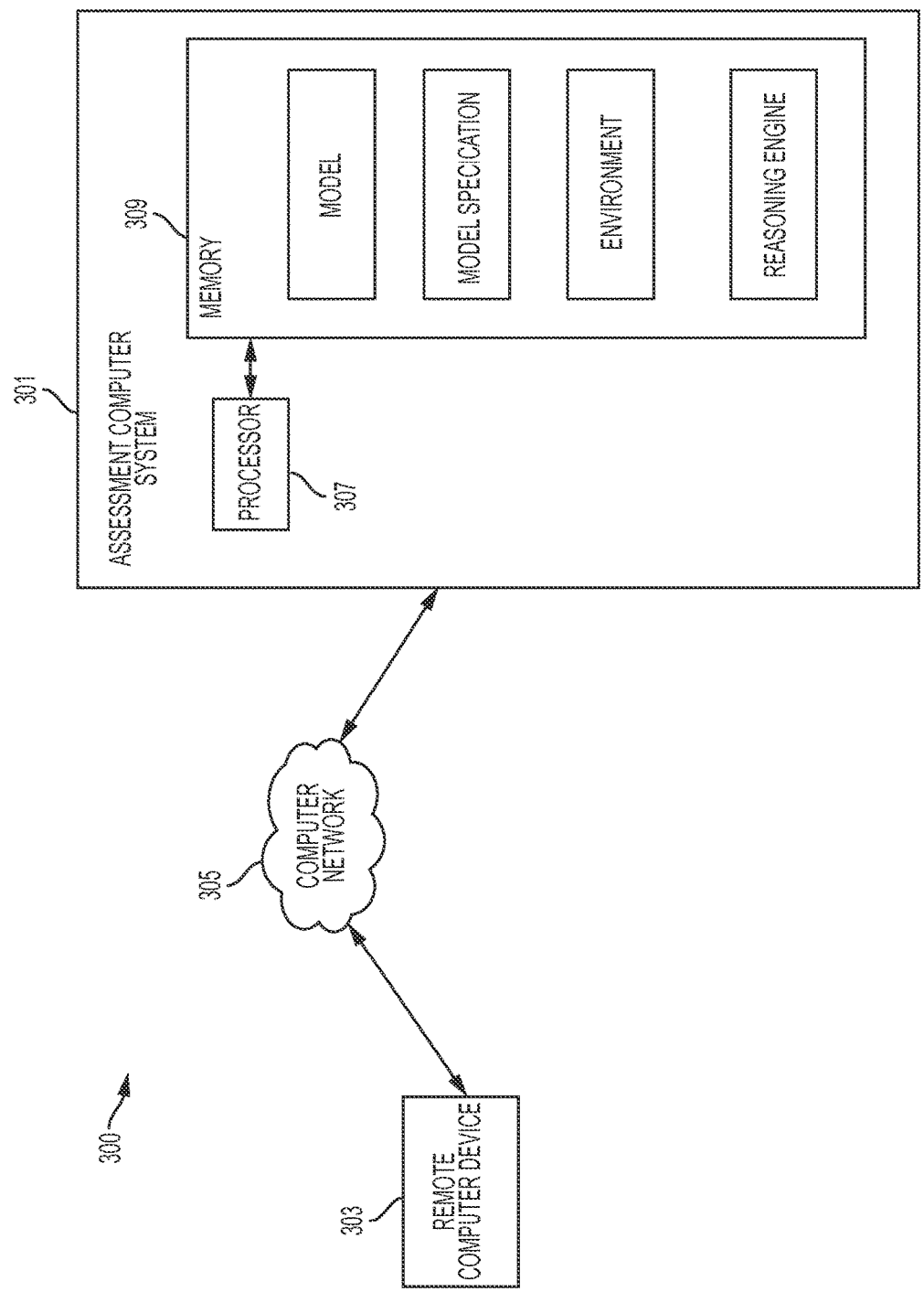

SYSTEM AND METHOD FOR MODELING AND VERIFYING FINANCIAL TRADING PLATFORMS

PRIORITY CLAIM

The present application claims priority to the following two U.S. provisional applications: (i) Ser. No. 62/050,544 filed Sep. 15, 2014; and (ii) Ser. No. 62/052,125 filed Sep. 18, 2014. Both applications are incorporated herein by reference in their entirety.

FIELD OF INVENTION

The present disclosure generally relates to systems and methods for use with financial computing systems or trading venues and, more particularly, relates to systems and methods for modeling and verifying the logic used with financial trading systems.

BACKGROUND

A Financial Computing System (FCS) is a computer system that can be used to make suggestions of what to trade given a certain criteria and that place or execute orders for financial products, such as stocks, bonds, derivatives, commodities, etc. Financial Computing Systems are prevalent in today's financial markets and a wide variety of stakeholders use them. Broker-dealers and market makers employ FCSs, for example, to execute orders on behalf of their clients and/or to automate decisions of capital commitment. Institutional investors, such as mutual and hedge funds, often use FCSs to implement custom trading algorithms to manage positions. High Frequency Traders (HFT) use electronic trading platforms to trade securities rapidly. Also, trading venues or platforms such as exchanges and 'dark pools', where orders/quotes are matched, employ financial computing systems to implement their matching and execution logic. The software for these trading systems automate decisions about financial transactions, such as what to trade and where, or how to match an order in the case of a trading venue. Yet this highly complex software must also adhere to applicable laws, regulations, and internal controls. There have been several incidents for FCS "glitches" and "bugs" that caused financial losses and/or embarrassment.

A significant challenge for regulators of FCSs (and those trading on them) is that the documentation and marketing materials describing the FCSs are often imprecise. The documentation is commonly expressed in English prose, which is a deficient way to communicate the behavior of complicated algorithms underlying FCSs. English descriptions of algorithms lead to ambiguity and open up opportunities for 'liberal' interpretations. But most importantly, English prose makes it impossible to automatically analyze algorithm behavior for compliance with regulatory directives, or to reconcile such descriptions with production systems. The lack of precisely described rules by which venues operate also obstructs their clients from thoroughly testing their systems' connectivity to those venues, making the process tedious and expensive.

Automated Theorem Proving ("ATP") is a subfield of automated reasoning and mathematical logic dealing with proving mathematical theorems automatically by computer programs. It is often used in hardware (e.g., integrated circuits) and software design to verify that the designs are error-free (at least for certain types of errors). The application of ATP to mathematically verify properties of hardware and software designs is commonly referred to as "formal verification."

DESCRIPTION

Glossary

The following terms and phrases are used throughout the present disclosure. Unless specifically noted otherwise, these terms and phrases are used accordingly:

Financial Computing System (FCS)—this refers to and includes any kind of electronic trading systems, such as exchanges (including stock market exchanges, private exchanges or 'dark pools', ECNs, etc.), trading systems used to issue trading orders or quotes, (such as for a broker/dealer, institutional investor, algorithmic trader, etc.), smart order routers, swap execution facilities, constrained portfolio risk management frameworks (such as those designed to produce a list of transactions yielding a solution to a specific constrained risk optimization), collateral optimization systems and derivatives portfolio compression algorithms.

Financial Computing System Model (FCSM)—a specification of an FCS written in IML. An FCSM may further be decomposed into two components: Financial Computing System Model Environment (FCSME) and Financial Computing System Model Specification (FCSMS) both of which are discussed below.

Financial Computing System Model Environment (FCSME)—the FCSME is a generic framework for modeling and reasoning about FCSs in IML. It is a collection of source code/libraries representing the common elements FCS models (for example, when it comes to an exchange matching engine, this includes an encoding of the state of an order book and the state transition mechanisms). The underlying source code is hidden from the user and its functionality is exposed via IML interfaces.

Financial Computing System Model Specification (FCSMS)—this refers to user-specified business logic written in IML. In the case of an exchange or 'dark pool' matching engine, the logic may include the following: order/quote types; trading period logic; different modes of trading (auction/continuous trading); business periods (opening auction, main trading, intraday/closing auction, post-trade period); types of securities traded (stocks/bonds/ETFs/futures/options).

Type-system Based Modeling Language (TBML)—this refers to any type-system based, logical programming language (i.e., a language that is both a programming language and a logical language) for modeling and performing verification of models/programs that are written using this language. Preferably the TBML is a logical programming language in the sense that each function written in this language that returns a single Boolean variable may be turned into a proof obligation (e.g., an MVP discussed herein). One suitable TBML is the Imandra Modeling Language (IML) available from Aesthetic Integration Ltd. IML has a rich type system (extending Hindley-Milner) with static type inference and supports the definition of typed recursive functions. Furthermore, it includes libraries of definitions for basic building blocks of FCS models. IML allows users to define business logic behind FCSs and concurrently express verification conditions (e.g., MVPs) to be proved or disproved. IML further supports non-trivial financial product definitions, such as those described by LexiFi's programming language MLFi, which is a contract specification language (available at http://www.lexifi.com/ product/technology/contract-description-language). One of the most important features of the IML language is that it uses axiomatic operational semantics; for example, every programming construct has a corresponding axiomatic definition, and the type system is used throughout. While other languages that include a type system could be used in accordance with the present disclosure, IML is referred to throughout in exemplary embodiments.

Model Verification Property (MVP)—a property of a model, such as a FCSM, that the user would like to prove. When requested of the system to verify a particular MVP, the system will work to construct either a mathematical proof that the property always holds or produce an explicit counterexample (a set of inputs to the model that will lead to the violation of the specified property). MVPs may also be referred to informally as "proof obligations" (POs). These proof obligations can describe computable properties of any other IML programs and values.

Verification Goal (VG)—an object in the Goal Manager containing a user specified model verification property (MVP) and their statuses (in progress, proved, or countered with a specific example of inputs to the model which will lead to a violation of the property). A verification goal may be defined as a statement about the operation of an FCS that is either true or false. Formally, a VG is simply a function whose output is a boolean value.

Market Event Trace (MET)—a sequence of states of a given FCSM or a sequence of market events and their associated state change explanations. The events can be "market" events, such as, for example, change in market indicators (e.g. a stock index drops by 10%, triggering an algorithm to amend its trades or become more aggressive) or incoming orders/executed trades. Each state transition has a 'trigger' that can be logged (user may define state transition annotations within the model, which will be part of MET). For example, when modeling logic of an exchange, a MET may contain: state of the order book (list of orders that it contains); current book state (trading, halted, auction, etc.); current exchange trading period; current clock time; outbound unprocessed messages (order cancellation acknowledgements, execution details, etc.).

Goals Manager (GM)—a component of the Graphical User Interface (GUI) responsible for Verification Goals (e.g., user entry, status updates, market traces).

GUI Model Context (GMC)—metadata of the FCSM that is incorporated into the GUI environment. This provides incorporation of FCSME definitions into the language definition and regarding the Order Book Viewer layout, order book/orders are based on FCSMS.

Order Book Viewer (OBV)—a visual representation of the order-book based on a user's FCSMS.

Reasoning Engine (RE)—component of the Imandra system responsible for reasoning about IML programs.

Simulation (SIM)—Imandra provides ability to execute or simulate the models written in IML.

Verification (VER)—ability of Imandra to prove or disprove an MVP corresponding to a model written in IML.

Counter-example Generation (CEG)—when Imandra cannot verify a MVP, it turns to CEG to provide a specific example of inputs to the model where the MVP does not hold.

State Reachability Analysis (SRA)—the ability of Imandra to perform deep-analysis of potential resulting (future) state space provided the current state and transition functions (e.g. whether a particular state space is reached give a current or initial state space) (FCSM's combined with models of specific trading venues and associated financial products involved in transactions), where the state space refers to a mathematical description of a possible configurations of the FCS. Besides applications of this method to FCSs, there are numerous applications of this technique for financial risk management. In one embodiment, Imandra will be provided with current positions (asset holdings) of a trading unit along with current 'live' exposures or orders (in one "live" instantiation of Imandra, the system will receive in/out-going FIX protocol messages from the production environment) that have been sent out to the market. Imandra will provide information about potential outcomes of market events and their effects on the holdings, P&L and risk metrics.

Test Case Generation (TCG)—application of Imandra's reasoning engine for generation of non-trivial test cases able to address non-trivial aspects of the model logic.

Data Flow Analysis (DFA)—method of validating the presence or absence of influence of a certain input to the model on specific decisions or computations performed within such a model and the corresponding output. Imandra performs such analysis for FCSMs. For example, dark pool designers must be very careful how they use client information within the matching logic. Oftentimes, dark pool operators must prove that clients would not be disadvantaged (Barclays dark pool is a recent example) within their platforms. Proving that a particular user of the dark pool would not be prioritized over another user is of interest to financial regulators.

Command Line Interface (CLI)—one of the many ways to interact with Imandra is from a command line interface such as Command prompt in Windows OS and Terminal in Mac OS.

Report Generator (RG)—functionality allowing users to generate reports regarding, for example, as a non-exhaustive list: verified MVPs for the specified model; counter-examples for MVPs; summary and list of test cases generated for the model.

Deep Risk Analyzer (DRA)—a component of the system used for analyzing real-time and historic messages to and from the FCS. The component may be implemented in a protocol such as FIX.

Test Suite Generator (TSG)—functionality automating generation of test cases to ensure logical coverage of the model with respect to a collection of MVPs.

Source Code/Executable Generator (SCEG)—translation of FCSMs written in IML to binary files and other target languages, such as, for example C++, Scala, Python.

Continuous Integration Environment Interface (CIEI)—CIEs have become an integral part of development process and Imandra's interface to such systems (e.g. TeamCity and Travis-CI) seamlessly integrates the full functionality of the product with everyday tasks development teams face.

Integrated Development Environment Interface (IDEI)—Imandra includes a rich IDE framework as described above. IDEI facilitates such interaction between the GUI and Imandra's core features (CF).

Modellers (MOD)—this refers to users responsible for specifying business requirements and is defined further in Target Audience.

Developers (DEV)—this refers to teams of developers and is defined further in Target Audience.

Database (DB)—data storage facility.

Development Environment (DE)—set of tools and processes for development of FCSs.

Production Environment (PE)—environment where the FCS implementation is interacting with 'live' systems and performing the function for which it was designed. Just like with DE, there are tools specific to PE which enable users to analyze and understand any deviations from expected behavior.

Compliance/Regulatory Functions (CRF)—internal compliance and regulators (agencies) are just few of the stakeholders of the FIX Messages (FIX)—messages in Financial Information eXchange (FIX) protocol. FIX protocol is one example of a messaging protocol that Imandra supports.

Deep Risk Analysis Monitor (DRAM)—a user interface displaying relevant information regarding DRA of the respective model and the corresponding FCS.

Market (MKT)—general term for outside entities/venues.

SUMMARY

According to one general aspect, the present invention is directed to computer implemented systems and methods that allow a user to produce a model of an FCS, then analyze such model (e.g., to prove or provide counter-examples to) to assess compliance with a user-specified set of MVPs, and perform co-simulation to test conformation of the model to the actual implementation of the FCS. The systems and methods disclosed herein can be applied to various decision-making components of a trading infrastructure, a taxonomy of which is discussed further below.

In another general aspect, the present invention is directed to Automated Theorem Proving ("ATP") methods that are used to validate a model constructed based on the rules or logic of the FCS. An example application of ATP to an FCS may involve a validation or verification of fairness conditions of an exchange matching logic. Furthermore, methods may be used to prove that a model satisfies an MVP, or construct counterexamples of an MVP (i.e., a set of inputs to the model that violate the MVP, also referred to as Market Event Trace (MET)). In addition, an ATP application may be used to prove properties of models, e.g., to prove compliance with regulations (regulatory body, such as the SEC, ESMA and CFTC, directives/requirements expressed as MVPs using IML), to prove non-existence of violations of internal risk limits, fairness principles, etc.

In yet another general aspect, the present invention is directed to computer implemented systems and methods that provide a modeling environment for constructing, testing, and/or verifying models of an FCS. In one embodiment, the modeling environment contains source code libraries representing the common elements to a trading platform, such as a stock exchange. For example, FCSME could include an encoding of the state of an order book and the state transition mechanisms of the exchange. Advantageously, the underlying source code of the FCSME may be hidden from the user, yet the functionality could be provided to the user via interfaces. An FCSMS may be provided with the FCSME, or any other modeling environment, that allows a user to specify particular business logic that describes components of the trading platform that the user is modeling. For the example of a stock exchange, this may include custom order/quote types, different modes of trading (i.e., auction/continuous trading), business periods (i.e., opening auction, main trading, intraday/closing auction, post-trade period), and types of securities traded (i.e., stocks/bonds/ETFs/futures/options). In a further embodiment, an Order Book Viewer (OBV) may be provided, which is a visual representation of the order-book model based on a user's EMS. The OBV will contain inputs to the model, its states and outputs, allowing the user to interact with the model.

In still another general aspect, the present invention is directed to systems and methods that analyze real-time messages to and from a trading platform, for example, a stock exchange. An analyzer may have two primary functions. According to an exemplary embodiment of a stock exchange, the analyzer may first function to provide an alert for inconsistencies in states of an exchange with respect to a model of the matching logic (i.e., an FCSM) of the exchange. The analyzer may accomplish this by comparing live messages from a production system (new orders, fills, order book snapshots, etc.) and verifying that they constitute valid state transitions of the exchange. Second, the analyzer may perform a reachability analysis, in which the analyzer analyzes whether user described states may be reached from a current state of an exchange. This means, in the example of a stock exchange, that the system is listening to all current outgoing orders to the exchange and confirms that no market events may result in violation of a control, such as simultaneously filling orders with certain notional values.

In a further general aspect, the present invention is directed to systems and methods that provide a Graphical User Interface (GUI) that allows for user interaction with one or more of the systems and/or methods described above. The GUI may comprise at least one of three components:

(1) Text editor for encoding an FCSMS;

(2) Goals Manager; and (3) an Order Book Viewer (OBV).

The Goals Manager is a component of the GUI responsible for Verification Goals (VGs). The Goals Manager may include functionality for user entry, status updates, and Market Event Traces (METs). The OBV may particular to an FCSME/FCSMS or it may be available for other types of systems as well. For example, an OBV may be able to visually represent inputs/states/outputs of a Smart Order Router (SOR).

In still a further general aspect, the present invention is directed to systems and methods that can be used to verify conditions in a FCS. A system may query an interface for properties of a model of the FCS, where the model comprises a specification of the type of conditions the FCS is configured to implement. The system may then provide statements about states of the model that will either be proven correct or disproven with a counter example (i.e., market trace sequence of inputs to the system) that will lead to the resulting violation of the specified condition. In one embodiment, a user provides the statements about the states of the model. The language used for specifying the statements may be the same as for specifying a market microstructure of the model. Formal reports can be generated describing safety properties of the model and generated test coverage. Because numerous government agencies around the world have rules and regulations around safety of trading systems, the reports may be used as discussion points or with the regulators regarding compliance with the rules and regulations. Such rules and regulations may be encoded within the framework and updated periodically, at predetermined times, or as rules and regulations are promulgated.

The present invention may be employed by various stakeholders for an FCS, including various electronic trading systems. Those stakeholders include:

Modelers—Common denominations for these individuals would include Traders, Sales manager, and Project Managers. This person would be responsible for encoding business logic. Typically this person has to analyze inconsistent feature requests and understand how they might be implemented and whether they abide by regulatory constraints.

Compliance personnel—These are typically individuals tasked with ensuring that a model and its implementation meet regulatory and internal safety and performance requirements. Examples of these requirements are:

Best execution policy—if a client has sent two orders of opposite sides (US has laws prohibiting mutual fund managers from simply transferring a position from one fund to another without going to the market) then they will match against each other first. So, if a trader inside an investment bank is buying a stock and a client sends two orders (for buying and selling) the same stock to the bank's dark pool, then the client will receive fills for both orders and the trader will NOT execute against either one. This so-called 'BestEx' policy guarantees clients are executed against the best price available in the dark pool. In the US, there are also requirements to wire an order to a better venue if there is a better price there.

Developers—Common denominations for these individuals include Software technicians, Quality Assurance Engineers, and Production Support personnel. Software technicians would be tasked with implementing the model and delivering it into the production environment. Oftentimes, these would be equivalent to staff engineers that use proprietary libraries to implement low-latency systems. With trading software becoming more and more a commodity product, exchanges/banks hire outside solution vendors to implement the models. In both cases, the developers are able to explore properties of a model through different interfaces (whether test cases or direct property queries).

The present disclosure may be used with many different types of trading forums, or venues, such as public exchanges or private exchanges (e.g. dark pools and multilateral trading facilities). A public exchange is a trading venue open to all interested parties (which may be many buyers and many sellers) that use a common technology platform and that are usually run by third parties or industry consortia. A dark pool is a private forum for trading securities. Dark pools are typically operated by (i) independent companies set up to offer a unique differentiated basis for trading, (ii) broker-owned dark pools where clients of the broker interact, most commonly with other clients of the broker (possibly including its own proprietary traders) in conditions of anonymity, and (iii) some public exchanges set up their own dark pools to allow their clients the benefits of anonymity and non-display of orders. "Multilateral trading facility" is a European regulatory term for a non-exchange financial trading venue, like a dark pool, but with added transparency features.

These and other benefits of the present invention will be apparent from the description that follows.

BRIEF DESCRIPTION OF THE DRAWINGS

The embodiments described herein will become more apparent and will be better understood by reference to the following description of non-limiting embodiments of the disclosure taken in conjunction with the accompanying drawings, wherein:

FIG. 9 is diagram illustrating a historical exchange simulation according to the present disclosure;

FIG. 18 shows source code used to provide an order book according to one embodiment of the present disclosure;

FIG. 19b shows source code used to provide the order book interface of FIG. 19a;

FIG. 27 is an illustration of the result of an analysis of the MVP with regard to the state representations of the FCS shown in FIGS. 26a and 26b;

FIG. 28 is a diagram is an illustration of the result of an analysis of an amended MVP with regard to the state representations of the FCS shown in FIGS. 26a and 26b;

FIG. 30 is a diagram of a computer architecture according to one embodiment of the present disclosure.

DETAILED DESCRIPTION

Various non-limiting embodiments will now be described to provide an overall understanding of the principles of the structure, function, manufacture, and use of systems and methods of the present disclosure. One or more examples of these non-limiting embodiments are illustrated in the accompanying drawings. It will be appreciated that the systems and methods specifically described herein and illustrated in the accompanying drawings are non-limiting example embodiments and that the scope of the various non-limiting embodiments of the present disclosure are defined solely by the claims. The features illustrated or described in connection with one non-limiting embodiment may be combined with the features of other non-limiting embodiments. Such modifications and variations are intended to be included within the scope of the present disclosure.

Figure 1:
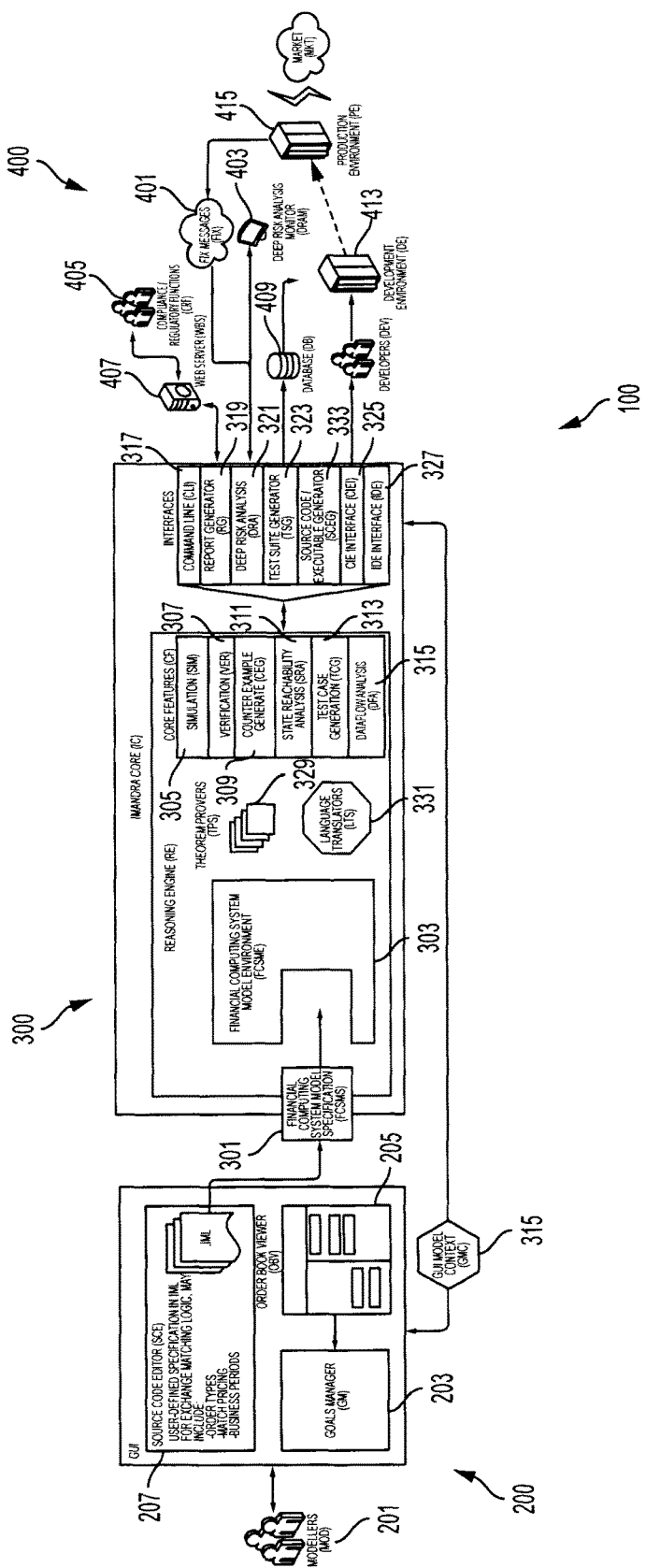
FIG. 1 is a diagram of a system for modeling and verifying trading venues according to one embodiment of the present disclosure.
Figure 1A:
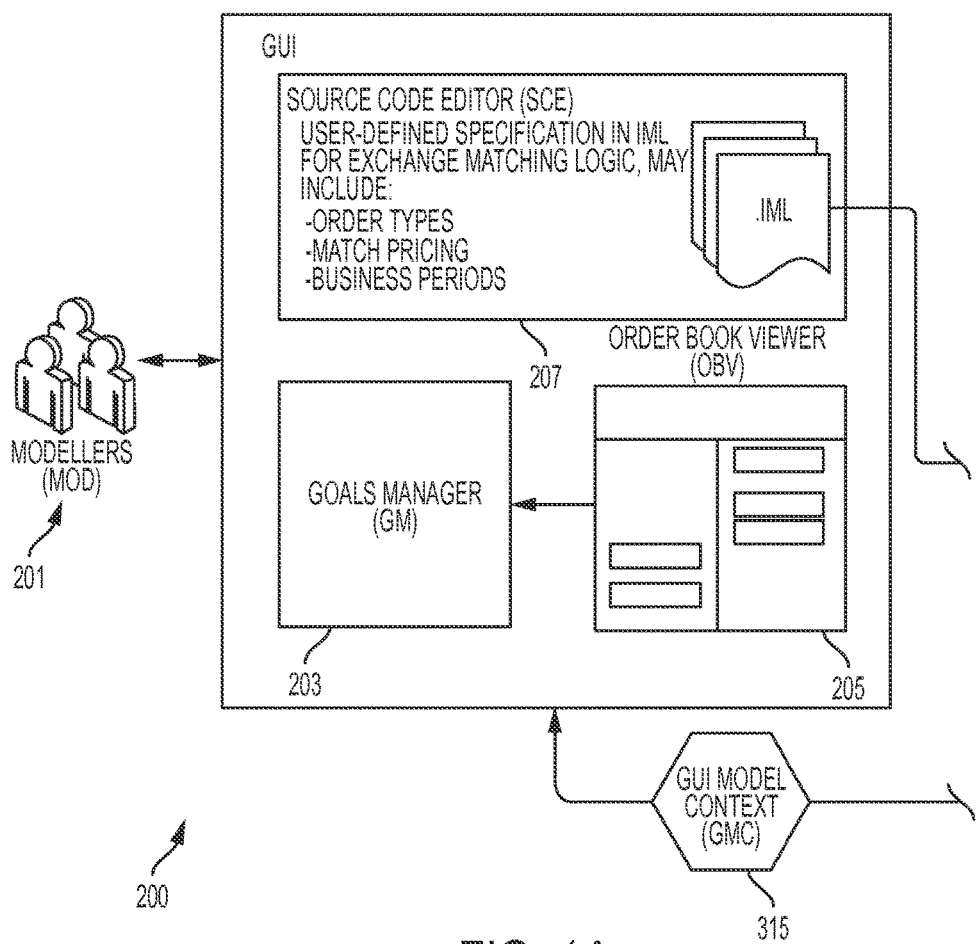
FIG. 1a shows the GUI component of the system shown in FIG. 1.
Figure 1B:
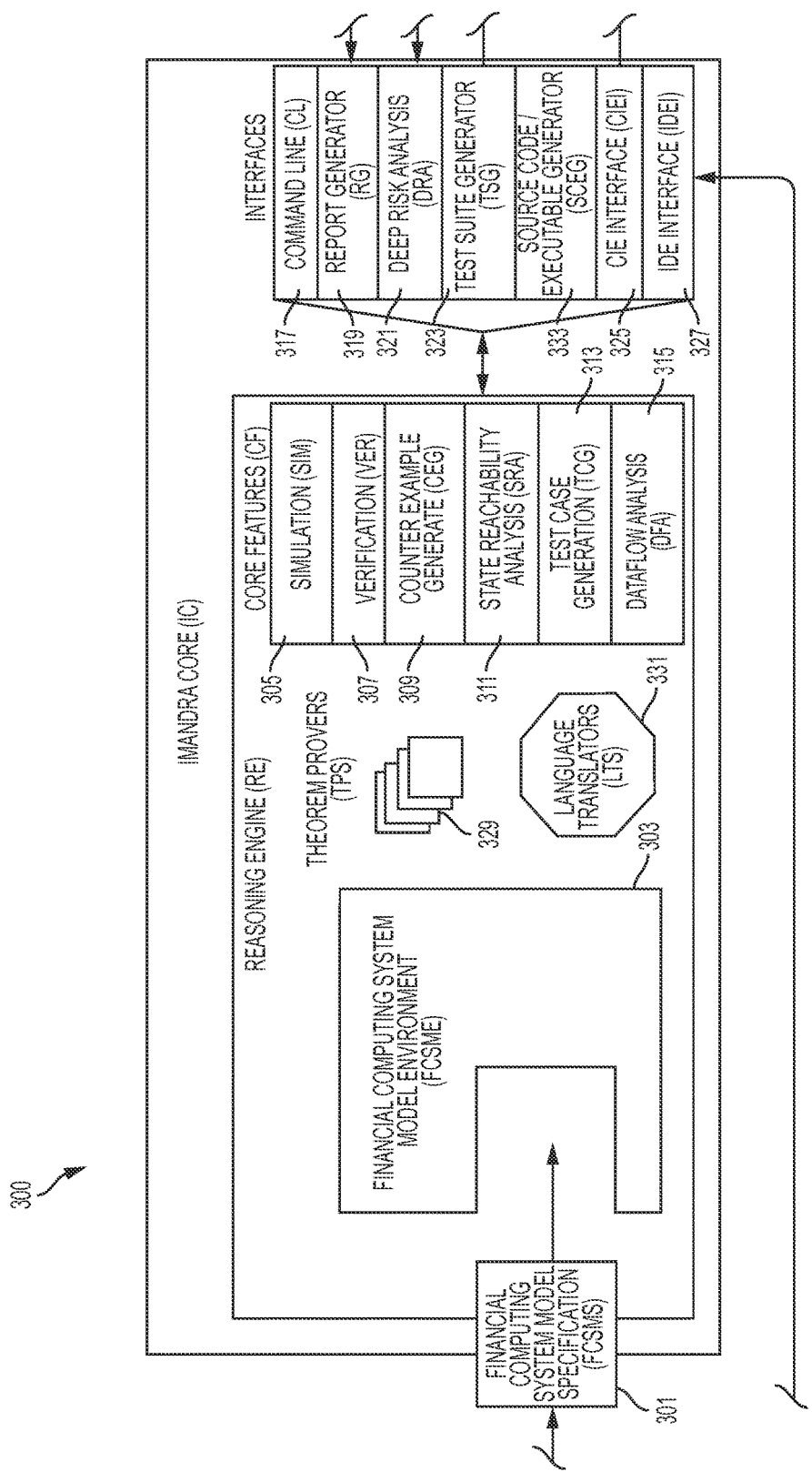
FIG. 1b shows the Imandra core component of the system shown in FIG. 1.
Figure 1C:
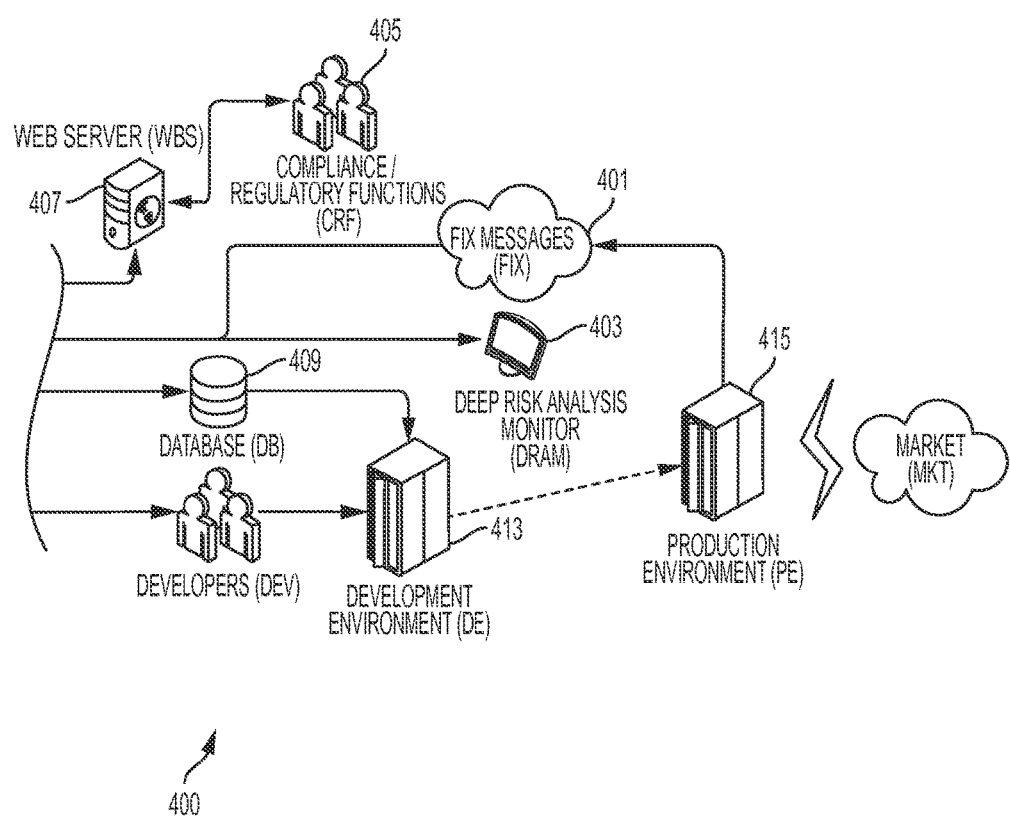
FIG. 1c shows the production section component of the system shown in FIG. 1.

In one embodiment, referring to FIGS. 1-1c, a computer-based system 100 (sometimes referred to herein as an "assessment computer system") for modeling and verifying a trading platform comprises at least the following components: a graphical user interface (GUI) 200, a core environment, shown as "Imandra Core" 300, and a production section 400. The computer-based system may be implemented by one or a number of networked computers, which may be personal computers, laptops, servers, mainframes, tablet computers, etc. For embodiments where multiple networked computers are used, packet-switched networks can be used, e.g., Ethernet, TCI/IP, etc., and combinations thereof. Each computer(s) in the system may comprise one or more processor circuits and one or more memory devices (including primary memory, such as RAM, and second memory such as RAM, flash, magnetic memory, etc.). The memory may store programming instructions (software) that is executed by the processors of the system to perform the various functions described herein. For example, the memory may store the software for implementing the functionalities of the GUI 200, the core environment 300, and the production section 400 described herein. The memory also store data and the model code used by the system 100.

As shown in FIGS. 1 and 1a, the GUI 200 comprises a Source Code Editor (SCE) 207, a Goals Manager (GM) 203, and an Order Book Viewer (OBV) 205. Within the SCE 207, there are components that comprise functional building blocks of a trading platform: for example, a group of one or more order types, matching order pricing, and business periods. As described herein, the GM 203 is a component of the GUI 200 responsible for verification goals and may include functionality for user entry, status updates, and market traces. A Verification Goal (VG) is an object in the GM 203 that contains user specified proof obligations and their statuses (i.e., in progress, proved, or countered with a specific example of inputs to the model which will lead to a violation of the property). The OBV 205 is a visual representation of the order-book of a particular trading platform that is based on a user's FCSMS in IML as shown in FIGS. 1 and 1a. Further, the GUI 200 (which may be displayed on a monitor of the computer system) may change for a particular FCSMS that is created by a user. Thus, it can be FCSMS specific.

In a preferred embodiment, the system 100 implements a user interface that allows a Modeler 201 to provide the details to the SCE 207 for producing a model, the specifications of which are the FCSMS 301. The user interface may consist of at least two components. One component is a way to enter information in the FCSMS 301, such as a text editor. The second component is a display that is used to show the aspects of the FCSMS.

Outputs from the GUI 200 are provided to the core modeling environment 300, which includes the FCS Model Environment ("FCSME") 303 shown in FIG. 1. The GUI 200 is generated based on the specifications of a trading venue provided by a modeler, as the FCSMS 301, by running the FCSMS 301 through FCSME 303, and the GUI 200 is provided based on FCSMS 301. The FCSME 303 may be implemented as an API that provides the building blocks of all different forms of FCSs, such as trading platforms including exchanges. In the context of trading platforms for example, the FCSME 303 may include information regarding types of securities traded, orders supports for each securities, and different trading instructions. More generally, the FCSME 303 provides definitions of what a trading platform is in terms of a definition of a program and a corresponding definition of the system within the logic of a theorem prover. Other types of FCSs may have other types of FCSMEs that are particular to the type of operations performed the FCS and the API may call the applicable building blocks for the FCS. The FCSME 303 can translate the specification of a general state machine according to the logic of the trading platform, i.e. the FCSMS 301, and provide an executable simulator (e.g., compile the mode code to extract executable simulator files) and definitions in a theorem prover.

The FCSME 303 may have Order Book-related code that is adaptable to a particular trading platform and that provides parameters for various types of buy and sell orders, rules regarding the ranking or hierarchy of orders in the Order Book, rules specifying the completion of orders, and at least one order ranking function, such as, for example, a price-time-priority fulfillment scheme. A sample of the source code behind such an Order Book is shown in FIG. 18. Further, as seen in FIG. 1, the FCSME 303 accepts a description of the customized trading platform logic, labeled as the Financial Computing System Model Specification (FCSMS) 301, from the SCE 207. The customized logic includes details such as order ranking function, price match function, how different orders should be carried out versus others, and when the exchange should go between different types of trading, e.g. continuous versus option. The customized pieces of logic are provided to the FCSME 303 and a complete model of a trading platform is formed. The model provided by the FCSME 303 is an unambiguous way to specify a trading platform, which is different from written documentation, which is currently used for some platforms. By using such a model, exemplary test cases can be used to show how matching logic works. Other uses of the model provided by the FCSME may include, as a non-exhaustive and exemplary list, the theorem prover can be used to reason about the model and test-cases can be generated from the model that are then used to test the production system.

As shown in FIGS. 1 and 1b, the core modeling environment 300 further includes core software modules and interfaces that allow for interaction with an assessment of the model. The Reasoning Engine of the computer system 100 may compile the FCSM using the axiomatic operational semantics of its IML code to generate mathematical logic or axioms defining the state space of the FCSM. The Reasoning Engine can analyze these mathematical axioms to perform the desired (and programmed) assessment as described herein. The Core Features (CF) of the Reasoning Engine include a Simulation (SIM) module 305, a Verification (VER) module 307, a Counter Example Generation (CEG) module 309, a State Reachability Analysis (SRA) module 311, a Test Case Generation (TCG) module 313, and a Dataflow Analysis (DFA) module 315. The Interfaces includes a Command Line Interface (CLI) 317, a Report Generator (RG) 319, a Deep Risk Analysis (DRA) Interface 321, a Test Suite Generator (TSG) Interface 323, a CIE Interface (CIEI) 325, and an IDE Interface (IDEI) 327. These modules and interfaces are explained herein. In addition, the GUI Model Context (GMC) 315 may provide feedback from the core modeling environment 300 to the GUI 200. As shown in FIG. 1, the GMC 315 may be linked with the IDEI 327. In addition, the OBV 205 may be linked with the simulation component 305 and the GM 203 may be linked with the verification component 307. These various modules may be implemented as software code stored in memory and executed by the computer system 100.

The IC 300 has embedded simulators as part of the simulation feature 305 to interact with a model and learn what the matching logic causes a trading platform to do. A simulator can be used by developers of a trading platform as well as by traders that are seeking to interact with or further understand the trading platform. With the simulator, test cases can be analyzed. Accordingly, a user is able to query the simulator to see if conditions or goals occur in a model. The simulation feature 305 allows for model validation; the process by which a user is able to prove properties of a model of a trading platform. For example, model validation can validate whether the model correctly models the behavior of the production trading platform or exchange. This process can be carried out by executing a model side-by-side with a production trading platform to validate the model's faithfulness. Preferably, the simulation component 305 accepts different formats of an input/output from a user via an interface, such as for example, OBV or FIX messages. It can also automatically be used in back-testing systems. The simulation feature 305 also allows for trading platform strategy testing and design. Using a model based on the FCSMS, the designer of a trading strategy can interact with the model of the trading platform and can trace its execution by stepping through the market event traces and viewing all market events at each logical time step. For example, the designer may use the simulation component 305 to understand which aspects of the exchange matching logic caused a market event to occur. In addition, the simulation feature 305 also allows for matching logic profiling by providing a user with the ability to analyze algorithmic complexity of a model and the ability to optimize a specification accordingly. In this process, the FCSME 303 generates reports about execution time, number of calls, parent functions, child functions, code line hit count, and code line execution time, for example. This may be executed from a function such as Matlab's profile function.

The verification feature 307 provides automatic theorem proving aspects of the system 100. In various embodiments, the verification feature 307 uses various heuristic combinations of ATP and ITP systems, as described previously. IML MVPs, which involve type definitions and recursively defined functions, are translated into forms that the various theorem proving systems can handle. For example, some systems can reason about untyped terminating recursive functions while others cannot. Furthermore ATPs such as Prover9, SPASS and E support untyped first-order logic, while others do not. However, IML is a typed language based on the Hindley-Milner type system. To translate an exchange model into untyped theorem provers, a series of transformations are applied which: (i) introduce predicate and function symbols used to express type-membership and type constructors, and (ii) axioms about these type predicates and constructors sufficient for capturing the extensional properties of the type. As shown in FIGS. 1 and 1b, the IC 300 has Theorem Provers (TPS) 329 and Language Translators (LTS) 331.

Different theorem proving systems have their own strengths and weaknesses. When given an IML MVP, the reasoning engine applies heuristic combinations of different theorem proving techniques based upon the structure of the MVP. For example, the ACL2 system has powerful heuristics for automatic proofs by induction, and may be preferred for proving a first-order property of a recursively defined function.

Other ATP and ITP languages or systems, or combinations thereof, such as Z3, Isabelle/HOL and Coq, may be used by the verification component 307 for encoding the trading platform model for theorem proving according to the respective benefits of each. For instance, Z3 is a SMT solver by Microsoft that is better equipped for providing counter-examples for sequences of market event traces (MET), whereas provers such as Isabelle/HOL, ACL2, and PVS are better equipped for recursive function proving. More information about the Z3 theorem prover can be found at z3.codeplex.com. Isabelle/HOL can be used to interactively discharge higher-order MVPs, that is, MVPs expressed in IML using higher-order functions such as IML (and OCaml) List.map and List.fold_right functions. The verification feature 307 can also be programmed to deduce which theorem prover to apply in each setting.

The Report Generator Interface 319 is configured to generate reports, such as web pages, showcasing different elements of the matching logic, statuses of proof obligations, etc. This may be used by a diverse group of stakeholders who want to understand different elements of the matching logic of a trading platform and all of the safety properties. This may be employed in a web server of the system 100, for example.

The Test Suite Generator Interface 323 is configured to generate a set of inputs and expected outputs that can be used to test implementation of a model by third parties, such as a trading platform developer. Another application of this interface is to provide a set of test cases that users of the system should run to test their systems' implementation of the protocol.

The Source Code/Executable Generator Interface 333 is configured to provide an executable binary or a library that can be invoked by other systems to allow for simulation of a model based on the EMS. The files may be provided to production environments, tools such as Matlab, etc. For example, in a preferred embodiment, IML is used as the specification language (i.e. for EMS/FCSME), and users may convert such specifications of their model into a different language, for example, into C++ or other desirable programming languages.

As shown in FIGS. 1 and 1c, the production section 400 receives outputs from the core environment 300. As shown in FIGS. 1 and 1c, the Test Suite Generator Interface 323 is configured to provide executable files to the Development Environment (DE) 413. Further, the Test Suite Generator Interface 323 may be configured to generate inputs and outputs to be used to test implementation of a model by third parties, where the inputs and outputs may be stored in database 409 and may be used by trading platform developers or those working in a continuous integration environment 411, and ultimately provided to the Production Environment (PE) 415. In addition, the Report Generator Interface 319 may be configured to provide details of a model of the trading venue or platform to a web server 407 which may then be provided in the form of webpages to regulatory and compliance users 405, or others as necessary. Moreover, the Deep Risk Analysis Interface 321 may provide information to a monitor, referred to herein as a Deep Risk Analysis Monitor (DRAM) 403, or it may provide the information to a network 401 that leads to the production environment 415.

Figure 2:
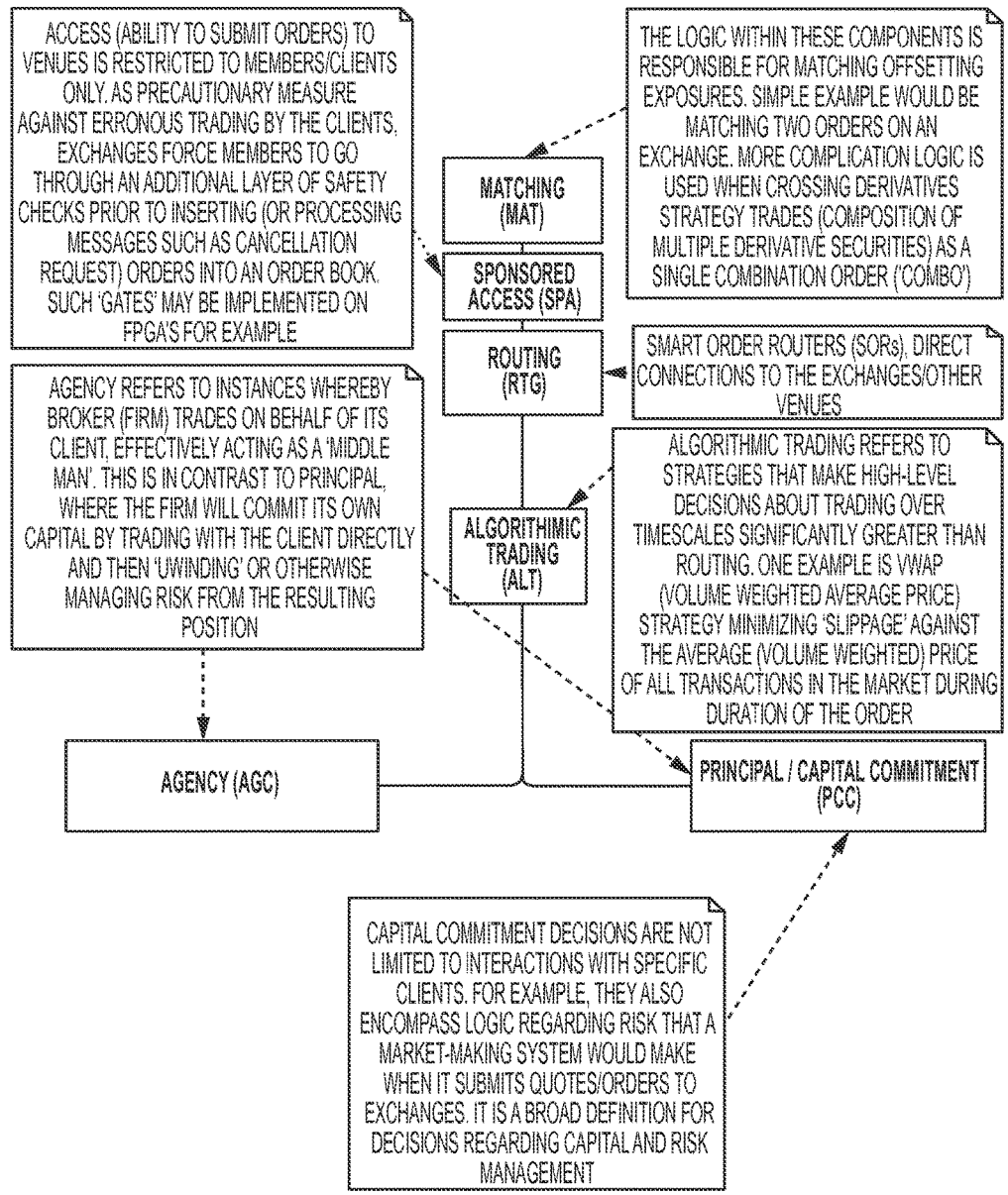
FIG. 2 is a diagram of Taxonomy of Trading Logic and Decisions with an FCS.

FIG. 2 provides a taxonomy of trading logic and decisions in FCSs that may benefit from the present invention. As shown in the diagram of FIG. 2, at the Matching (MAT) block, the decisions made here concern crossing indicated exposure interests, while abiding by an individual exposure's constraints. An illustrative example includes, but is not limited to, matching two orders on an exchange order book. A further example includes more complicated logic where multiple derivative contracts are simultaneously matched as part of a combination order. The Sponsored Access (SPA) block, demonstrates an additional level of security exchanges introduce to make sure exchange clients do not send erroneous trades and quotes into an order book. For example, according to the London Stock Exchange (available at www.lseg.com/areas-expertise/our-markets/turquoise/equities/sponsored-access), an offering includes the following validation checks for access to its "Turquoise" venue:
1. Price Band Validation
2. Restriction on unpriced Market Orders;
3. Maximum Order Value and/or Maximum Order Volume;
4. Maximum Gross Exposure (Traded+Open Consideration);
5. Maximum Message Rate;
6. Permissioning by order book and instrument group; and
7. Restricted Instrument Lists Because of recent glitches within trading firms, exchanges are introducing more advanced checks and controls within a sponsored access framework. Such checks and controls may include looking for patterns of orders that look abnormal, such as back-to-back submission of multiple limit orders with the same quantity and limit price for the same client (or with the same trader identification code). Such checks indicate a potential glitch on the side of a member and will raise an alert to supervisors and potentially reject incoming orders from that member. Some other checks may involve counting total notional and different risk metrics of the outstanding exchange exposure (i.e., all of the live orders from a specific member) and rejecting them if some of the limits are breached.

Also shown in FIG. 2, the Routing (RTG) block may take the form of a Smart Order Router (SOR), which is the most common component that implements decisions regarding checks and controls within a sponsored access framework. The SOR is a component that is responsible for managing interaction with different exchanges. Logic underlying the "smart" routing may include pre-defined parameters describing a likelihood of execution of an order at a specific exchange. The decisions made by an SOR are optimized for latency as the SOR is designed to take advantage of market opportunities. For instance, the US has very specific regulation regarding how an order must be routed given the US-specific market fragmentation. As an example, an order may not be routed to an exchange if an alternative venue has a more attractive price. Such logical decisions may be encoded and verified with IML. The Algorithmic Trading (ALT) block describes decisions taken by an algorithmic trading system that are on a timescale greater than that of routing logic implemented in block. One example of such a decision is Volume Weighted Average Price (VWAP) strategy commonly used in equity trading. This strategy seeks to minimize deviation from a VWAP benchmark (which is calculated by averaging, using respective trade size as weight, all eligible market transactions in a given security for the duration of the order) and is part of virtually every broker's algorithmic trading offering.

Further, the Agency (AGC) block refers to the situations when a firm is trading on behalf of a client without committing the firms own capital to the transaction in its entirety. Regulators provide very strict rules about how information about client orders may be used within FCS logic and when a firm makes a trading decision for its own account with knowledge of existing or future client orders. Such segregation of information is critical when designing FCS and is one of the most scrutinized aspects of FCS implementation for regulatory authorities. One specific example of such transgression would be prioritizing in-house (i.e., principal) orders within a dark pool over those of clients (whereby individual order ID and Source information are used within the matching algorithm to prioritize one client versus another).

The system described herein will allow users to model the algorithms underlying trading decisions and to then verify that these algorithms properly segregate information. Other decisions regarding agency orders deal with numerous client-specific attributes such as requirement of a client to only execute within specific markets, such as a primary exchange (whereas most securities, may be traded on more than one platform). The Principal Commitment (PCC) block refers to systems that make automated decisions about entering new or unwinding existing positions of a firm that is running such system. Some of the most common applications of this logic are market-making platforms that operate within certain risk limits and contain logic around risk management of the inventory (i.e., positions). One example is Orc's Market Making Application (available at www.orc-group.com/Products/Trading/Orc-Market-Maker/). This product automates numerous risk management decisions a human trader would make around different risk metrics of the existing positions. For example, if the designated book ('book' is an accounting term meaning a logical unit where positions are associated with) goes outside delta limits, the application will change prices (or cancel opposite orders and enter new ones) of existing orders such that they are more likely to execute and offset the existing risk of the book. The system described herein will allow users to not only model the algorithms behind such market making systems, but also ensure that they would never lead the system to violate such risk limits.

Prime Brokerage units of major broker-dealers are tasked with optimization of the usage of their clients' assets/collateral within the scope of the overall business of the firm (overall balance sheet and collateral optimization processes). Usually, when opening an account with a primer broker, its customer may select a "segregated" or a "non-segregated" account. The term "segregation" here refers to ability of the bank to reuse assets in that account for other purposes (of course, on a temporary basis) such as lending stocks held in that account to other clients so they may 'sell short' that security. When the bank loans the asset, the bank will charge that client a fee for being able to use that security position. It follows that typically segregated accounts correspond to higher brokerage fees because they take up balance sheet of the broker and limit its capital usage options. The process of re-using capital is referred to as "rehypothecation".

There are other businesses within broker-dealers with prime finance departments that must be backed by assets. For example, when a bank trades a swap product with a client, it must hold hedging assets on its books to offset the exposure it created with the trade. By holding the hedging position the bank creates more opportunities for its prime brokerage department to lend out to their clients, thus re-using the collateral on its balance sheet. There are many other aspects to this process such as dividends, tax rates/jurisdictions, trading restrictions, etc. For example, one important aspect is client's limit on how much of its assets in the non-segregated account could be moved by its prime broker. This became a very important aspect of such relationships during the Lehman crisis, when it was difficult for some of its clients to locate their assets.

Other aspects of collateral management optimization process include selecting assets to post with venues/counterparties to meet regulatory and contractual obligations.

IML allows the encoding of an algorithm used to optimize financial firm's collateral usage (including client accounts in the case of broker-dealers) in a way that it may prove it will always abide by regulatory/contractual constraints while optimizing the balance sheet usage.

In addition to moving many Over-The-Counter (OTC) transactions/products onto exchanges and/or clear them centrally, regulators have mandated periodic analysis and netting of exposures for designated dealers in such securities. For example, a swap transaction entails exchange of future cash flows that may be linked to a specific benchmark (such as LIBOR) or be fixed (i.e., 15 basis points per month) on an agreed upon nominal notional amount and for a fixed duration. While this is a fairly simple example, the complexity of contracts that two parties may engage in within the financial sector is ever increasing. IML provides all of the utilities to describe such contracts unambiguously. Furthermore, the Imandra system can then be used to reason about such contracts, e.g., to prove bounds upon various risk measurements associated with the contract.

Technological glitches within financial markets have become almost dinner-table discussions within countries with developed financial infrastructure. The debacles of Knight Capital, NASDAQ and the Facebook IPO, BATS and its own IPO, etc., have made headlines all over the world. Although these incidents are representative of general flaws, related to technological complexity and lack of transparency, that exist within the capital markets industry, more subtle examples of systematic failures by an institution to implement adequate controls are prominent. In a lesser-publicized sequence of events, Citadel (a global hedge fund) settled a lawsuit by the Financial Industry Regulatory Authority (FINRA) for alleged rule violations for failure to reasonably prevent the transmission of erroneous orders to major stock exchanges in the US during the period between Mar. 18, 2010 and Jan. 8, 2013. The following are excerpts from the summary of Letter of Acceptance, Waiver and Consent that outlines the subject of the incidents:

- On 24 occasions between Mar. 18, 2010 and Jan. 8, 2013, CDRG used the exchanges' clearly erroneous petition processes to obtain cancellations of erroneous customer orders that the firm's supervisory procedures and risk controls failed to reasonably detect and prevent.
- Separately, in April 2010, while implementing a software upgrade, CDRG released a test version of a previously abandoned software update, causing a quoting system to send aggressively priced marketable sell limit orders to the exchanges. This release caused CDRG to erroneously sell short 2.75 million shares of PC Group, Inc. during an eleven minute period.
- In August 2011, CDRG released an update version of its order sizing software for one of the firm's proprietary trading strategies. The release caused the trading strategy to enter into an order sending and cancellation loop.

As described above, the present disclosure may be employed by various stakeholders involved in financial trading platforms, including those involved in various electronic trading systems. The following categories broadly reflect the different types of users and characterize their interactions with aspects of the present disclosure.

Modellers.

Common denominations for these individuals include Traders, Sales Managers, and Project/Product Managers of an FCS. A modeller is responsible for encoding the business logic driven by client demand for new products or improvements to the FCS's internal logic. Oftentimes this person is tasked with analyzing inconsistent feature requests and understanding how they might be implemented and whether they abide by regulatory constraints. Use cases for this category include, but are not limited to:

- Encoding complete specification of the matching logic using Imandra's language/state representation. This entails specification of different order types, how they are matched in the order book and at what price, among others.
- Querying a model, for example on a manual basis, for subsequent actions and understanding its behavior as part of the modelling process. It is important to note that this is not only important for the person creating the specification, e.g., in order to understand the system's side-effects and unexpected behavior, but also for persons creating systems that will interact with the model. An illustrative example is the situation in which a person developing a system, which may be an SOR that will submit orders/quotes to the exchange, needs to have a clear understanding of the protocol by which his system will interact with the exchange.
- Auto-generation of strategy-specific GUI context (explained in further detail below), which may include matching-logic specific constructs and automatic look-up and generation of order book widgets from Client Micro-structure Specification.
- Auto-generation of counter-example scenarios (explained in further detail below).
- Visual representation of the order book, which includes simulation of the market trace (which is exemplified by giving an initial order book state and the resulting sequence of states and state transitions that would be obtained by the FCSM during its execution beginning with the initial state).

Visualization of the market event trace and resulting order book states.

Allowing users make amendments to the trace states and rerunning the simulation from that point.

Interface to historical data representing states of the order book and 'playback' option for testing higher-level trading strategies Developers.

Common denominations for these individuals include Software Engineers, Quality Assurance Engineers (QA), and Production Support personnel. Software engineers may be tasked with implementing the model and delivering it into the production environment. Since trading software may be considered a commodity product, exchanges/banks may hire outside solution vendors to implement the models. In both cases, Developers may use the present invention to explore properties of a model through different interfaces as described below. Use cases for this category include, but are not limited to:

Generation of test cases for production environment (Test Coverage Generator).

Plug-in for a Continuous Integration Environment (CIE; such as TeamCity, Bamboo, etc.) that will re-generate test suites and coverage analyses based upon changes to the model (CIE Interface).

Generation of FIX Tests for clients of the exchange to test out their 'understanding' of the specification (Test Coverage Generator). Such techniques can also be used for other financial messaging formats besides FIX.

Auto-generation of binary representation of the model, which may be as an executable program. Such a program can then be used in a production environment, if this is desired. It can also be used for efficient co-simulation, to test a model for its faithfulness with respect to a production system.

Auto-generation of representation of the model in other languages than IML.

Monitoring of state consistency based on FIX traffic, or other messaging protocol (Market Events and Order flow).

Compliance and Regulators.

These are typically individuals tasked with ensuring that a model and its implementation meet regulatory and internal safety and performance requirements. They are responsible for keeping up-to-date with the latest regulation and signing-off on system designs insuring that they are compliant with such regulations.

Financial markets are one of, if not, the most regulated sectors in the world. There are multiple agencies that regulate financial institutions and algorithmic trading specifically. Here are some of the recent examples of regulatory directives regarding not only how certain components should behave, but also how they should be tested:

The recent MiFID II/MIFIR regulations that were published circa April 2014.

Best Execution policy (Best-Ex)—The United States has laws prohibiting mutual fund managers from simply transferring a position from one fund to another without going to the market. Accordingly, if a client has sent two orders of opposite sides then they will match against each other first. Therefore, if a trader inside an investment bank is buying a stock and a client sends two orders (e.g., for buying and selling) the same stock to the bank's dark pool, then the client will receive fills for both orders and the trader will NOT execute against either one. This so-called Best-Ex policy guarantees clients are executed against the best price available in the dark pool. In the United States, there are also requirements to wire an order to a better venue if there is a better price there.

Use cases for this category of included, but are not limited to:

Querying the interface for properties of the model; a specification may be provided that includes the type of conditions the system will handle.

Users will write statements about states of the model that will either be proven correct or falsified with a counter example (e.g., a market trace sequence of inputs to the system) that will lead to the resulting violation of the specified condition.

Language used for specifying these statements is the same as for specifying the business logic.

Numerous government agencies around the world have rules and regulations around safety of trading systems. Such requirements can be encoded within an IML framework. An example of such regulations is provided at: www.cftc.gov/ucm/groups/public/@lrfederalregister/documents/file/2013-22185a.pdf A Publishing Engine will produce formal reports describing safety properties of the model and generated test coverage that may be used as discussion points with the regulators.

In one embodiment, Automated Theorem Proving (ATP) applications and methods are used to validate a FCSM constructed based on the rules or logic of the FCS. An example application of ATP to an FCS may involve validation of an exchange's matching logic with respect to regulations or, more generally, verification of Model Verification Properties (MVPs) as discussed above. Furthermore, ATP methods may be used to, as a non-exhaustive list of examples, prove the model satisfies an MVP, construct counter-examples of an MVP (i.e., a set of inputs to the model that violate the MVP) which is also referred to as a Market Event Trace (MET), and construct a suite of non-trivial test cases (sets of inputs and corresponding correct outputs of the model), which may be used to test correctness of the model's implementation. It is important to note that in doing so the Reasoning Engine (RE) may perform an exhaustive logical decomposition of the mathematical axioms generated by compiling the model and isolate nontrivial corner cases. Such a logical decomposition can be done even for systems with enormous state spaces, using sophisticated theorem proving methods that use nontrivial approaches to exploring the entire search space, ranging from fully-automatic CDCL-based SAT and SMT solvers to inductive interactive and automatic theorem provers. Such an approach may be more effective that creating such test cases by hand and randomly generating inputs to the model.

The MET may consist of a sequence of states of the model that exhibit an MVP violation. In addition, an ATP application may be used to prove properties of FCSM, e.g., to prove compliance with regulations (regulatory body, such as ESMA and CFTC, directives/requirements expressed as MVPs using IML), to prove non-existence of violations of internal risk limits, etc. Broadly, MVPs may be classified into categories, exemplified by the following classes of verification queries:

1. Basic risk limit violation: Under what scenarios/model decisions will the model be lead to a violation of specific risk limits/safety conditions? Is it true that such violations can never happen (under suitable hypotheses regarding the values of the inputs to the model)? If it is possible to violate a risk constraint, what values of the inputs will cause this to happen?

2. Advanced risk limit violation: Taking into account your current exposure, is it true that the model cannot make a decision to send an order whose execution will result in violation of position risk limits? If such a decision is possible, under which precise conditions will this occur?

3. Hard quantity limits: Is it true that the model will never generate a market order with quantity greater than specified limit set by the user? If this is not true, then under what conditions can this happen?

4. Message throttling: One of the more significant concerns when designing FCSs is the ability of the system to flood either the network used to transmit the messages or its target (e.g., an SOR sending orders to an exchange) with messages. IML allows its users to verify logic within the model constraining its outbound messages.

5. Non-interference: A model may have numerous inputs and oftentimes it is important to ensure that a certain decision is not subsequently overridden by other logical components of the model.

6. Data Flow Analysis (DFA): the identification of inputs to the model which affect a certain class of decisions. For example, using DFA, one may wish to prove that a client's ID does not affect the success or failure of a trade made by a bank on behalf of the client. That is, that the matching logic is not giving preference to a certain class of clients over another.

7. Regulatory Requirements: This includes numerous other regulatory constraints that may be expressed in IML.

8. Function termination: Verification that the model will always terminate (i.e., the model will result in a new state) and not result in infinite loop/divergence. This important property is crucial when reasoning about iterative or recursive algorithms underlying real-time/low-latency FCS's, among others.

Every value in an IML specification has an associated type. For example, a value may have type int, i.e., it may be an integer. Moreover, users of IML may define their own types. This ability is crucial in the creation of an IML specification. For example, a user may construct a custom type of orders for the matching logic of their exchange. The mechanisms for doing so utilizes the Hindley-Milner type system and allow for the definition of (polymorphic) record types and algebraic datatypes (ADTs). The rich typing provided by IML allow many bugs in FCS's to be caught statically at compile time. When the Reasoning Engine is reasoning about an IML specification, it may translate IML type specifications into the logics of untyped theorem proving systems.

Figure 3:
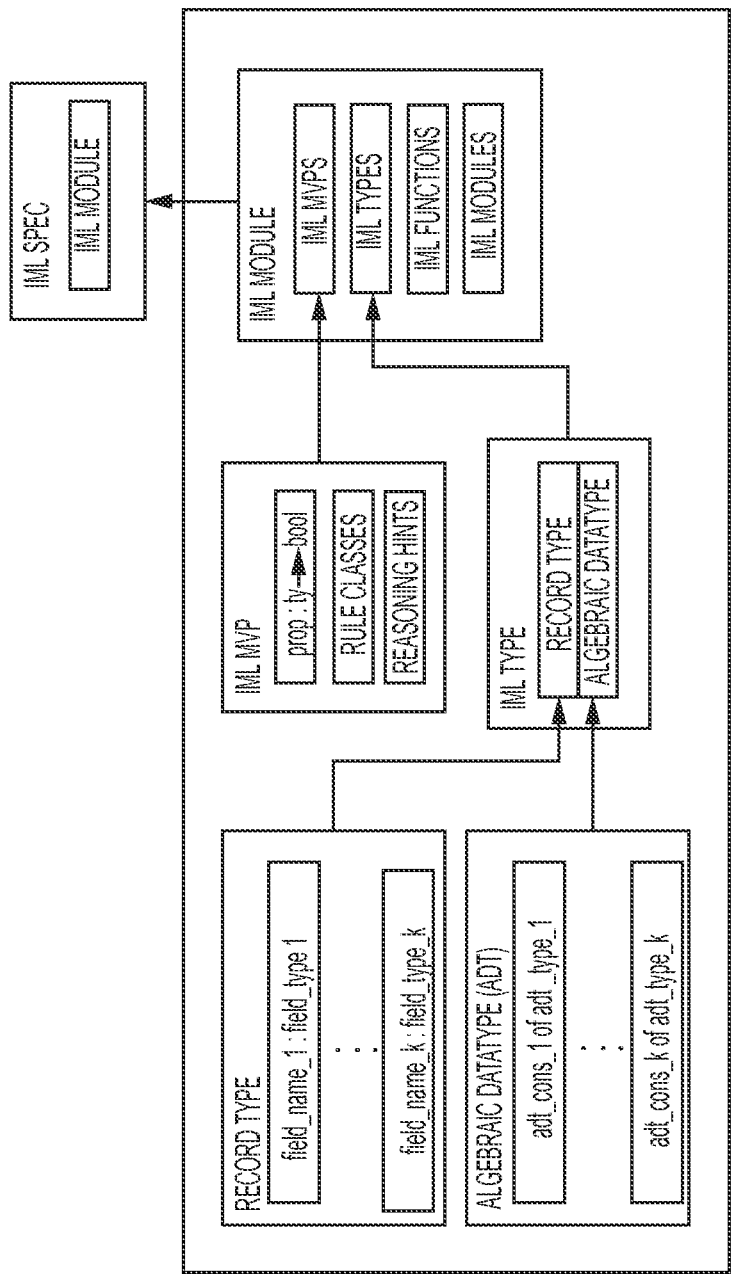
FIG. 3 is a diagram of the translation process for an IML type specification into an untyped theorem proving system according to the present disclosure.

An overview of this translation process is provided FIG. 3. An IML specification, or IML spec 301, consists of a single top-level IML module 303. An IML module 303 consists of a collection of IML MVPs 305, IML type definitions 307, IML function definitions 309, and a collection of IML modules 311. An IML MVP 305 consists of a propositional (e.g., a boolean) function 313 of the form "ty→bool" for some type ty, together with MVP metadata such as "rule classes" 315 and "reasoning hints" 317. The reasoning hints 317 provides details to the reasoning engine regarding how the MVP 305 should be proved and later utilized by the system in subsequent verification efforts. An IML type 307 may be a record type 319 or an Algebraic Data Type (ADT) 321. An IML record type 319 may consists of a collection of field names and their corresponding types and an IML ADT 321 may consist of a collection of constructor names and their corresponding argument types.

Figure 4:
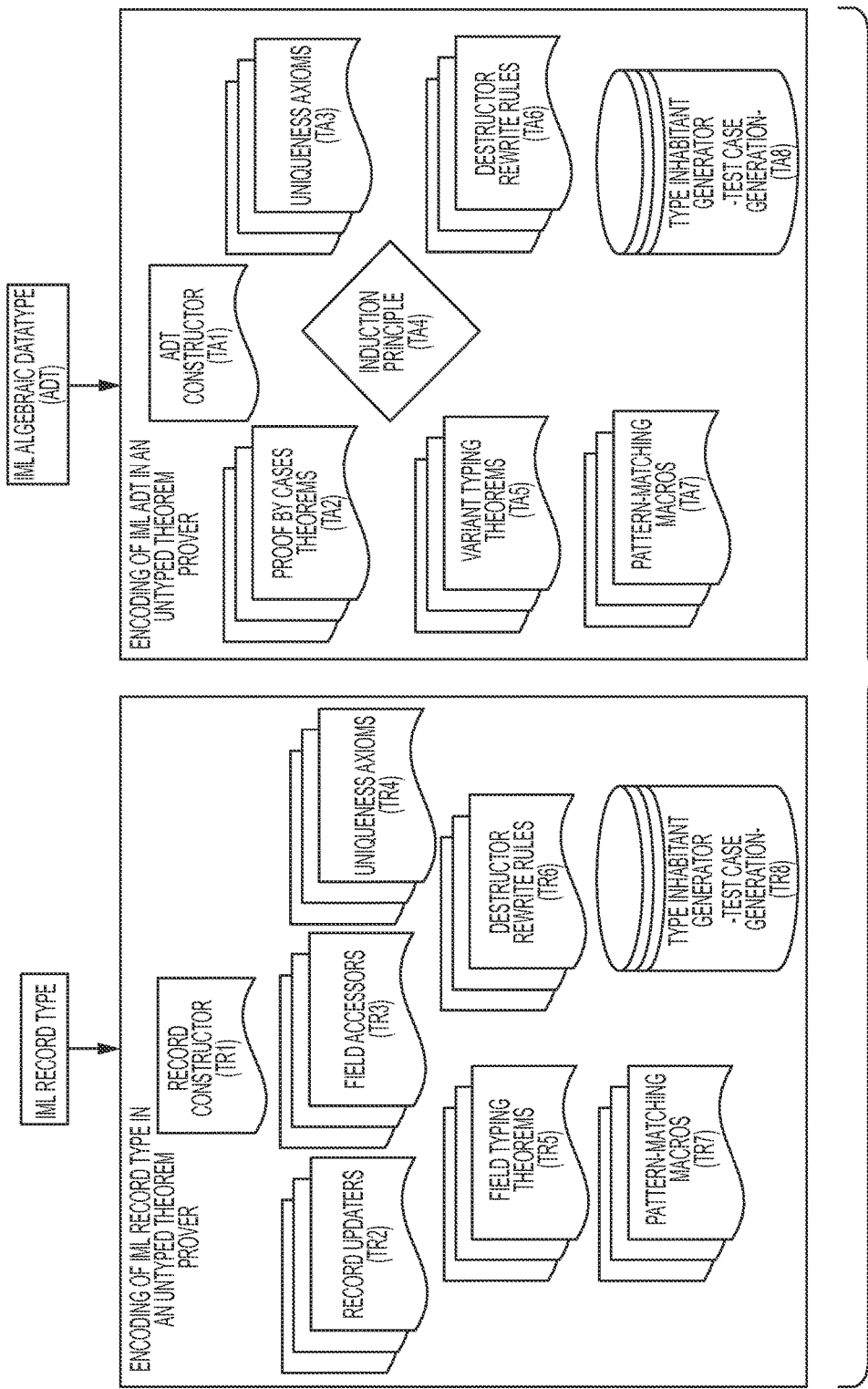
FIG. 4 is a diagram of an overview of the process of encoding the types of an IML specification into an untyped theorem prover according to the present disclosure.

In addition, an overview of the process of encoding types of an IML specification into an untyped theorem prover is provided in FIG. 4. The two cases that are applicable in the example of FIG. 4 are record types 319 and ADTs 321. For a given IML record type 319 "Rec" to be represented in an untyped theorem prover by a predicate "IS_REC", the following functions and theorems are introduced into the untyped theorem prover's logic as shown in FIG. 4:

1. Record Constructor (TR1)—this is a record constructor "MK_REC" which takes as arguments encoded values of all fields contained in Rec and produces a value (MK_REC f_1 . . . f_k) such that (IS_REC (MK_REC f_1 . . . f_k))=TRUE. Furthermore, it must be true that (IS_REC x) will only hold if x can be realized as the value of (MK_REC f_1 . . . f_k) for some field values f_1, . . . , f_k of the appropriate type.

2. Record Updaters (TR2)—this is a collection of record updater functions, which allow one to modify an existing record encoding by specifying a list DIFF of (field_name, field_value) pairs for some (potentially proper) subset of the encoded record's fields. This allows one to succinctly create a new record which is the same as a previously constructed record except for the differences specified in DIFF.

3. Field Accessors (TR3)—this is a collection of record access functions, which allow one to access the value of each of the encoded record's fields.

4. Uniqueness Axioms (TR4)—this is a collection of uniqueness axioms (potentially proved as theorems) which state that (MK_REC f_1 . . . f_k)=(MK_REC g_1 . . . g_k) if and only if f_1=g_1, f_2=g_2, . . . , f_k=g_k. That is, an encoded record is completely specified by the values of its fields, and the logical equality relation of the theorem prover's logic respects this.

5. Field Typing Theorems (TR5)—this is a collection of field typing theorems, which specify that each field in an encoded record satisfies a predicate representing the encoding of the field's type definition. For example, if an IML record is of the form:
{name: string; age: int}
There will then be theorems in the untyped logic of the form (IS_STRING (NAME_OF (MK_REC x y))) and (IS_INT (AGE_OF (MK_REC x y))).

6. Destructor Rewrite Rules (TR6)—this is a collection of destructor rules which specify the fact that in order to prove a theorem for all values X s.t. (IS_REC X)=TRUE, one needs to prove the theorem for all applications of MK_REC to any collection of field values (f_1, . . . , f_k) satisfying the proper field typing predicates.

7. Pattern Matching Macros (TR7)—this is a collection of pattern matching macros which allow one to pattern match over the values of the encoded record in function definitions.

8. Type Inhabitant Generator (TR8)—this is a test-case generator, which is a function GEN_REC which takes a predicate PHI(x) and returns an untyped record value (an application of MK_REC, e.g., (MK_REC A_1 . . . A_k)) such that:
[(IS_REC (MK_REC A_1 . . . A_k)) and PHI(MK_REC A1 . . . AK)]=TRUE, provided such a record value exists.

That is, GEN_REC gives us a method to construct a concrete value of the "record type" that satisfies a given predicate expressed in the logic. This generator is used in test-case generation.

For a given IML ADT to be represented in an untyped theorem prover by a predicate IS_T, the following functions and theorems are introduced into the untyped theorem prover's logic as shown in FIG. 4:

1. ADT Constructors (TA1)—these are functions MK_CONS_1, . . . , MK_CONS_K for each of the K-many constructors of T. For a given constructor C_J of T of the form (C_J:t_1* . . . *t_k→T), the MK_CONS_J constructs an encoding of (C_J (x_1, . . . , x_k)) given encodings of each of the x_i. That is, ENCODE(C_J(x_1, . . . , x_k))=(MK_CONS_J (ENCODE x_1) . . . (ENCODE x_k)). Polymorphic types can be handled using constrained function definitions in the natural way.
2. Proof by Cases Theorems (TA2)—this is a collection of proof by cases theorems. These theorems are of the form 'If X satisfies IS_T, then X is either a CONS_1, a CONS_2, . . . , or a CONS_k, where each of the constructor instances are well-formed.
3. Uniqueness Axioms (TA3)—this is a collection of uniqueness axioms, which are potentially proved as theorems. These state that given any two values X, Y s.t. (IS_T X) and (IS_T Y) are both TRUE, then X=Y if and only if X and Y are both of the form (MK_CONS_N A_1 . . . A_K) for some constructor function MK_CONS_N. That is, values satisfying IS_T are uniquely determined by their construction. Moreover, there are theorems stating that if N!=M, then (MK_CONS_N . . . ) !=(MK_CONS_M . . . ).
4. Induction Principle (TA4)—this is an induction principle for the encoding of T. This is important when T is a recursive ADT. For example, consider the ADT Nat given by:
type nat=Zero|Successor of nat
This gives the type of an encoding of the natural numbers generated by zero and successor. The induction principle generated for the encoding of this type says the following: In order to prove (Forall x:nat. P(x)), it suffices to prove (AND (P ZERO) (IMPLIES (P N) (P (SUCCESSOR N)))). These induction principles can always be generated, as the type definitions according to the present disclosure are always well-founded.
5. Variant Typing Theorems (TA5)—these are theorems that state that if a value X satisfies IS_T, and X was created by some constructor encoding MK_CONS_N, then the arguments given to MK_CONS_N must have been values satisfying the predicates corresponding to their types. Moreover, an X constructed by a MK_CONS_N function whose arguments satisfy their typing predicates always satisfies IS_T.=
6. Destructor Rewrite Rules (TA6)—this is a collection of destructor rules which specify to the theorem prover how to replace the use of destructors (e.g., CAR and CDR in the LIST ADT) by new constant systems and constructors (e.g. CONS) during a proof by induction.
7. Pattern-Matching Macros (TA7)—this is a collection of pattern matching macros which allow one to succinctly write match or case statements which decompose an encoded T value.
8. Type Inhabitant Generator (TA8)—this is a test-case generator, which is an encoded surjection N→T analogous to that described for record types in (TR8) above. It is noted that in the case of finite types, this surjection can never be an injection.

The Reasoning Engine (RE) is a component of the system that may utilize the following methods and technologies in order to reason about the model of an FCS:
- SMT solvers such as Z3, CVC4, Alt-Ergo for counter-example construction and the verification of first-order properties of non-recursive functions;
- Interactive Theorem Provers (ITPs) such as Isabelle/HOL, ACL2, Coq, PVS for reasoning about recursive functions;
- ATPs such as Prover9, E, SPASS for proving theorems involving equational rewriting and mixed-quantifier prefixes; and
- Custom-made theorem proving algorithms that may be particularly suited for proofs by induction.
- Custom-made theorem proving algorithms that may be particularly suited for proofs involving nonlinear (real, complex, and integer) arithmetic.

The Verification (VER) feature provides automatic theorem proving aspects of the system. In various embodiments, the verification component uses various heuristic combinations of ATP and ITP systems, as described previously. Much care must be taken to translate IML MVPs, which involve type definitions and recursively defined functions, into forms that the various theorem-proving systems can handle. For example, some systems are able to reason about untyped terminating recursive functions while others cannot. Furthermore, ATPs such as Prover9, SPASS and E support untyped first-order logic, while others do not. To translate a type-based exchange model into untyped theorem provers, a series of transformations are applied which: (i) introduce predicate and function symbols used to express type-membership and type constructors and (ii) axioms about these type predicates and constructors sufficient for capturing the extensional properties of the type.

Different theorem proving systems have their own strengths and weaknesses. When given an IML MVP, the reasoning engine of the present disclosure can apply heuristic combinations of different theorem proving techniques based upon the structure of the MVP. For example, the ACL2 system has powerful heuristics for automatic proofs by induction, and may be preferred for proving a first-order property of a recursively defined function.

Other ATP languages or systems, or combinations thereof, such as Z3 and Isabelle/HOL, may be used by the Verification (VER) feature for encoding the FCSM for theorem proving according to the respective benefits of each. For instance, Z3 is a SMT solver by Microsoft that is better equipped for providing counter-examples for sequences of market event traces (MET), whereas ITPs such as Isabelle/HOL and PVS are better equipped for recursive function proving. More information about the Z3 theorem prover can be found at z3.codeplex.com. Isabelle/HOL can be used to interactively discharge higher-order MVPs, that is, MVPs expressed in IML using higher-order function such as IML (and OCaml/Standard MLs) List.map and List.fold right functions.

The FCSME provides an axiomatized library of building blocks (also referred to as IML modules) for constructing FCSMs. These building blocks consist of both executable code and theorem proving machinery for building and reasoning about FCSs. Among others, functionality provided by the FCSME includes techniques for defining, manipulating, executing and reasoning about, for example:

Currencies;
Real-time messaging between FCSs (using, e.g., FIX protocol);
Orders;
Order Books;
Client and client groups;
State and state management;
Risk metrics (delta, gamma, sector/country exposures, etc.); and
Structured products (e.g. financial derivative products).

The FCSME can be seen as a generic environment for building and reasoning about FCSMs, which may be considered to be analogous in some way to a software library or platform. With the FCSME, FCSMs can be rapidly prototyped, executed and reasoned about using a theorem prover. In addition to its role as a platform for rapidly developing and reasoning about custom FCSMs, the FCSME contains generic versions of many common FCSs such as Exchanges and Smart Order Router components written in IML. For example, given a general Exchange model, a user can extend the model with customized matching logic (e.g., a custom FCSMS) according to the present disclosure and obtain an axiomatized and executable model of a particular exchange. Among many other possible uses, one can then use the Reasoning Engine to reason about this exchange's matching logic, for instance, to prove that its matching logic satisfies various regulations.

According to a preferred embodiment, a distinction between the FCSMS and the FCSME may be made based on the way the logic of the trading platform is separated. FCS. At step 1002, the modeler 101 specifies aspects of the FCS that the modeler desires to model via the FCSMS editor 207 of the GUI 200 to generate the FCSMS 301 for the exchange. The FCSMS 301 combined with the FCSME 303 yields the FCSM at step 1004. The model code, as described herein, can be a code file in a type-system based language that is both a programming language and a logical language, such as IML. As such, at step 1006, the file code can be compiled into an executable that acts as simulator to simulate the operation of the FCS at step 1008. That way, a production version of the FCS can be compared to the simulator to analyze the performance of the production version. Additionally or alternatively, the Reasoning Engine can compile the FCSM to generate the collection of axioms that model the FCS mathematically at step 1010. This process utilizes the precise mathematical semantics of the file code language, e.g., the axiomatic operational semantics of IML, to translate the IML model code into a collection of axioms which precisely describe the logical behavior of the FCS. At step 1012, those mathematic axioms can be analyzed to assess the operation of the FCS. For example, satisfaction (or nonsatisfaction) of a MVP can be demonstrated, counter-examples can be generated, test suites can be generated, state reachability analysis can be performed, etc., as explained herein.

Software code regarding an example IML exchange model extending a generic exchange and then reasoning about it is provided as follows:

```
type order = { order_id : int;
               order_type : order_type;
               order_qty : int;
               hidden_liquidity : bool;
               max_visible_qty : int;
               display_qty : int;
               replenish_qty : int;
               order_price : price;
               order_time : time;
               order_src : client;
               order_attr : order_attr};;
let order_higher_ranked_long (o1, o2) =
    if o1.order_type = o2.order_type then
        (o1.order_price >= o2.order_price || (o1.order_price = o2.order_price && o1.order_time <= o2.order_time))
    else (o1.order_type = Market && o2.order_type = Limit);;
let order_higher_ranked_short (o1, o2) =
    if o1.order_type = o2.order_type then
        (o1.order_price <= o2.order_price
         || (o1.order_price = o2.order_price && o1.order_time <= o2.order_time))
    else (o1.order_type = Market && o2.order_type = Limit);;
let o_l, o_s = order_higher_ranked_long, order_higher_ranked_short;;
module MyExchange = GenericExchange(order_type = order, order_ranking = (o_l, o_s));;
MyExchange.simulate ( );;
theorem ohrl_transitive (o1, o2, o3) =
    (order_higher_ranked_long (o1, o2) && order_higher_ranked_long (o2, o3))
        ==> (order_higher_ranked_long (o1, o3));;
theorem ohrl_reflexive (o1) = order_higher_ranked_long (o1, o1);;
```

Accordingly, in various embodiments, the FCSME augments the FCSMS with an axiomatic foundation enabling Imandra to reason about FCSMS. For example, the FCSM may introduce a special type of order into a model that extends a general type of orders axiomatized within the FCSME. The FCSME 303 can provide theorems about a specific trading platform described in the FCSMS, and there are also theorems that are general, that apply to any machine, or any trading platform.

Figure 23:
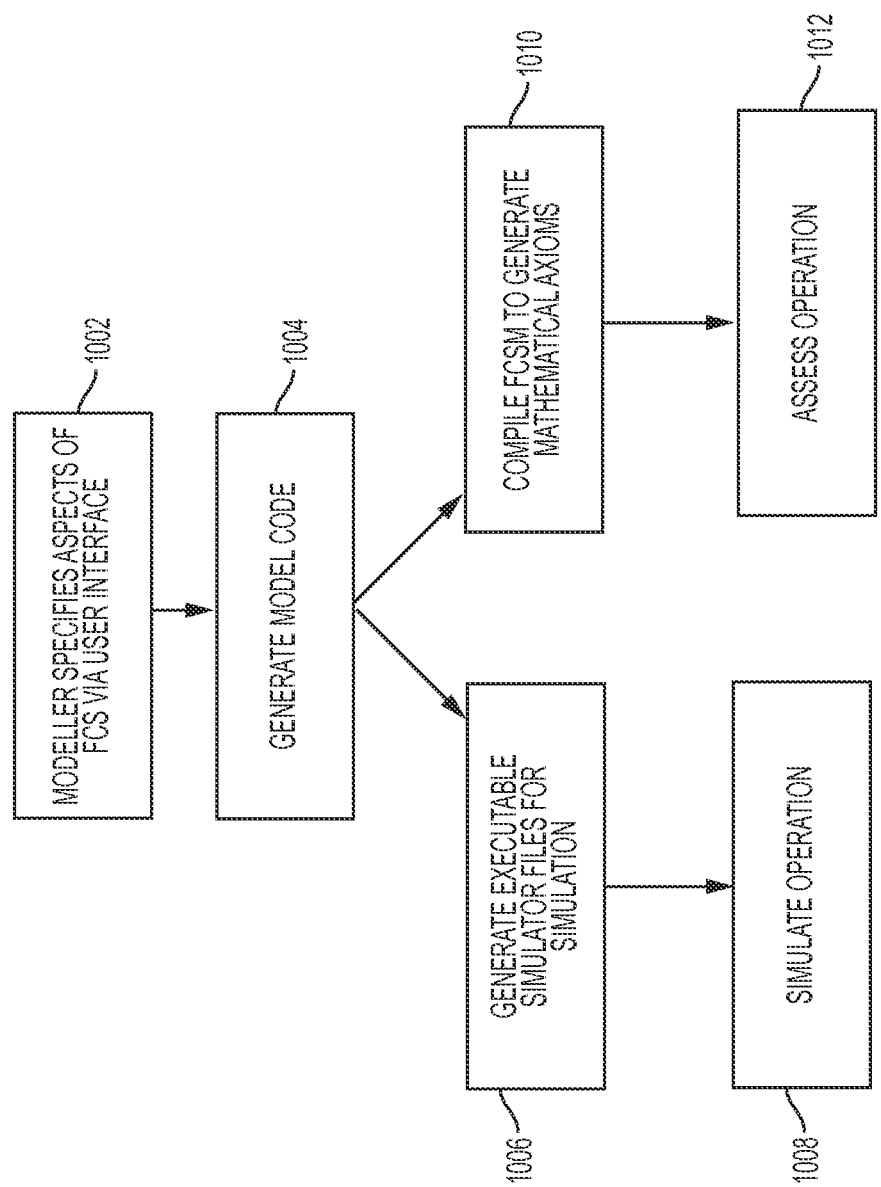
FIG. 23 is a flowchart of a process flow of the system of FIGS. 1-1c according to various embodiments of the present disclosure.

FIG. 23 is a flowchart illustrating how the system 100 may operate for to simulate and/or assess the operation of a It is noted that both theorems shown above are proved automatically by Imandra.

The Simulation (SIM) feature of the models written in IML is one of the fundamental differences between Imandra and many other ATP based systems in which users may not directly execute their models but instead only prove their properties. One of the benefits of using IML is its lack of ambiguity because the specification is both an executable simulator and a precise mathematical object which may be shared with numerous users so they may query it for specific functionality. For example, in the context of exchanges designers of SOR systems may download publicly available specifications of exchange models and use them within their development/design process to have a more thorough understanding of their systems' interactions with the corresponding venues/exchanges.

The Reasoning Engine (RE) utilizes numerous algorithms and ATP systems to verify MVPs for the corresponding FCSMs. The Verification (VER) feature of IML allows the system to provide verification objects for the proven MVPs in such a way that they are not disclosing key IP of the underlying system. This is critical in financial services industry because the ultimate design and implementation of models/systems are typically closely guarded secrets of the firms. At the same time, financial firms are tasked with demonstrating a systems' safety in a transparent manner. The section below describing interactions of regulators and exchange firms showcases how IML solves this problem of disclosing just the right information about the system without compromising its secrets.

The Counter Example Generation (CEG) feature is associated with VER described above. In cases where IML cannot verify a MVP, it will work to produce a counterexample to highlight inconsistencies between formulation of the model and the corresponding MVP.

The State Reachability Analysis (SRA) feature has two primary applications:
1. FCS Models: dealing with transition functions and state definitions of an FCS model encoded in IML and answering questions regarding potential state changes of the model based on current state and real-time messages (inputs and outputs) sent & received by the production environment instantiation of the model implementation
2. Risk management: designed to analyze effects of market events and potential executions of outstanding exposures (orders, quotes, etc.) to the current positions and corresponding risk metrics (delta/gamma of the book, P&L, etc.) of securities whose payoff functions are encoded in IML.

In various embodiments, a Deep Risk Analysis (DRA) will utilize SRA (discussed in more detail below) to perform live risk analysis on any decision-making component of a trading infrastructure based on the information received, such as, for example its model specification written in IML, current state of the system (for exchanges, this may include current orders within the order book), and any out/in-bound messages via a protocol similar to FIX. Reachability checks can be performed to determine if the current state is undesired is or there exists a MET (sequence of potential market events) that may lead the system from its current to undesired state. The user will be able to encode conditions specifying whether certain states are undesired. Such questions about potential states of the system may be encoded as queries to Imandra and the system will conduct live monitoring by analyzing the message traffic to and from the FCS implementation of the model. Because such calculations may be computationally intensive, Imandra may perform offline pre-caching of certain scenarios so as to optimize its live performance. The conditions or queries specifying potential states to monitor for may be described in different levels of abstraction.

Alternatively, when this method is applied to risk management (such as, for example, an application at a trading desk of a bank) the state represents current positions or holdings, and any outbound exposures. Exposure is a general term representing any order sent via a trading platform, an order sent to a broker as a FIX message, Indication of Interest (IOI) sent to a client via Bloomberg system, etc. Exposure corresponds to a potential transaction between the bank and another counterparty whether on an agency or principal basis. Outstanding exposures (orders submitted, etc.) are sometimes also referred to as part of broader class of events that may cause the state of the model to change—state transition functions. Whereas an FCSM specification in IML described precise transition functions for state of the FCS, here exposures encode potential transition functions, which may include changes in position holdings and associated risk metrics.

The following diagram illustrates split between Imandra's offline and online computations enabling Deep Risk Analysis (specific application of State Reachability Analysis feature of Imandra). Left-hand side of the diagram represents Imandra's offline computations where it combines its knowledge of the models of the systems involved and user-specified Deep Risk Queries (DRQ) to compute (or effectively, pre-cache) Sufficient Conditions (SF) that contain non-trivial results of abductions of the risk queries and corresponding models. On the right-hand side, SF's are then transformed into Live Risk Queries (LRQ) within the online element of Imandra which contain easy-to-execute (major constraint of the ONLINE component is time to perform such calculations) queries about the state of the model. If the system detects a violation of LQR's, it emits a risk alert (RTRA) to the users.

The Test Case Generation (TCG) feature represents IML's ability to decompose FCSMs into their logical structures and perform deep analysis of the model and identification of non-trivial corner-cases of the functionality.

Figure 5:
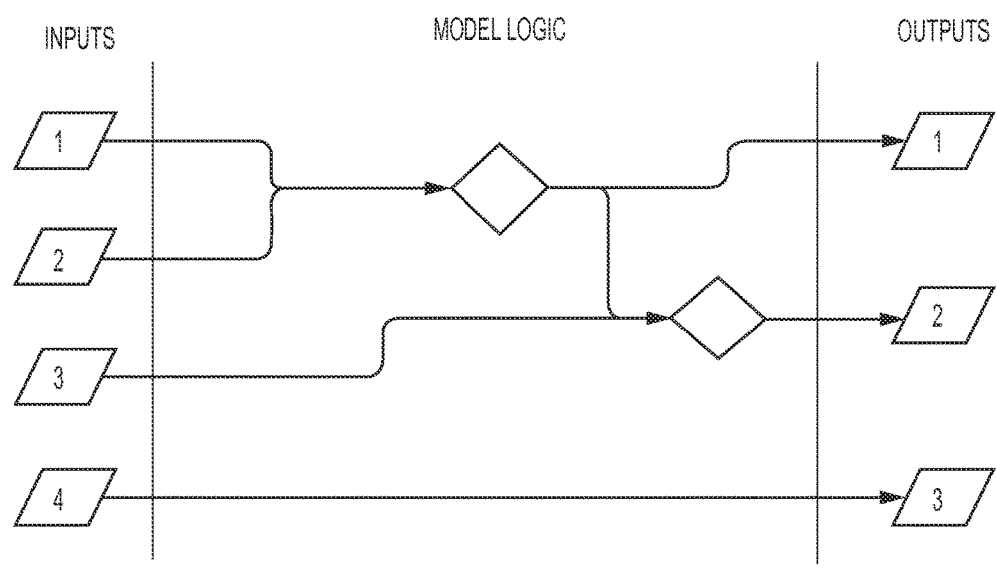
FIG. 5 is a diagram that illustrates a dataflow analysis of a model according to the present disclosure.
Figure 6:
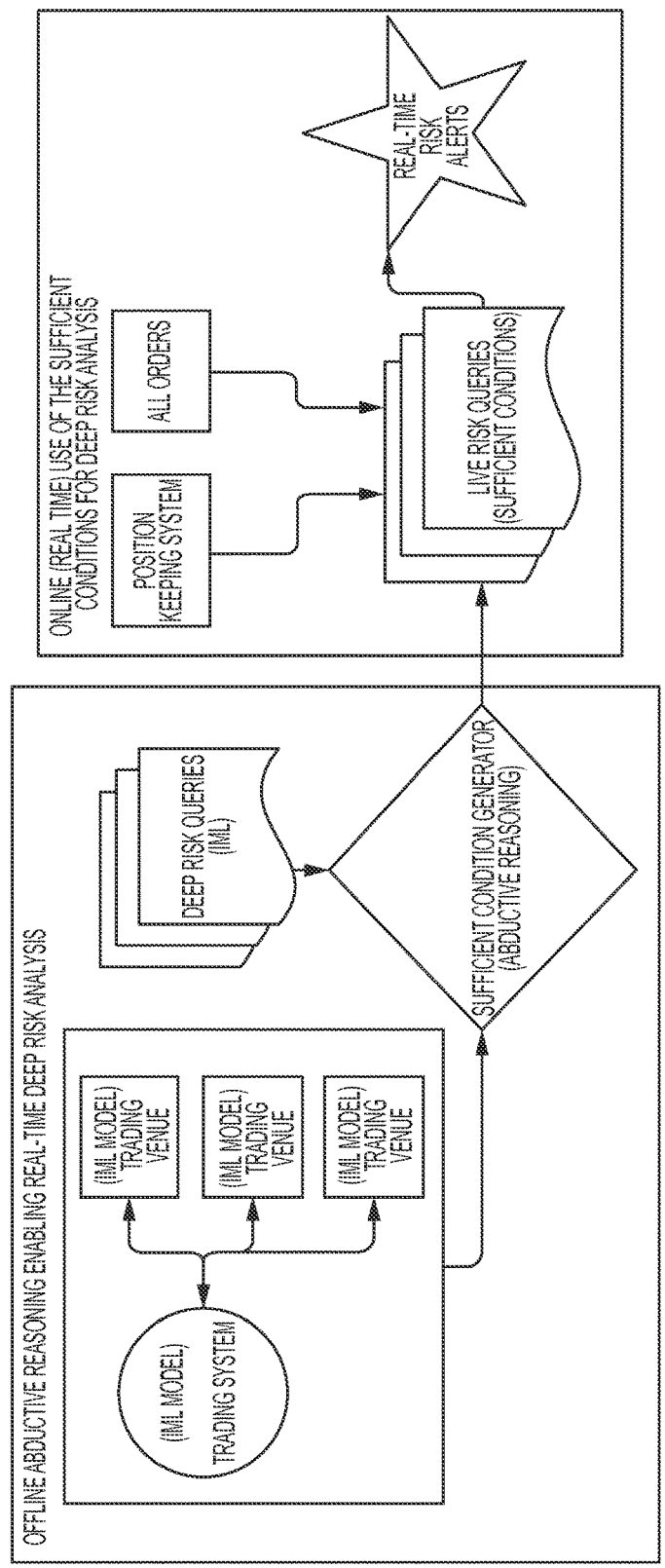
FIG. 6 is a diagram that illustrates a system according to the present disclosure that implements online and offline Deep Risk Analysis.

The Dataflow Analysis (DFA) is illustrated based on FIG. 5. As shown in FIG. 5, a model 500 includes 4 inputs and 3 outputs with logic transforming inputs into outputs. In the case of such model, DFA may perform the following:
Prove that a certain input value is not used in assigning value to a certain output. In this case, DFA will prove that input 4 is not used to generate value for output 2; and
Prove that a certain input value is used in assigning value to a certain output. For example, input 2 is used to compute output 1 value.

Such functionality has tremendous applications with FCSs due to numerous potential conflicts of interest inherently present within businesses running them. For example, from the perspective of a dark pool designer/operator it is important to prove to clients and regulators that client ID is not used within the matching engine to prioritize one category of clients of a dark pool against another. One concern that regulators have, stemming from recent revelations by Barclays, is whether internal clients (i.e. desks trading for internal accounts of the bank) are prioritized by the matching logic. So in a typical scenario, orders would have what is referred to as "price/time" priority during matching with orders from the opposite side. The concern regulators have is whether the matching logic is implemented using price/client category/time priority whereby internal orders are prioritized ahead of the other orders even though there might be older orders on the same price level.

The Command Line Interface (CLI) provides users with ability to interact with Imandra via a command line.

Imandra stands at the intersection of multiple disciplines (modeling, development and compliance) required to design and deliver a financial computing system (FCS) into a production environment. The Report Generator interface provides a user-friendly and non-technical interface to generate a thorough report concerning different properties of the FCSM including:

Lists and descriptions of the various MVPs associated with FCSM along with their statuses (e.g., proved or disproved with MET);

summary of the test suite coverage and system testing results; and specially marked comments and annotations made within the IML source code of the FCSM (made via special directives within IML which allow users to embed annotations of the code of the model and have it be included within generated reports).

Such reports may be used as discussion points between regulators and compliance personnel.

The Deep Risk Analysis (DRA) feature is designed to answer a question constantly raised within the context financial firms: "What can possibly go wrong?" This is a direct application of State Reachability Analysis (SRA) feature of Imandra to perform analysis of model states and risk management:

Provide real-time alerts for inconsistencies in system states: compare messages to/from the production system (new orders, fills, order book snapshots, etc.) and verify that correspond to valid state transitions; that is, to verify that the production system is actually conforming to the behavior described in its formal IML model (FCSM)

Perform reachability analysis: Analyze whether user described states may be reached from the current state (i.e., the system is listening to all current outgoing orders to the exchange and confirms that no market events may result in simultaneously filling certain notional)

There are two specific examples of DRA as it is applied to market risk management in the sections below.

The Test Suite Generator (TSG) interface exposes the ability of Imandra to generate test cases in a user-friendly and seamless fashion. There are many use cases for such functionality including, but not limited to:

Developers will request Imandra to automatically auto-generate test coverage when the model is changed (see CIEI below);

Users may wish to target a specific property (MVP) for which to generate test cases; and FCS designers may want to generate sample tests in the form of MET (in FIX format) to distribute to developers of systems it will interact with. For example, exchanges such as the LSE distribute such test cases to its clients so they may test connectivity prior to going "live".

The Source Code/Executable Generator (SCEG) interface allows users to convert IML specifications of their models into numerous other target languages. For some users, such feature would simplify their integration of the model with other components of the FCS. As mentioned before, there are several ways Imandra may translate the model:

Implementation in a different language (C++, Scala, etc.).

An executable binary or a library that can be invoked by other systems (production environments, tools such as Matlab, etc.).

The Continuous Integration Environment Interface (CIEI) seamlessly integrates Imandra within CIE: for example, one feature would automatically invoke auto-generation (with previously specified requirements) of the test-suite when Imandra detects that users may have edited components of the model. Imandra will also provide detailed analysis of any 'broken' tests (cases where implementation of the model is not matching expected test case outputs) pinpointing the logic that may be responsible for the error.

The Interactive Development Environment Interface (IDEI) exposes all of the core features of Imandra to the user via the GUI.

In yet a further aspect, the present invention is directed to computer-based systems and methods for modeling a financial computing system (e.g., exchanges or dark pools) by encoding a complete specification of its matching logic using a language/state representation.

"Matching logic" may include any or all of the following type of information about design of an exchange or a dark pool:

Different types of instruments that may be traded on it such as International Bonds, Swiss and International Equities, Investments Funds, etc.

Different order types that it supports and their specifics, such as an:

STI Order—this supports automatic deletion function, but only during a post-trading period.

CTI Order—this cannot be entered during the Post-Trading phase, but STI Order and CTI Quote can be.

Trading periods—such as, for example, Pre-opening, Opening, Continuous Trading, Closing (without auction), and Closing (with auction).

Market Model descriptions such as the following from the Swiss SIX Trading Guide:

Central Limit Order Book (CLOB):

Quotes in the CLOB model are treated as limit orders, i.e. the same matching rules apply whether a limit price in the order book results from the entry of a limit order or of a quote.

A new trade price must be better.

Market Maker Book (MMB):

Incoming Quotes match at the Quote price or at the best remaining limit in case of surplus on the other side (Quote-based price determination)

If an incoming Order can match but there is no Quote on the opposite side in the book, then a Stop Trading condition exists. The Stop Trading Condition can be terminated before the time lapses, if a Quote is entered in the book, or by Market Operations.

Market Maker Book—Fill or Kill (MMB-FoK):

All incoming Orders must be either fully matched, with each partial execution at or above the minimum denomination, or are rejected. Orders are not entered in the book.

Remaining Quotes with sizes below the minimum denomination are automatically deleted.

Global matching principles such as the following from the Swiss SIX Trading Guide:

Price-Time Priority:

Before matching, orders (not in MMB-FoK) and quotes on each of the book are ordered in price-time priority, regardless of which type of matching is being executed.

Best price to worst price (price priority):

Buy: market orders followed by limit orders and/or quotes (highest limit to lowest limit)

Sell: market orders followed by limit orders and/or quotes (lowest limit to highest limit)

In Auctions "Principle of highest volume transacted" is used: according to the principle of highest volume transacted, exchange prices must be determined such that the highest possible volume of shares will change hands. After the orders and/or quotes have been entered into the order book and matched, the exchange system determines the price that will maximize the turnover.

IML is designed to encode every aspect of 'Trading Guide' documents such as that given by the Swiss Six Exchange—www.scoach.ch/MediaLibrary/Document2/guide-order-book-trading-swxess-neuen.pdf. Among many other aspects, IML can then be used to reason about the matching logic, e.g., to prove that it adheres to broad classes of regulations.

Numerous factors affect the process of modeling and developing an FCS system. Three categories of factors are outlined below:

Such systems should be resilient, meet the specification, and be compliant to internal and external constraints;

Such systems should be integrated with other systems. In an example presented below, an SOR has built-in logic to handle specifics of exchange.

Such systems should allow users to prove to regulators that the two points above are true and that a process is in place whereby any changes to a system undergo rigorous testing. Furthermore, when new changes are released into a production environment, financial firms may have to prove that the new version is correct with respect to a class of regulatory requirements.

It is important to note, implementations of such FCS's are generally thought of as highly-guarded IP of a respective financial firm. This highlights one of the greatest challenges to ensuring that infrastructure underlying the financial markets is resilient: understanding and managing risk of the systems without having access to proprietary code underlying them. The present disclosure provides a natural solution to such a dilemma. It uses the power of formal methods to bring transparency to complex systems without jeopardizing proprietary information. For example, reports describing the results of ATP-based Verification of Safety Conditions (VSC) of FCS's performed by the present disclosure can be given to regulators (using, for example, the Report Generator), and regulators can consult these reports generated for a plurality of metrics regarding the safety and compliance of the FCS. All of this can be done without the regulator needing access to the proprietary source code of the FCS, which then allows the financial firm to keep this source code fully in-house.

Figure 7:
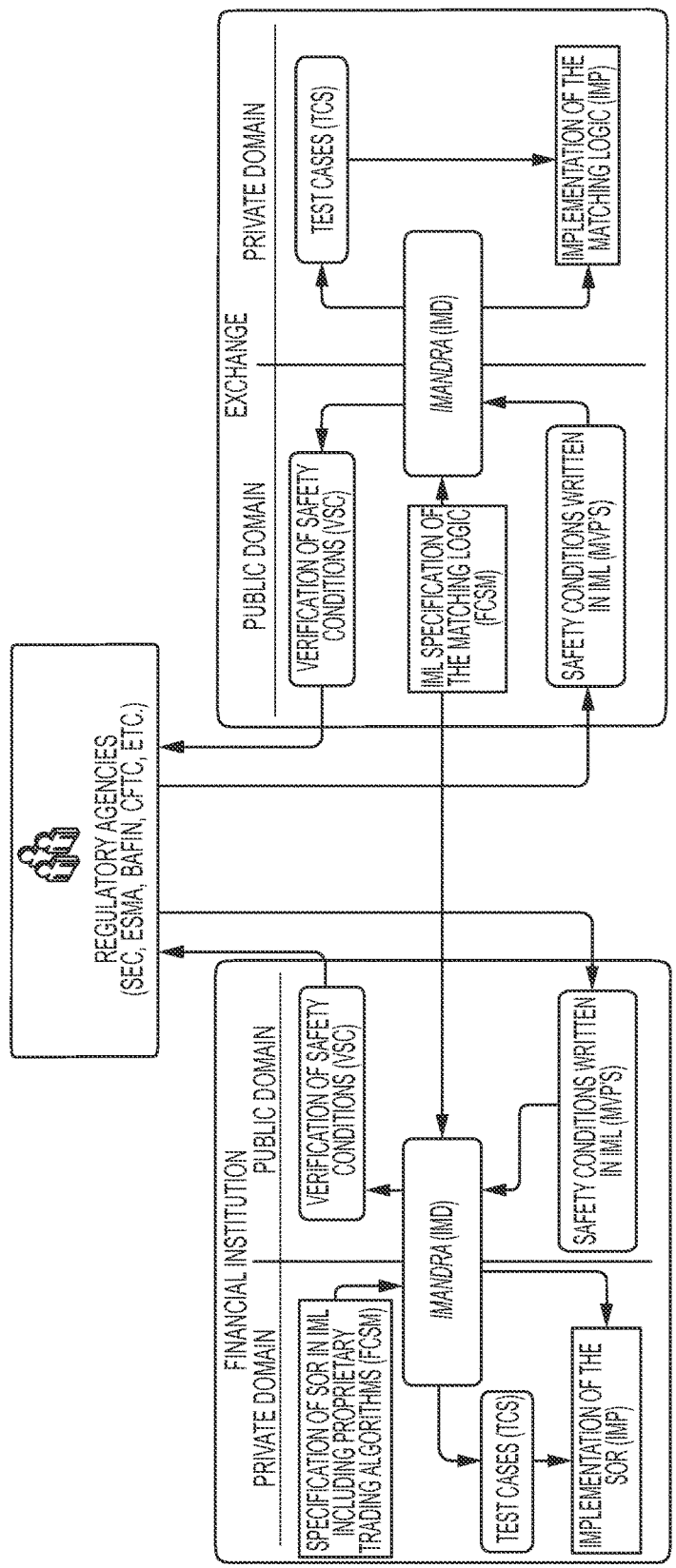
FIG. 7 is a diagram of information flow between stakeholders using a system for modeling and verifying trading venues according to the present disclosure.

As illustrated in FIG. 7, a financial firm may have a SOR responsible for submission and management of orders to/on an exchange. The exchange implements a matching logic and the specification of the matching logic is provided in IML and shared with both a financial firm and regulators. The exchange may also have published reports showcasing the Verification of Safety Conditions (VSC) covering a wide range of safety, fairness and compliance issues. An IML specification of the matching logic provides unparalleled precision of the mechanics of the algorithm to designers and developers of the SOR. It's important to note that while the IML specification of the matching logic is within the public domain in this use case, its actual implementation is still a corporate secret of the exchange. The exchange is simply required to adhere to a process whereby the IML specification of the model and the test suite generated by Imandra are run against any changes to a production environment, validating the faithfulness of the model of the exchange to the production system, and verifying changes to the production system are consistent with the model. Most recent regulatory directives have explicit mention of rigorous testing procedures. Such documents however do not mention specifically how such test cases should be created and how one might judge whether test suite coverage is sufficient. By performing deep analysis using formal methods, Imandra is able to generate non-trivial test cases that deeply and exhaustively explore the model with respect to the MVPs of interest. In general, it is not possible for test engineers to match such coverage by the manual generation of test cases by hand. Moreover, as described above, Imandra may generate reports about such test coverage for compliance officers to share with the regulators, for example. It should be noted that as the terms "Imandra" and/or "IMD" are used herein, they describe a system, device, or function that implements IML. While other languages that include a type system could be used in accordance with the present disclosure, Imandra and/or IMD are referred to throughout in exemplary embodiments.

Similarly, regulators may be concerned about safety and risk constraints of an SOR. Some of the potential (as reported in recent news reports regarding "technical glitches" in trading systems) include:

submission of overly aggressive orders due to incorrectly specified limit price;

duplicate submission of orders;

frequency of order submission/update messages (i.e. maximum message rates); and submission of orders with considerable size.

Also as shown in FIG. 7, the present disclosure enables a financial firm to submit Verification of Safety Conditions (VSC) to the regulators without revealing the specifics of the proprietary algorithms and their implementation within the SOR. It's important to note that because the exchange makes the matching logic specification, in IML, available to all system developers that interact with it, there is no ambiguity about how the exchange will handle order submissions and other messages coming from the SOR. This is a novel approach to modeling and building FCS systems, such as an SOR. For example, one MVP may validate whether pressing a "Power Off Button" will lead to cancelling all outstanding orders on the exchange. Certain order types, such as "volatile" orders as they are called in the Swiss SIX exchange, may support "mass cancellation" functions. In that case, one specific message will cancel all quotes/orders of a specific type or with certain attributes, which an SOR had submitted. The algorithm within the SOR may depend on such functionality, but there is no guarantee that the exchange cannot modify its matching engine without first getting the SOR developers to modify the logic in question. Such dependencies and assumptions by designers may be dangerous, especially overlaid with typical noise of development process, and can lead to expensive technical glitches. By running Imandra on the SOR IML specification combined with the exchange matching logic IML specification, users may obtain a holistic view of the SOR and its risks.

In addition to proving or disproving MVPs, for example, through the construction of Market Event Traces, and generating test suites from the IML specification, Imandra may also generate executable binary files and source code in other languages that may be used directly within the development process.

The simulation feature described above provides for synthetic order book simulation by allowing users to run a model with simulated order submissions through a plug-in to a database containing historical market data. Most often, exchanges will maintain Trade And Quote (TAQ) data so the simulation process would have to transform TAQ data into a sequence of messages, for example, order submission, amendment and outright messages to the exchange. Such messages would then be used to simulate the IML model. This feature allows designers to thoroughly test their entire framework; from order submission and management of outstanding orders to high-level strategy performance. It should be noted that the term "historical data", as used in the context of a Historical Exchange Simulator (HES), refers to historical order/quote submissions, quotes, executions, cancellations and other attributes of a state of an exchange.

The purpose of the HES is to provide trading systems with ability to simulate their historical performance by taking into account specific microstructure effects of the venues where their orders are executed. Imandra simplifies the process of re-creating the historical states of the order book. Because IML specification of matching logic is precise and can be stored (e.g., exchange matching rules may change, including support for different order types) in a medium such as a database. It's straightforward for Imandra to convert such IML specification into an executable or representation in another programming language and use in conjunction with historical data.

Figure 8:
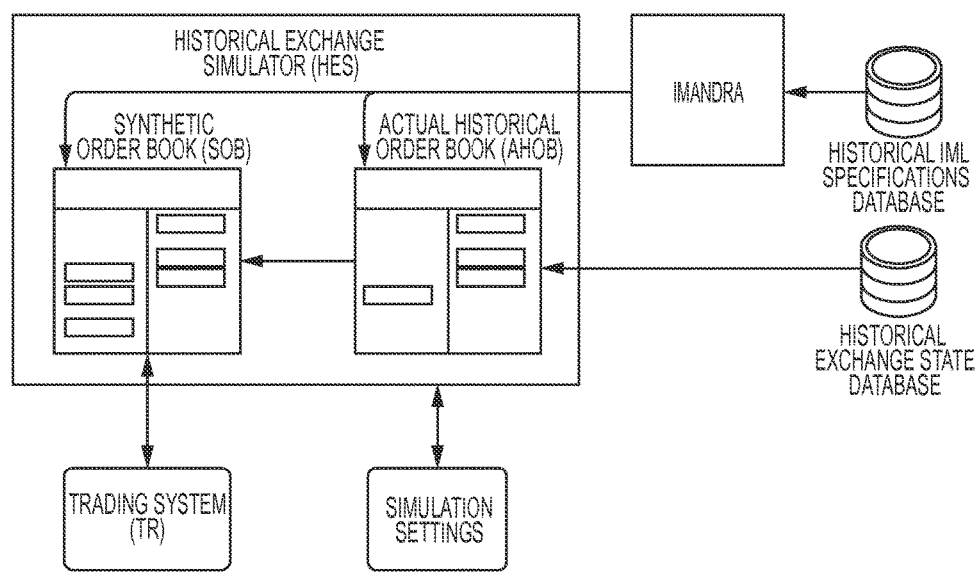
FIG. 8 is a diagram of a Historical Exchange Simulator according to the present disclosure.

With reference to FIG. 8, the roles of the two order books may be described as follows:

Historic Order Book (AHOB)—contains the historical state of the order-book.

Synthetic Order Book (SOB)—represents order book containing both, elements of the actual historical data (from AHOB) and orders submitted by the trading system (TR) Both of these elements, AHOB and SOB, are generated (whether as a source code or in executable binary format) by Imandra from retrieved IML specifications.

With further reference to FIG. 8, the HES is responsible for the following:

fetching historical data (executing queries against the Historical Exchange State Database to retrieve trades, quotes and other exchange messages) and historical IML specifications for the specified date/time range (as set within Simulation Settings)

instantiating (creating) the two order books: while their states (orders, trading periods, etc.) may differ because SOB interacts with the trading system (TR), they have the same specification (types)

synchronization of historical state 'playback' and order/quote submission (and other types of messages such as order cancellations) from the Trading System (TR).

executing logic to maintain 'deltas' of the SOB vs AHOB—record of differences (resulting from executions from orders/quotes from TR) between SOB and AHOB Further, U.S. Patent Application Publication No. 2008/0243572 describes a system that implements simulation of an exchange using historical data and is incorporated by reference herein in its entirety.

Figure 10:
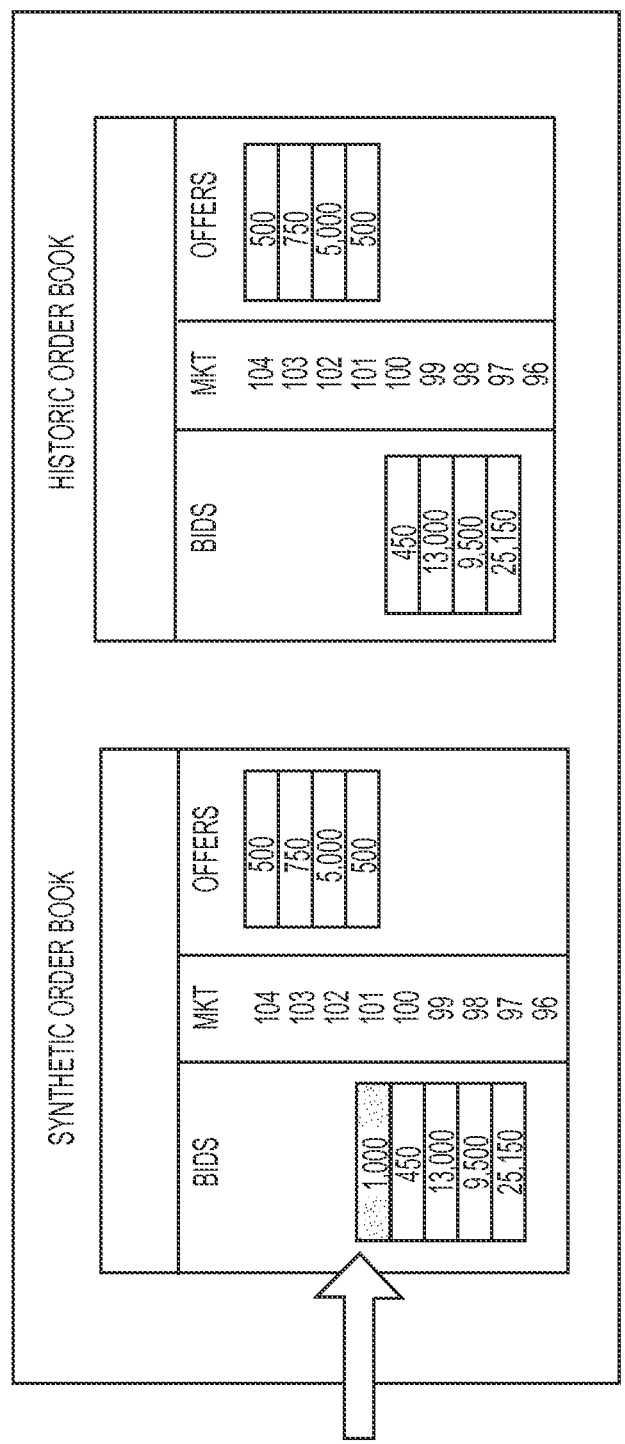
FIG. 10 is diagram illustrating the historical exchange simulation of FIG. 9.
Figure 11:
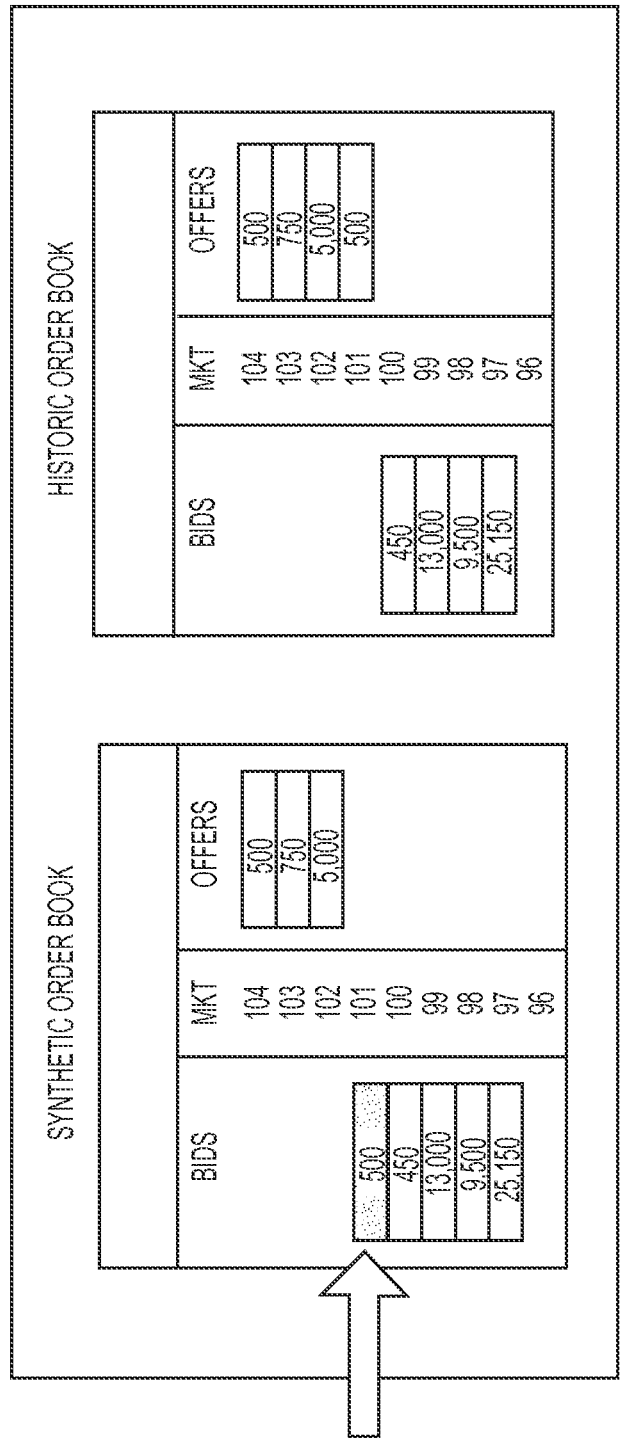
FIG. 11 is diagram illustrating the historical exchange simulation of FIG. 9.
Figure 12:
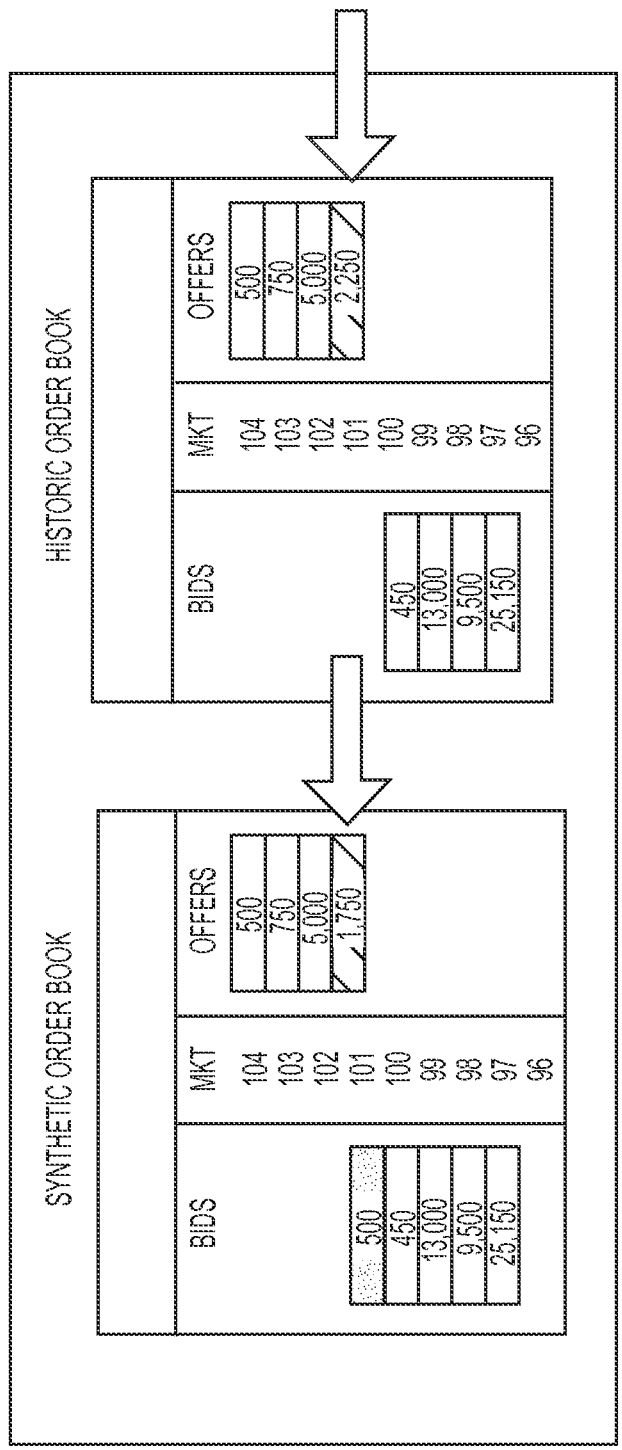
FIG. 12 is diagram illustrating the historical exchange simulation of FIG. 9.
Figure 13:
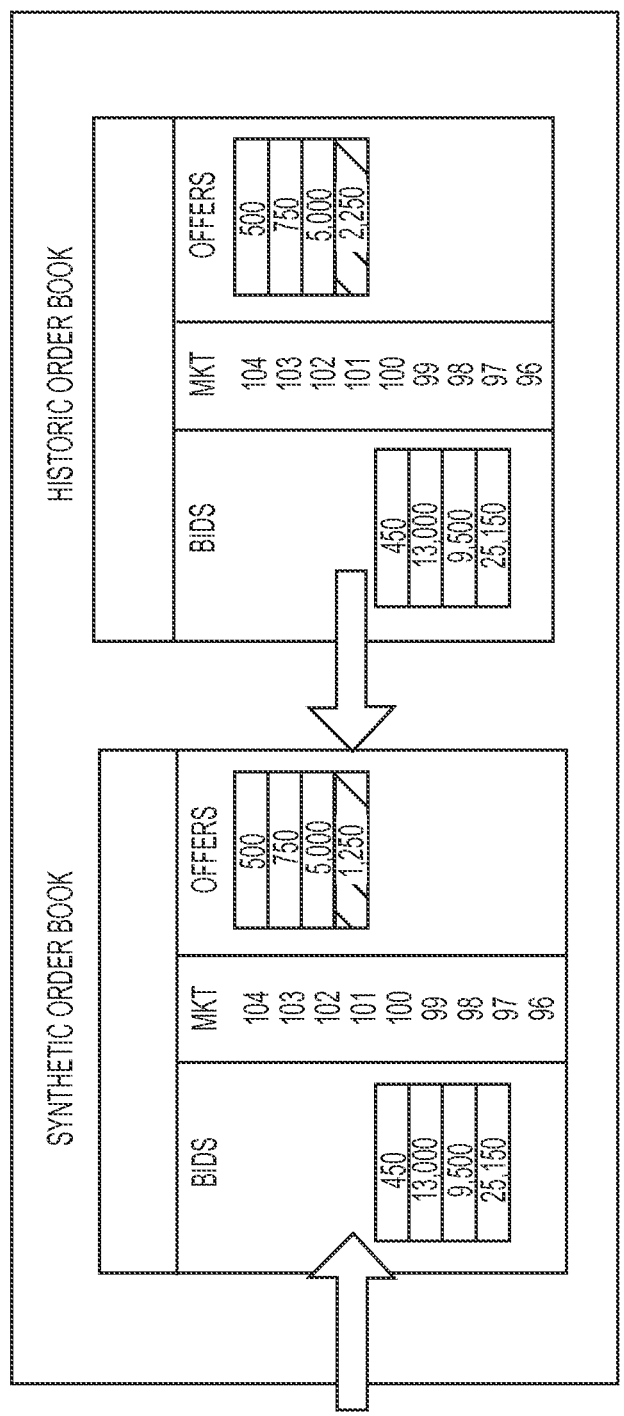
FIG. 13 is diagram illustrating the historical exchange simulation of FIG. 9.

FIGS. 9-13 provide an example of a HES using a AHOB and an SOB. The example of FIGS. 9-13 omits references to logic that maintains "deltas", or records of differences between AHOB and SOB resulting from executions of orders from the Trading System (TR), and performs data playback synchronization. As shown in FIG. 9, initially, the two order books are equivalent such that both contain exactly the same orders/quotes. In FIG. 10, the TR submits an order to 'Buy 1,000 shares at 101'. The order is displayed within the Synthetic Order Book. As illustrated in FIG. 11, the incoming order is eligible to trade against the best offer available 'Sell 500 shares at 101' and an execution occurs (with a fill sent back to the TR). The order book is updated to reflect the execution. As shown in FIG. 12, a new historic order is inserted into the HOB and immediately reflected in the SOB. Following this, as shown in FIG. 13, the new order is matched against residual quantity of TRs order that remained in the SOB.

Figure 14:
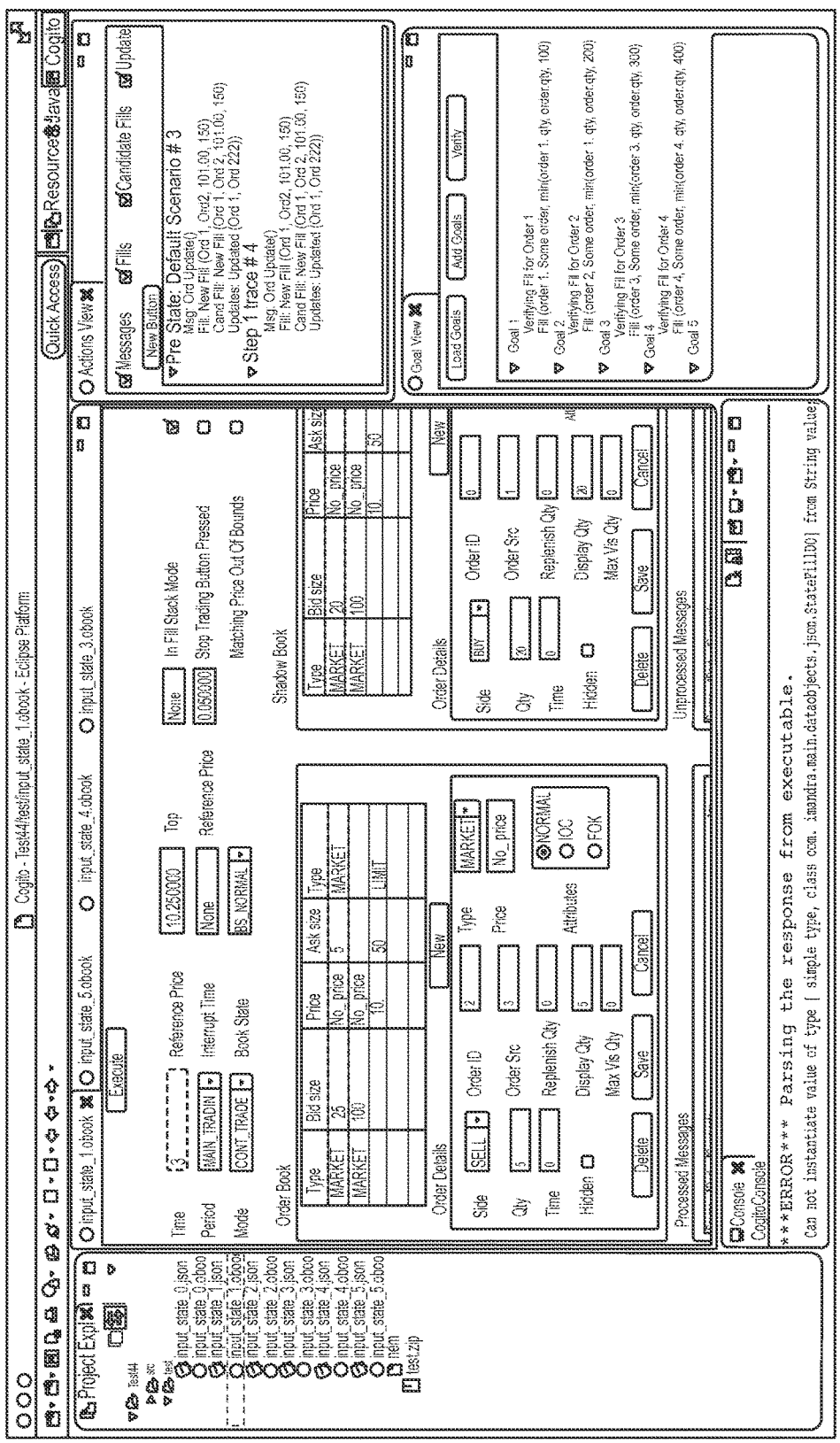
FIG. 14 shows a GUI used in simulating a trading platform according to one embodiment of the present disclosure.

Additionally, Imandra constructs a Graphical User Interface (GUI) through which a user may query a model for subsequent states of the model, among many other aspects. An exemplary GUI is shown in FIG. 14. The states of the model may include executions or trading interruptions, for example. This allows the user creating the specification to understand side effects and unexpected behavior of the model, and also for individuals creating systems that interact with the model to understand the model's behavior. As an example, a user developing a system such as Smart Order Router (SOR) that will submit orders/quotes to an exchange needs to have a clear understanding of the protocol by which the SOR will interact with the exchange. The exchange may provide such users with an unambiguous specification written in IML.

Also, within the GUI, strategy-specific GUI context (i.e., matching-logic specific constructs and automatic look-up; generation of order book widgets from FCSMS definitions) and counter-example scenarios can be automatically generated. In addition, a visual representation of the order book can be displayed, the market event trace can be simulated (i.e., given an initial order book state, what will be the result), and a visualization of the market event trace and resulting order book states can be displayed. Also, the users can make amendments to the trace states and rerun the simulation from that point.

Figure 19A:
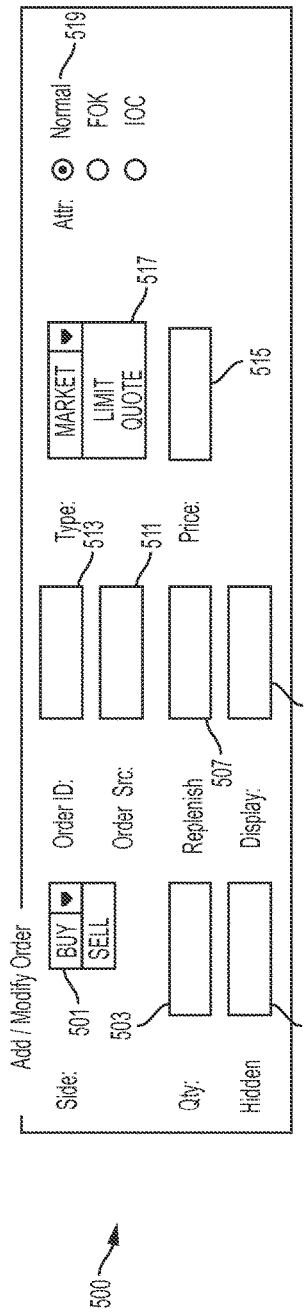
FIG. 19a shows an order book interface according to one embodiment of the present disclosure.
Figure 19B:
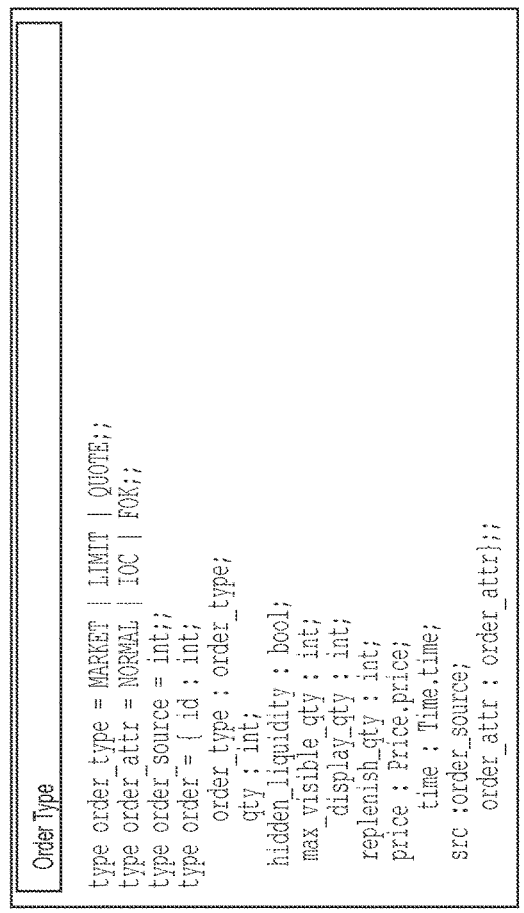

FIGS. 19a-22 provide additional details regarding the specification of the GUI 200. According to a preferred embodiment, in a main window, the GUI 200 displays lists of buy and sell orders, states of an Order Book, and a list of fills (executions). The main window may also be configured to allow a user to adjust the modes of the GUI 200, which may include a view state mode, an add/insert/modify state of the book/individual order mode, and a mode for specifying properties of a model to verify (MVPs). FIG. 19a shows an Add/Modify Order Window 500 of the GUI 200. The Add/Modify Order Window 500 allows a user to provide details regarding a specific order that can be simulated within a model. As shown in the embodiment of FIG. 19a, the Add/Modify Order Window 500 comprises multiple fields, including a side field 501, for specifying whether the order is a buy or sell order, a Quantity field 503 (to indicate the number of securities to be bought/sold), a Hidden field 505 (to indicate the quantity of the order hidden from the exchange, if any), Replenish field 507, a Display field 509 (to indicate the quantity of the order to be displayed on the exchange), a Price field 515 (to indicate a desired price to buy/sell the securities), and an Order Type field 517 (for specifying the order type). In addition, an Order ID field 513 and Order Source field 511 may be provided for documentation of the details of the Order for reporting purposes. FIG. 19b shows an example of the source code that is behind the Add/Modify Order Window 500. In the example of FIG. 19b, the code is written in IML and shows an example of how some order types (here, market, limit, and quote orders) can be defined.

Figure 20:
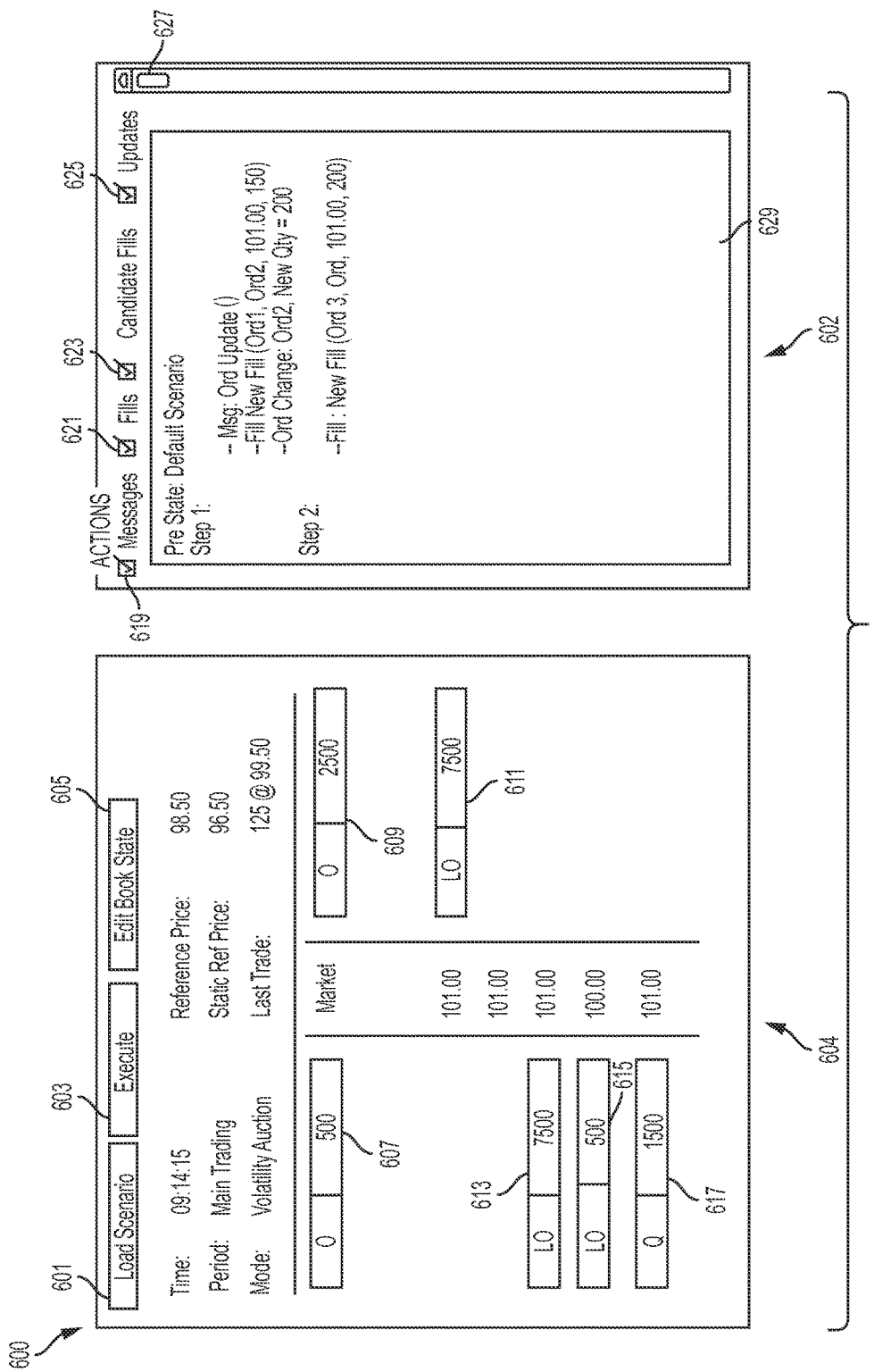
FIG. 20 shows a GUI with an actions view screen used in simulating a trading platform according to one embodiment of the present disclosure.
Figure 21:
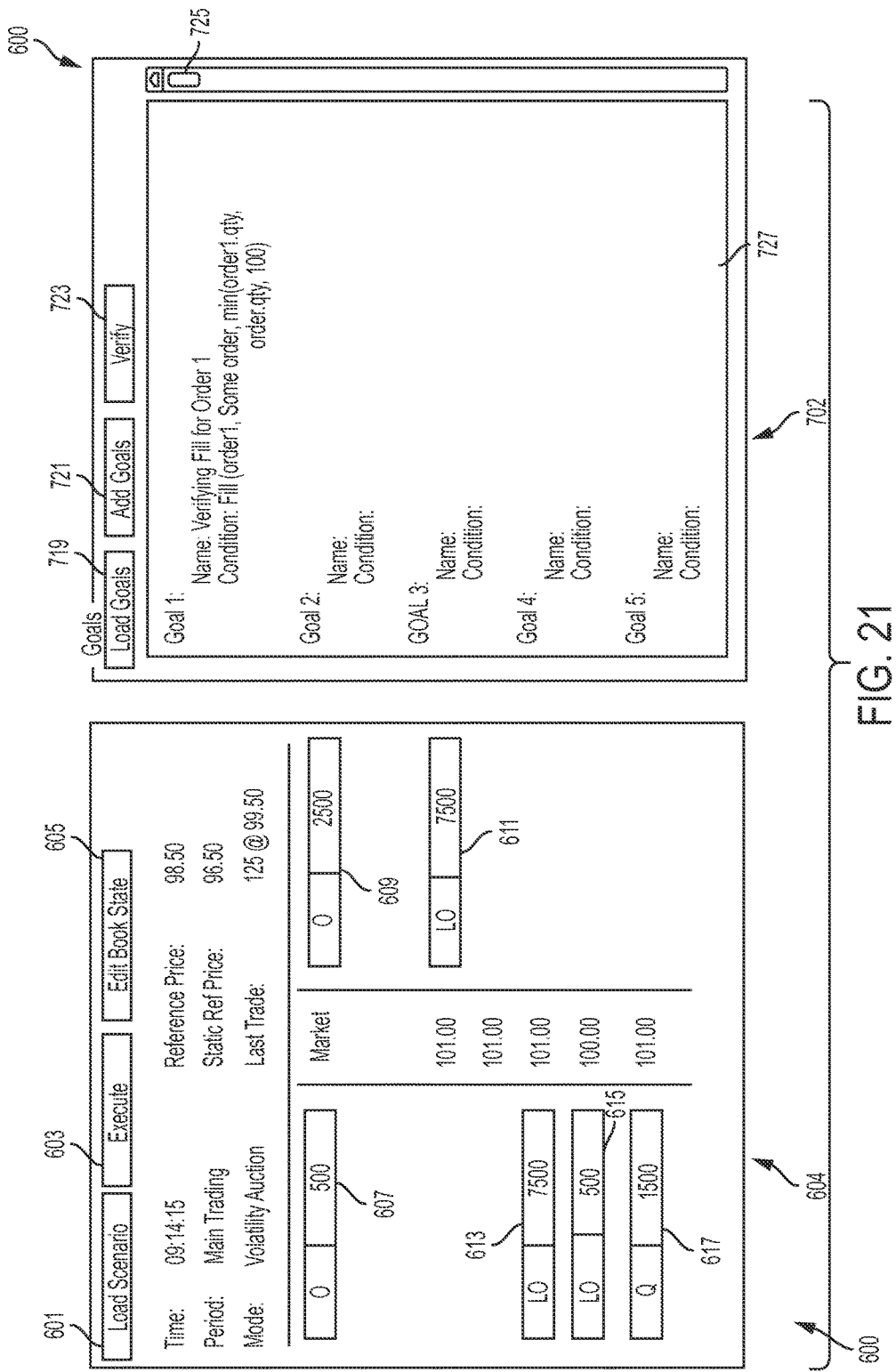
FIG. 21 shows the GUI of FIG. 20 with a goals view screen according to an embodiment of the present disclosure.

FIG. 21 shows the view mode window 600 that comprises the input screen 604 as shown in FIG. 20, along with a goals view screen 702. The goals view screen 702 comprises a load goals field 719, an add goal field 721, and a verify field 723. The load goals field 719 allows a user to load a predetermined or saved goal into the goals view screen 702, the add goal field 721 allows a user to input a goal into the goals view screen 702, and the verify field 723 allows a user to verify and confirm whether a goal is attainable using the automated theorem proving functions disclosed herein. A listing of goals, based on name and condition is provided in the display section 727 and allows scrolling of those configuration details using scroll bar 725. The display section 727 may also provide details regarding the verification of goals.

Figure 22:
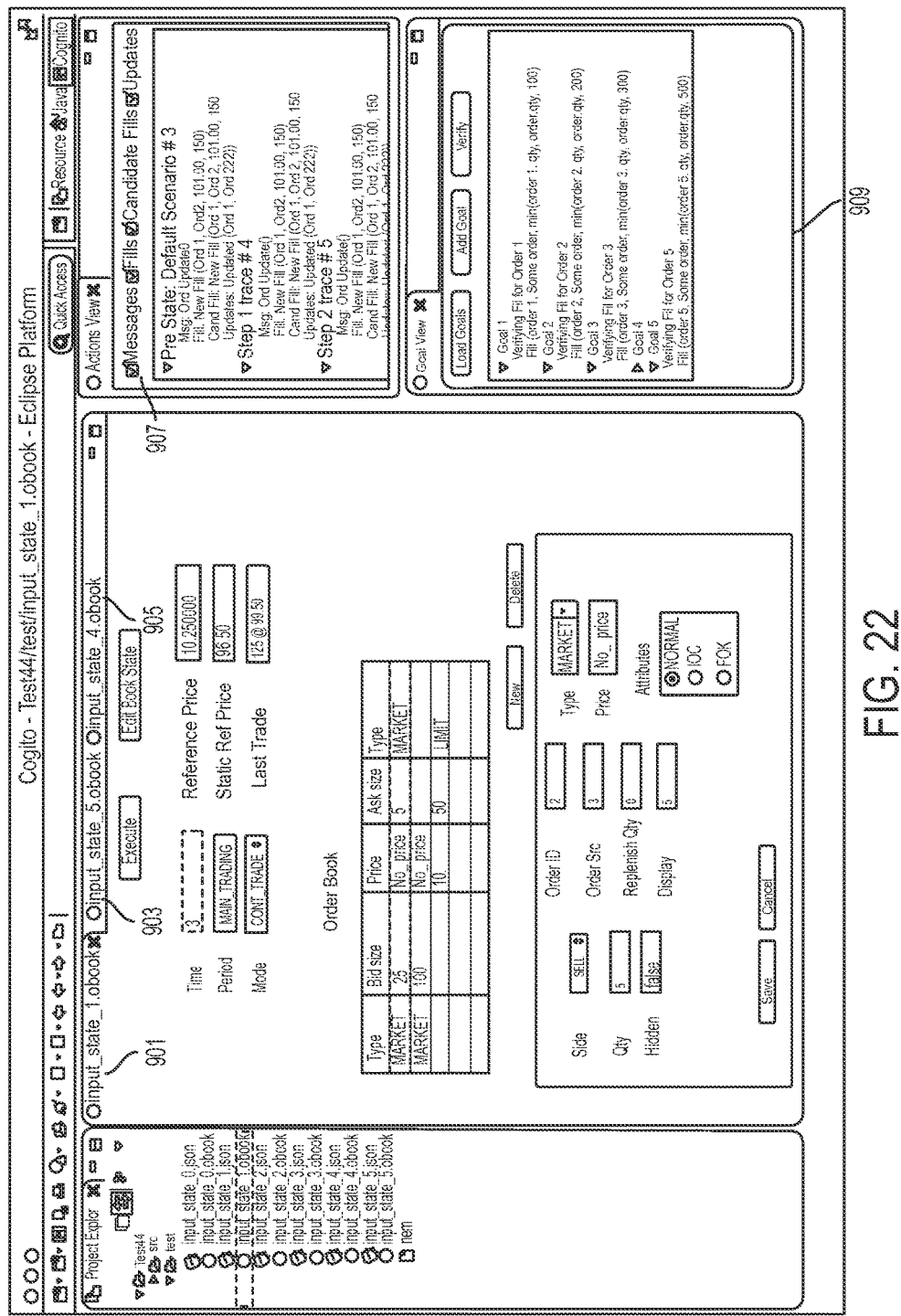
FIG. 22 shows a GUI used in simulating a trading platform according to another embodiment of the present disclosure.

FIG. 22 shows another embodiment of the GUI for interacting with a model. The GUI 900 comprises multiple tabs 901, 903, 905 for specifying various input states similar to FIG. 19*a*. Further, the GUI 900 comprises an actions view screen 907 that provides a display of trace events based on various states of the modeled trading platform. The actions view screen 907 is similar to the actions view screen 602 shown in FIG. 20. In addition, the GUI 900 comprises a goals view screen 909 that displays information regarding goals and verification thereof, similar to the goals view screen 702 shown in FIG. 21.

U.S. Pat. No. 8,494,953 describes the business processes to implement portfolio compression system and is incorporated by reference herein in its entirety. Encoding such business processes in Imandra and IML would allow a user to reason about portfolio compression using a model according to the present disclosure.

Collateral is defined as a pledge of assets by a party to a transaction as a way of guaranteeing financial solvency in such transaction (in one aspect, this minimizes counter-party risk). Collateral is a critical component of OTC transactions involving derivative securities with unknown future cash flows. Collateral may come in form of initial and variation margins which may have different eligibility criteria. For example, initial margin may be satisfied with different types of government bonds while variation margin, which is reassessed daily in a 'mark to market' process, may be restricted to only cash.

The following application of Imandra is designed for multiple types of financial institutions that are required to post collateral or manage it on their balance sheets. Moreover, there are also business lines derived from the ability to reuse or rehypothecate collateral in other parts of the business as well. For example, at a typical broker dealer firm, there may be an asset lending function allowing its clients and its partners to access the pool of assets within the clients' non-segregated accounts to 'borrow' securities for a commission.

There are two primary reasons why broker-dealers may wish to re-hypothecate clients' assets (Note that investment banks (IB) is used in the following paragraph, but there are other types of financial institutions which may have similar business requirements and opportunities):

1. Managing collateral (post and receive).
    a. Exchanges and other venues require collateral to guarantee transactions. For example, in the course of business an IB may hold a considerable number of futures contracts, whether for its own account or for its clients, that have not yet expired. Such exposure would be subject to collateral requirements, such as for protection for the exchange in case an IB would not be able to provide cash or the securities upon expiration. Readjustment of collateral requirements maybe a constant process.
    b. When an IB or other financial institution creates new products or "issues" them, such as Exchange Traded Funds (ETFs), they may be required to collateralize them to reduce credit exposure. A custodian (e.g., an independent third-party) would likely be hired to hold the collateral which may not be the exact security or a portfolio of securities, to which exposure the ETF is designed to track. For example, an ETF tracking the DAX index may be required to not post the underlying DAX equity securities as the collateral. The specifics of what types of assets may be posted are described in different types of agreements and arrangements. All such agreements and arrangements may be encoded in IML as described below.
    c. IB's may also receive collateral from their counter-parties and, furthermore, may specify what type of collateral they would prefer.
2. Stock lending—when a client would like to "short sell" a stock (one reason might be to speculate on decline in the price of that stock), it first needs to have their broker 'locate' it and borrow from holdings of other clients. In case it does not hold such stock within holdings of its clients, it may seek to borrow it from other broker dealers. The fee for borrowing stocks is a function of its supply and demand, and is constantly adjusted to reflect such conditions. This will be one of the inputs into the COE as depicted below.

The following application of Imandra is targeted towards systems within financial institutions responsible for collateral optimization. Note that many financial firms have to manage collateral in the manners described. This includes any firm that posts collateral to secure their obligations resulting from financial transactions (as well as any firm that receives collateral from their counter-parties).

Figure 15:
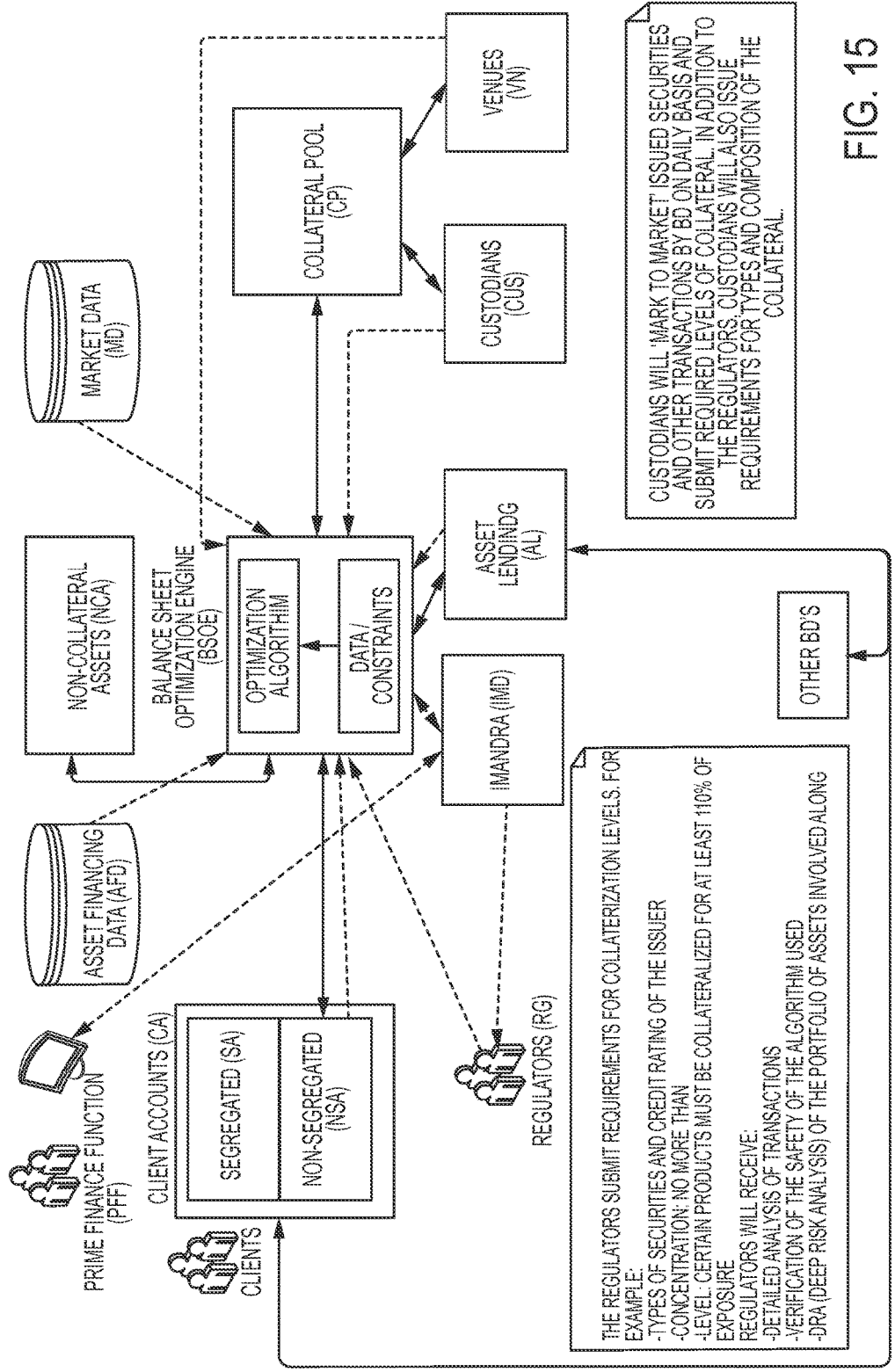
FIG. 15 is a diagram of a system according to the present disclosure used in collateral optimization.

Please note that in the diagram of FIG. 15, solid-lines indicate knowledge of or transfer of positions and dotted-lines indicate flow of information, such as client-specific limits on rehypothecation. With reference to FIG. 15, the following descriptions apply:

Client Accounts (CA)—client accounts within Prime Finance department of a broker-dealer (BD)

Segregated Accounts (SA)—those accounts that clients have chosen not to make eligible for rehypothecation. Such accounts will typically incur higher fees.

Non-Segregated Accounts (NSA)—accounts eligible for rehypothecation. For these accounts, clients typically submit specific requirements and constraints on rehypothecation. For example, a client may specify that no more than 40% of the assets it holds in its Non-Segregated Account may be rehypothecated.

Regulators (RG)—regulatory agencies specifying credit risk and liquidity requirements, etc. Commodity Futures Trading Commission (CFTC) is an example.

Other BDs—other institution counterparties that may source collateral with the firm Asset Lending (AL)—business division within a BD responsible for locating and loaning stock positions to clients and other BDs.

Custodians (CUS)—third-party firms hired to hold the collateral and ensure parties are holding sufficient levels required by their transaction obligations.

Venues (VN)—Exchanges and Multi Lateral Trading Facilities where BD has accounts and executes transactions Collateral Pool (CP)—assets designated as pledged collateral. Please note that they will not most likely be held within one account.

Collateral Optimization Engine (COE)—a computer program implementing an algorithm designed to maximize the objective function while adhering to the specified constraints.

Asset Financing Data (AFD)—includes information such as dividends, their tax treatment, financing costs (yields), issuer credit ratings, etc.

Market Data (MD)—includes metrics such as prices, liquidity measures, correlation, etc.

Prime Finance Function (PFF)—persons within the financial institution responsible for allocation of balance sheet and collateral management.

The objective of Collateral Optimization Engine (COE) is to maximize utility of the assets available to the institution while adhering to its obligations as specified by agreements, such as International Swap Dealers Association master agreement and its Credit Support Annex, with its clients and other counter-parties, such as custodians and venues, and other constraints, such as maximum capital or balance sheet commitment limits. Utility may be measured in different ways. One such measure of utility, Return on Assets (ROA), is calculated as the ratio of total net income to total assets of the firm. Thus the system will make allocations of assets, which may include suggestions to borrow more collateral from third parties if fee for such assets, as specified by the AFD, is commercially viable, in such a way that net income from all of the assets is maximized while institution is meeting its regulatory and contractual obligations.

Explicit references above to ISDA master agreement and other types of constraints have been made while describing inputs into COE. In addition to receiving information about collateral (assets) and the corresponding market and financing data (MD and ADF), the system may receive as input the following types of constraints:

Internal risk and balance sheet constraints, which may be, for example, limits on total capital and its composition.

Constraints issued by the regulatory agencies (e.g. capital composition as classified by different tiers).

ISDA master agreement and its Credit Support Annex type of documents describing contractual obligations for OTC transactions. These may include:
Collateral eligibility criteria for initial and variation margins; and
Specific dates when such collateral must be posted.

Margin requirements from venues; such requirements may be linked to on-exchange exposure the firm may carry due to transactions on behalf of its accounts or those of its clients.

Margin specifications (including asset type/liquidity preferences) sent to its counter-parties to post to guarantee transactions with the firm.

Client rehypothecation constraints addressing client-specific requirements on maximum amount that may be rehypothecated, etc.

Figure 16:
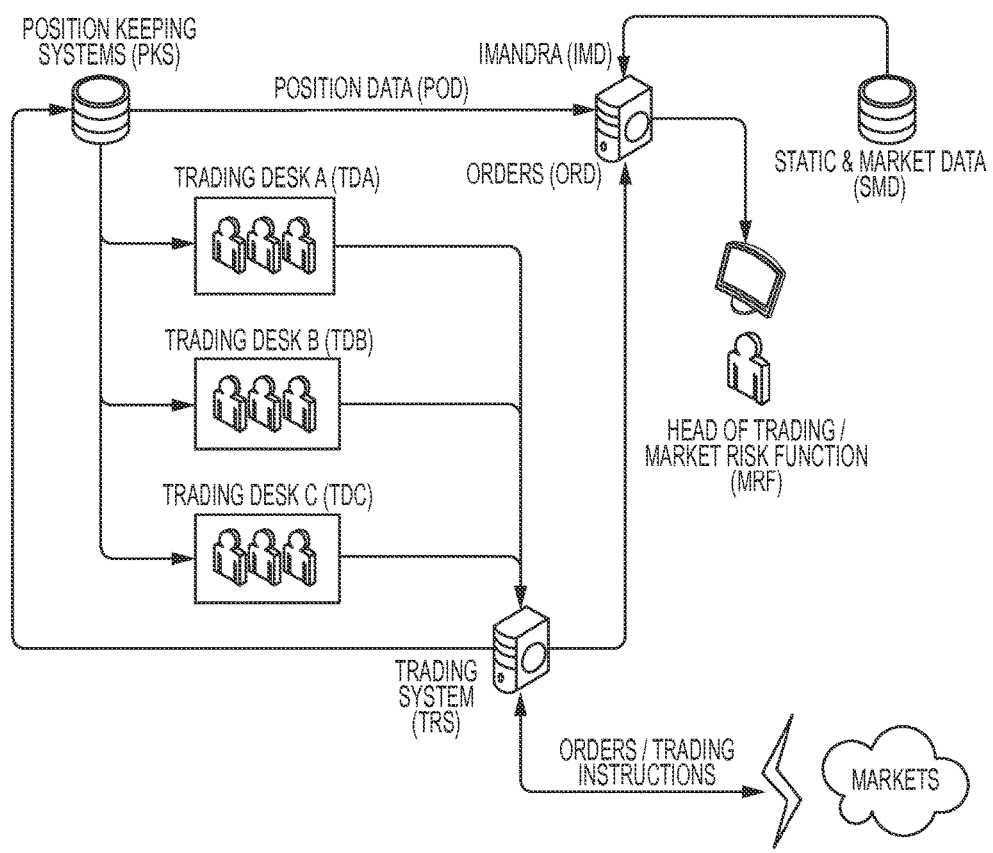
FIG. 16 is a diagram of a system according to the present disclosure that implements the Floor Risk Management component of a Deep Risk Analysis.

The following is a typical scenario within broker-dealer firms. There are multiple trading desks or businesses that are responsible for different product lines. These firms may or may not be responsible for managing inventory (i.e. they may be performing functions on 'agency' basis), which are positions in securities traded in principal capacity. As shown in FIG. 16, a Position Keeping System (PKS) feeds "live risk" or position data to Imandra. At any point in time, a firm may have outstanding market exposures as either trades within TRS or more specialized exposures such as Indications Of Interest (IOIs). SMD provides real-time data such as market prices and static information such as futures expiration dates.

Figure 17:
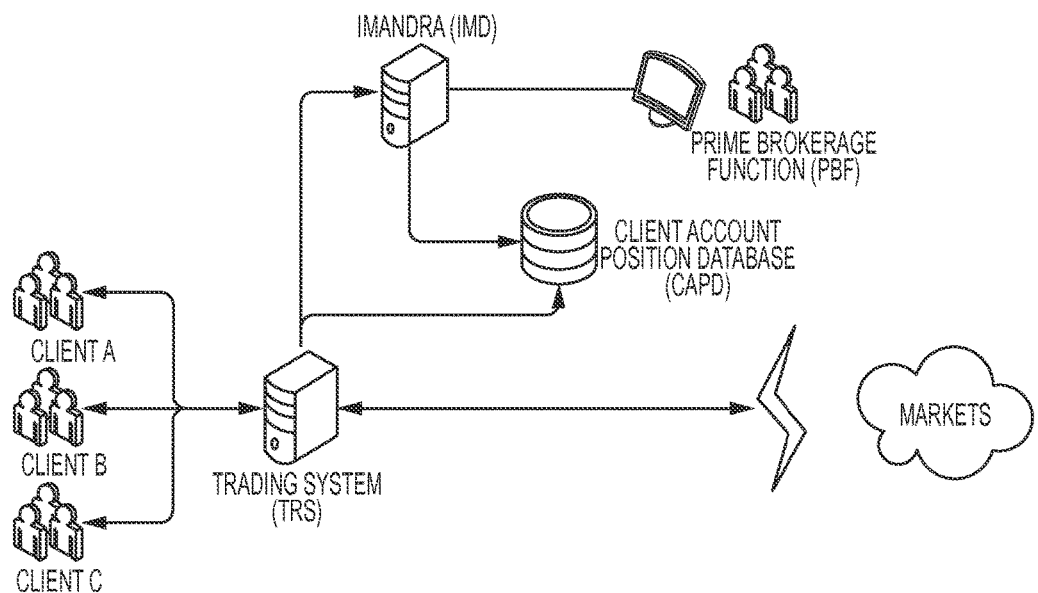
FIG. 17 is a diagram of a system according to the present disclosure that implements Prime Finance Risk Management component of a Deep Risk Analysis.

The example shown in FIG. 17 is an application of Imandra for analysis of clients' positions and trading activity for calculating margin requirements and implications for firm's collateral posted with venues/custodians. Deep Risk Analysis (DRA) can provide indications of consequences due to potential market events, such as general market dynamics (e.g. significant moves in the market triggering changes in risk profile of the inventory) and execution of outstanding orders, and how they would reflect on clients' positions.

FCS's often involve the use of low-latency database and complex event processing systems (DCEPs). One example of such a DCEP system is the KDB framework by Kx, www.kx.com.

IML can be used to model and reason about the usage of DCEPs in FCS's. In this context, the functionality provided by the DCEP may be modeled within an Imandra FCSM, and IML types and functions may be constructed describing both the database schema and a set of queries (functions) operating with the database's tables/streams. Moreover, IML may provide a syntax extension allowing DCEP code (such as that used in KDB) to be directly embedded in IML models without any syntactic modifications. In all cases, Imandra can be used to reason about the resulting FCS's containing DCEP functionality.

For example, if one considers a database system storing (whether through a real-time feed or through the use of historic data) a large collection of time-series inputs, and in turn performing numerous calculations and storing/outputting results upon these series, Imandra may be employed to reason about the data stream manipulations performed by such systems. The following are some example applications of Core Features (CF) of Imandra to DCEP systems:

Data Flow Analysis (DFA)—Imandra can perform an analysis of which inputs are used to obtain certain classes of outputs of the DCEP. For example, using DFA, Imandra can determine that the output of a certain query is independent of the value contained in various columns and rows of various tables in the DCEP.

State Reachability Analysis (SRA)—as part of the DRA (Deep Risk Analysis), Imandra can construct queries to monitor for state inconsistencies of a live FCS with respect to its corresponding FCSM modeled in IML. Such queries may be constructed as database queries to be run against live systems (DCEPs) recording information from production environments or against historical records. As DCEP functionality can be included in any FCSM, all of the features of Imandra disclosed herein can be applied to analyze and reason about the DCEP functionality.

Figure 24:
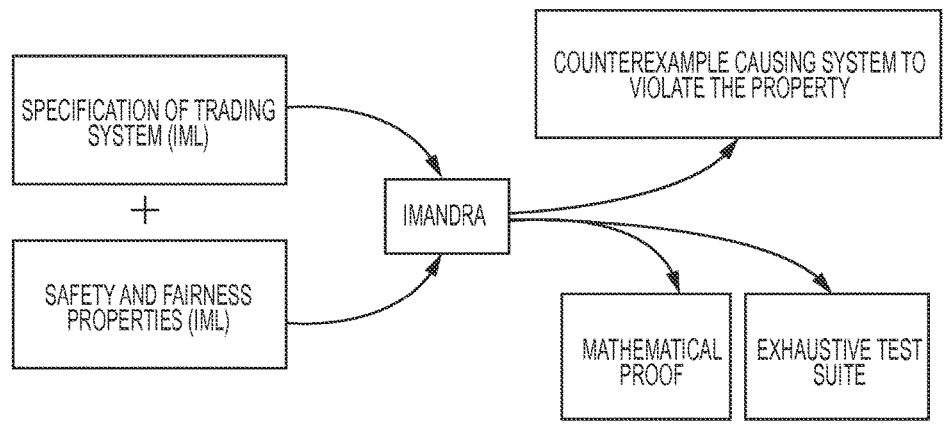
FIG. 24 is a diagram of a system for modeling and verifying trading venues according to one embodiment of the present disclosure.

Embodiments of the present disclosure allow a user to analyze possible behaviors of an algorithm of a Financial Computing System (FCS) and to analyze production implementations for conformance to a design of the FCS. Such analysis may be performed using questions encoded as Model Verification Properties (MVPs). FIG. 24 provides a diagram of an embodiment of the present disclosure, which is an assessment computing system for conducting this analysis, referred to as "Imandra". With reference to FIG. 24, to reason about MVPs, Imandra 241 employs automated reasoning technology to decompose the state space of the system logic of an FCS to either: (i) find a counterexample 243 showing where the MVP fails, or (ii) mathematically proves 245 that it holds for all possible states of the FCS system design. If the MVP holds for the system design, Imandra 241 uses its symbolic state space decomposition to automatically construct test suites 247 meeting rigorous quantitative test coverage metrics. These test suites 247 may then be used to test production systems of an FCS for conformance to verified designs.

The Imandra Modeling Language (IML) may be used to encode an FCS specification, such as a trading system specification 249, and verification goals. IML is both a programming language and a mathematical logic in which conjectures about IML programs can be stated, proved or disproved. In addition to being compiled and run, a program written in IML may be automatically translated by Imandra 241 into mathematical representations or axioms using the axiomatic operational semantics of the IML model code. Imandra's 241 reasoning engine may then be used to analyze possible behaviors of the algorithms encoded in the IML program.

According to the embodiment shown in FIG. 24, to apply Imandra to reason about an FCS or trading venue, the following may be used: 1) A specification 249 of the matching logic (e.g., as described in Form ATS or exchange bylaws) specific to the FCS or trading venue expressed in IML along with safety and fairness properties 251 that are not specific to the FCS or trading venue being analyzed but are generally applicable; and 2) An MVP expressed in IML. In addition to order type definitions, the specification 249 may contain definitions of the various parameters and attributes an order may have, the precise messaging format (e.g., FIX), and other details required to create a fully functional simulator of the FCS or trading venue. Additionally, an applicable MVP may be for example: Does the FCS (and in particular, a trading venue) accept "sub-penny" orders?

Additionally, other specific examples of trading venue MVPs that may be reasoned about with Imandra are as follows:
  Reporting: are the trades tagged correctly and are they stored according to appropriate encryption requirements (i.e. is the client ID stored as raw text within the database)?
  Round-lot trades: does the venue abide by round-lot trading client restriction?
  Primary exchange: does the venue suspend trading when the primary is suspended?
  Limit Up/Down: will venue trade if the price is outside the LU/D bounds?

Once Imandra is asked to verify that an MVP holds for a trading system design, it will convert the trading system design, represented by the specification (this will include the matching logic) and MVP into mathematical logic. A number of complex steps may take place for the conversion, but those details may be hidden or invisible from the purview of the user.

According to embodiments, following the conversion, Imandra 241 may use an automated theorem proving engine to create a logical representation (e.g., axioms) of the state space and analyze the trading system design for possible breaches of the MVP in question. If there is a state where the MVP is violated, Imandra 241 finds the violation and converts it into a counterexample. According to the present disclosure and in the context of analyzing a MVP, a counterexample may be defined as a sequence of inputs into a system that lead the system to violate the MVP. Alternatively, if the MVP in question is true, then Imandra 241 produces a mathematical proof 245 that the trading system design cannot violate the property. According to embodiments, such a mathematical proof 245 may be of a form that can be exported, e.g., to regulators, and be independently audited.

A verification goal (also called a Model Verification Property (MVP) herein) can be thought of as a statement about a program that is either true or false. To "prove" an MVP means proving that the MVP will evaluate to true for all possible inputs. Imandra 241 analyses the definition of an algorithm, turns it into mathematical logic, and reasons about it symbolically. Imandra 241 also applies this principle to complicated programs, e.g., those containing loops, recursive functions, complex data types and nonlinear calculations. In cases where an FCS, such as an exchange, has numerous order types, various trading phases, auctions, volatility circuit breakers, etc., Imandra's 241 automated reasoning can be applied.

Regarding a determination as to whether Imandra 241 provides a correct result; if Imandra 241 produces a counterexample to the MVP in question, then a user may analyze the counterexample. For example, the trading system design can be executed using the counterexample, directly illustrating the issue Imandra found with the counterexample. While proofs can be very difficult to construct when reasoning about software, Imandra 241 fully automates this process for many key classes of algorithm properties. Additionally, if Imandra 241 produces a mathematical proof that a MVP is always true (i.e., that no counterexamples to the MVP in question exist) open source third-party tools that can be used to certify Imandra's mathematical proof.

Two examples given below are based on models of a dark pool and a stock exchange analyzed using Imandra 241. The model for the dark pool is based on several publicly available Form ATS filings. The stock exchange model is derived from the SIX Swiss Exchange's publicly available trading guide. To provide some background for the dark pool model, below is a fragment of IML code that declares order types that may be supported in a dark pool:

```
type order_type=MARKET|LIMIT|PEGGED
```

According to embodiments further described herein, IML trading venue models can be automatically compiled into high-performance venue simulators. Once defined, the venue simulator may automatically reject any orders sent to it (e.g., via FIX) that are not of the supported types. Furthermore, according to embodiments, the structure of IML may require a user to attach a precise meaning to each declared order type. In another example, the following fragment of IML code is part of a calculation of the most aggressive price at which an order is willing to trade in a stock exchange:

```
match o.order_type with
    | LIMIT -> if side = BUY then
        if gte (o.price, mkt_data.nbo) then mkt_data.nbo
    else o.price
        else
            if lte (o.price, mkt_data.nbb) then mkt_data.nbb
    else o.price
        | MARKET -> if side = BUY then mkt_data.nbo else
    mkt_data.nbb
```

Trading venues, whether dark pools or exchanges, may share common properties with each other. According to embodiments, Imandra 241 comprises libraries of generic models that contain common venue components and other boilerplate code components. These libraries may allow a user to focus on encoding components that are specific to a venue, which may reduce the time required to implement a fully functional IML model of an FCS.

Figure 25:
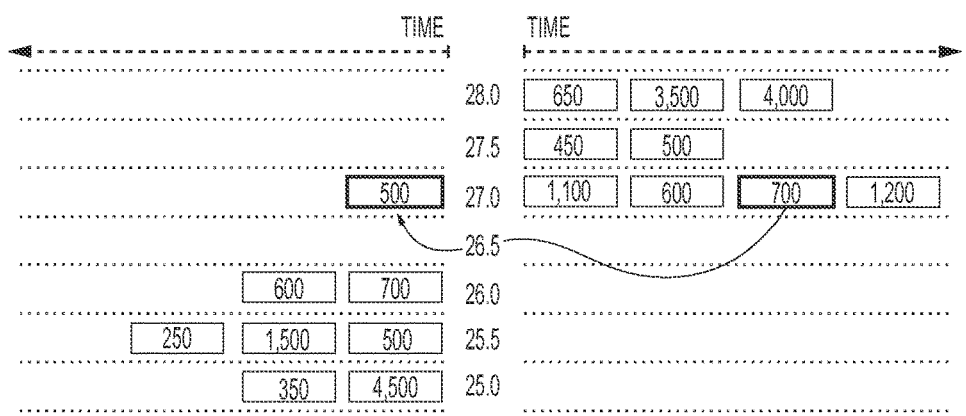
FIG. 25 is an illustration of orders to be placed with a trading venue.

Many recent regulatory directives contain behavioral constraints on trading algorithms of FCSs. The following demonstrates how such directives may be converted into MVPs in IML. FIG. 25 is a diagram of an out of priority order 251 to sell 700 matches displayed against an incoming market buy order 253 for 500. Imandra allows for encoding an MVP such as the constraint that no order type (along with some combination of its attributes) may "jump the queue", or be processed out of order, under certain market conditions and operator settings.

Typical factors for determining an order's priority (which may be encoded as an MVP) include:

Price—the price at which an order is willing to trade, which depends on the limit price, order type (e.g. Market or Limit) and the current National Best Bid and Offer (NBBO);

Time—the time the order arrived; and

Category—client IDs may be categorized into groups with differing priority levels.

In addition to price constraints, there are other constraints that may prevent two orders from trading with each other, including:

Minimum quantity than an order must trade;

Self-crossing (e.g. a large institutional client that may be buying and selling the same security at the same time may be prohibited from trading with itself if such trades are done outside of the public market);

No trading during specific market conditions (e.g., locked market); and

Round lot trades.

Further, there are other areas of a model of an FCS that may affect how an order is prioritized and traded, for example, the logic within a market data handler. Yet, Imandra allows a user to encode a high-level statement about the venue and reason about it. For example: If an order is sent to the venue and that order is the most aggressive and it's been there longest, that order should get filled before anyone else unless there are restrictions that prevent a trade that are disclosed to me in the marketing materials.

Below is an example as to how to express this statement as an IML MVP. The IML code provides that there are orders 1 and 2 (on the same side), but order 1 is more aggressive and has an older time stamp than order 2. Furthermore, orders 1 and 2 have exactly the same restrictions (minimum quantity, crossing constraints, etc.). "Aggressive" refers to the price at which an order is willing to trade, which depends on order type and side. In this context, if an order arrives on the opposite side and it meets the prices of both orders 1 and 2, and is otherwise eligible to trade against both of them, then the MVP would seek to verify that order 1 will trade first. IML code of this MVP is as follows:

```
verify order_priority (side, o1, o2 , o3, s, s',
  mkt_data) =
    (s' = next_state (s) &&
    order_at_least_as_aggressive (side, o1, o2,
    mkt_data) &&
    order_is_older(o1, o2) &&
    constraints_equal(o1, o2) &&
    order_exists(o1, side, s) &&
    order_exists(o2, side, s) &&
    order_exists(o3, (opp_side (side)), s))
    ==>
      (first_to_trade (o1, o2, s'))
```

It can be seen that Imandra allows a user to encode high-level properties of the behavior of an algorithm and reason about them automatically. Such a MVP may be applied to the model of an entire venue, including the risk gates and market data handlers. Imandra may be applied to various trading venues, regardless of the order types the trading venue supports or the specifics of its client categories. Additionally, the MVP expressed above may be encoded in alternative ways.

Additionally, intentional or unintentional design and implementation details of an FCS may lead to a violation of a MVP such as the presented above. Such flaws may range from intentional decisions to prioritize internal clients, to accidental 'bugs' within the code failing to execute a trade during particular market conditions.

According to embodiments, Imandra also allows for applying formal verification techniques to non-trivial systems. Imandra's information flow analysis allows a user to analyze and isolate the effects of certain inputs into an FCS or trading system. The example described with reference to FIGS. 26a and 26b demonstrates how a user may analyze how client IDs attached to orders can affect prices of fills in an exchange model based on the public trading guide of the SIX Swiss Exchange using Imandra.

Figure 26A:
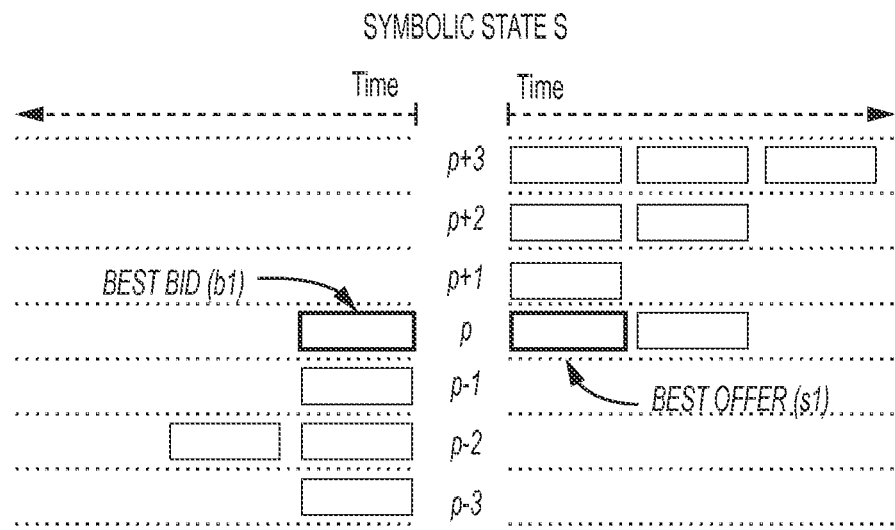
FIGS. 26a and 26b are diagrams of state representations of an FCS with regard to a Model Verification Property (MVP) according to one embodiment of the present disclosure.
Figure 26B:
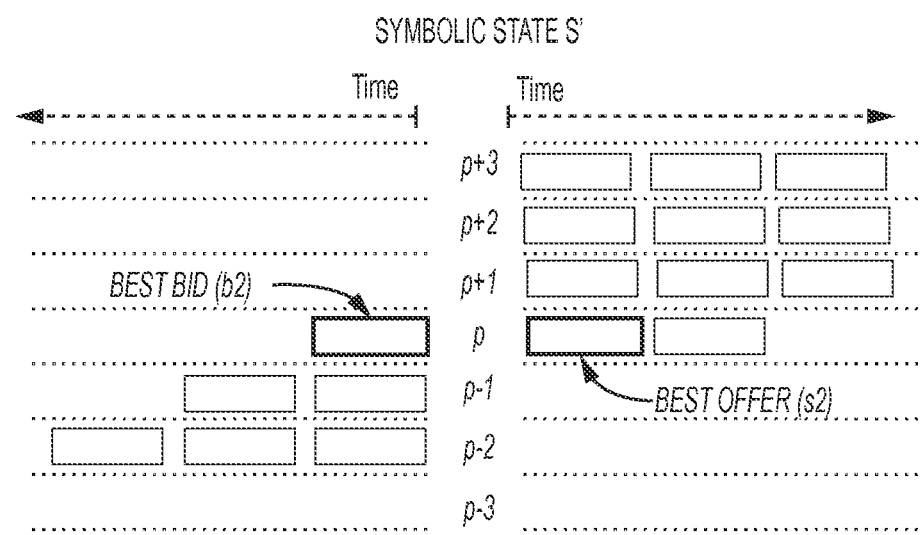

Initially, a MVP may be stated in plain English as: Client ID should not play a role in calculating the price of a fill. As shown in FIGS. 26a and 26b, the MVP may be setup as follows:

two symbolic states S261 and S' 263 of the exchange may have the following correspondence:

The best bids 265, 267 in both states are exactly the same (i.e. quantity, limit price, order type, etc.) except for their client IDs;

the best offers 269, 271 in both states are exactly the same except for their client IDs; and S261 and S' 263 are equivalent in all state variables except for their order books.

There exists a virtually infinite number of possible states and a symbolic state means any possible state, just as the use of the symbolic variable 'x' may mean "any real number" when performing an algebraic calculation. Accordingly, the pricing of a fill for S and S' should be identical. The corresponding MVP is as follows:

```
verify match_price_ignores_order_source (s, s', b1, s1,
  b2, s2) =
    (orders_same_except_src (b1, b2) &&
    orders_same_except_src (s1, s2) &&
    states_same_except_order_book (s, s') &&
    best_buy s = Some b1 &&
    best_sell s = Some s1 &&
    best_buy s' = Some b2 &&
    best_sell s' = Some s2)
    ==>
  (match_price s = match_price s')
```

Generally, it would be expected that the exchange would fill both pairs of orders at exactly the same price. This expectation reflects the venue's lack of preference for any specific client in the course of assigning a fill price when a trade is executed. However, when instructed to prove this MVP, according to one embodiment Imandra returns the following counterexample information:

```
State (S)
  Buys:
    Time: 1, Type: Market, Attr: Normal, Src: client(13, G_MM,
    nil), Qty: 2
    Time: 38, Type: Market, Attr: Normal, Src: client(23, G_MM,
    nil), Qty: 25
```

```
Sells:
    Time: 449, Type: Market, Attr: Normal, Src: client(18, G_MM,
        nil), Qty: 2
    Time: 2437, Type: Limit, Attr: Normal, Src: client(29, G_MM,
        nil), Qty: 31, Price: 80.74
State (S')
Buys:
    Time: 1, Type: Market, Attr: Normal, Src: client(8, G_MM,
        nil), Qty: 2
    Time: 1796, Type: Market, Attr: Normal, Src: client(35,
        G_MM, nil), Qty: 37
Sells:
    Time: 449, Type: Market, Attr: Normal, Src: client(3, G_MM,
        nil), Qty: 2
        Time: 609, Type: Market, Attr: Normal, Src: client(42,
G_MM, nil), Qty: 44
```

FIG. 27 illustrates the counterexample that points out a flaw in the formulation of the MVP of FIGS. 26a and 26b. FIG. 27 highlights the regions of order books of states S and S' that we have not constrained as part of the initial MVP formulation, The counterexample demonstrates a scenario where the MVP is false and shows that the MVP failed to consider a case when best bids and offers in both states are Market orders. In such scenarios, the modeled exchange transitions into an auction and other orders in the book can influence the price of the uncross. The reason is that once the exchange transitions into auction, a different matching algorithm is applied (and used to calculate the fill price). In auctions, exchanges typically seek to find a price that will result in the greatest transaction volume. Such a price is used for all transactions when the exchange 'uncrosses,' i.e., when it transitions out of the auction and creates fills for the orders.

The MVP may be extended to take into account the equivalence of orders after the best bid and offer for each of the order books. Since IML is both a programming language and a logic, when the IML model of the exchange is compiled to be used as a simulator, the "tail" function will act normally. This means, for example, when called with a list, [1; 2; 3], it will return [2; 3]. It is noted that the "tail" function generally refers to all orders in the book except for the very first one. According to one embodiment, when Imandra is instructed to reason about the possible behaviors of the IML model of the exchange, the "tail" refers to all possible orders that may be in the order book after the best bid or offer. This value might be [ ], i.e., there are no orders after the top order, or a list of 1,000,000 orders that have been sent to the venue by multiple clients. By using the "tail" function symbolically, a user may cover all cases.

Accordingly, an updated MVP with the constraint on the "tails" of the order books is as follows:

```
verify match_price_ignores_order_source (s, s', b1, s1,
    b2, s2) =
        (orders_same_except_src (b1, b2) &&
        orders_same_except_src (s1, s2) &&
        states_same_except_order_book (s, s') &&
        List.tl s.order_book.buys = List.tl
s' .order_book.buys &&
            List.tl s.order_book.sells = List.tl
s' .order_book.sells &&
        best_buy s = Some b1 &&
        best_sell s = Some s1 &&
        best_buy s' = Some b1 &&
        best_sell s' = Some s2)
    ==>
        (match_price s = match_price s')
```

FIG. 28 is a diagram of the updated MVP that is amended by placing additional constraint on "tails" of the order books. The additional constraint states that the orders except for the best bid and offer must be exactly the same for the states S and S'. If Imandra is instructed to prove the updated MVP against the IML model of the SIX Swiss Exchange matching logic, the following result may be provided:

thm match_priceignores_order_source=<proved>

Imandra successfully proves that the specification of the SIX Swiss Exchange matching logic is consistent with the MVP provided above. Furthermore, according to one embodiment, Imandra may provide a trace of its reasoning and can request the proof be exported as formal evidence of compliance from Imandra.

Once an IML model is verified to be correct with respect to an MVP (i.e., Imandra proves the MVP to be true), a user can reason about whether a production system is faithful to the verified design. According to embodiments, Imandra comprises a method for generating high-coverage test suites to analyze conformance of the actual implementation of an FCS with an IML specification. When Imandra verifies that the MVP in question holds, it will leverage the model logic state-space decomposition (that was constructed in the course of proving the MVP) to construct a high-coverage test suite for the actual implementation.

Figure 29:
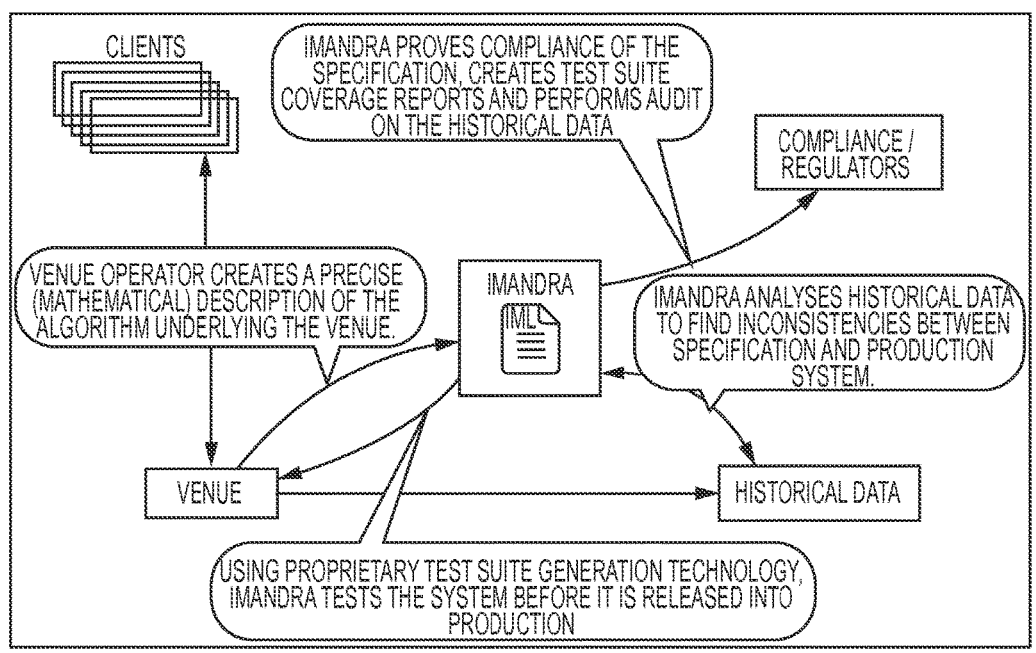
FIG. 29 is a diagram of an integration of a system for modeling and verifying trading venues according to one embodiment of the present disclosure.

FIG. 29 illustrates a process flow 290 of how Imandra 291 may be integrated into a design/development process for an FCS. As shown, a Client 293, such as a trading venue operator, may create a precise description, for example in mathematical terms, of the algorithm or algorithms that underlie a trading venue 295 using Imandra 291. The precise description may be referred to as a specification. Imandra 291 can then be used to prove compliance of the specification, create test suite coverage reports, and perform audits on historical data 297 regarding the trading venue 295, any of which may be provided to compliance entities and regulators 299. Accordingly, Imandra 291 can be used to test an FCS before it is released into production. Further, Imandra 291 is able to analyze the historical data 295 to find inconsistencies between a specification and a released production system.

Trading venues must operate under numerous complex constraints dictated by internal controls, customer demands and regulatory requirements. The highly intertwined matching logic of a venue makes it difficult to ensure that one component of a trading system does not overrule another component resulting in unintended behaviors of the system. Imandra allows a user to automatically reason about such functionality to ensure system integrity. As described herein, Imandra can be used to reason about and analyze properties of trading venue order priority and order pricing. Imandra also provides for the encoding of regulatory directives for financial algorithms as precise mathematical statements. Further, Imandra's automated formal verification techniques can be applied to analyze trading system designs and implementations. Accordingly, Imandra provides a major increase in efficacy and rigor that benefits all user of the system, including those in the trading industry and regulators.

In one general aspect, the present invention is directed to a computer architecture that allows a user to analyze automated behaviors of an FCS and to analyze production implementations for conformance to a design of the FCS. FIG. 30 is a diagram of the computer architecture 300 according to various embodiments of the present invention. The computer architecture 300 comprises an assessment computer system 301 and a remote computer device 303. The remote computer device 303 is in communication with the assessment computer system 301 via a computer network 305, such as the Internet or other suitable type of TCP/IP network through which the assessment computer system 301 and the remote computer device 303 can transmit electronic files. As shown in FIG. 30, the assessment computer systemb 301 can comprise a processor 307 and a memory 309. The assessment computer system generates information that is transmitted in electronic files, via the network 305, to the remote computer device 303. The files can be, for example, web page files that the remote computer system can render and display with a web browser or other suitable software application. As shown in FIG. 30, the memory 309 of the assessment computer system 301 (primary and/or secondary computer memory) may store the FCSM, the FCSMS, and the FCSME. The memory may also store the Reasoning Engine as described herein, which comprises executable software that the processor 307 executes in order to perform the assessments of the modeled FCS described variously herein.

The remote computer device 303 may be any type of network-enabled computer device that is capable of accessing the assessment computer system 301 via the network 305, such as a personal computer, a laptop, a tablet computer, a smartphone, etc. Only one remote computer device 303 is shown in FIG. 30, although numerous, separate remote computer devices 303 could connect to the assessment computer system 301 simultaneously via the network 305.

Therefore, in one general aspect, the present invention is directed to computerized systems and methods for assessing the operation of a FCS. The method can comprise the step of generating, by the assessment computer system 301, the model code for the FCS. The model code can comprise the model specification for the FCS (the FCSMS) that defines operational aspects of the FCS and the model environment for the FCS (the FCSME). The FCSME can comprise, as explained herein, an axiomatized library of executable source code about one or more characteristics of the FCS. The characteristics of the FCS that FCSME may model can include building blocks for the FCS, such as code about currencies, applicable real-time messaging protocols, orders and order books, risk metrics, structured products, etc., as described herein. The assessment computer system can receive inputs about operational aspects of the FCS from a user in order to generate the FCSMS, such as through the GUI described above. And the code for the model can be in a type-system based logical programming language (e.g., Imandra) that supports typed recursive functions and that has the property that each function written in the languages that returns a single Boolean variable can be turned into a proof obligation.

Next, the assessment computer system generates mathematical axioms that describe the operation of the FCS by compiling the code for the model, where the mathematical axioms are generated in part based on axiomatic operational semantics of the type-system based logical programming language (e.g., IML) of the model code. Next, the assessment computer system can assess the operation of the financial computer system by analyzing or exploring the mathematical axioms as described therein. Additionally or alternatively, the assessment computer system can simulate operation of the FCS based on the model code by extracting and executing executable simulator files from the FCS model code.

The assessment computer system may comprise one or more processors and one or more memory units. The memory units comprise programming instructions (e.g., software) that when executed by the processor(s) of the assessment computer system, cause the assessment computer system to perform the operations described herein (e.g., generate the mathematical axioms, assess/simulate the operation of the FCS, etc.). The memory units may also store the code for the model, model specification, and model environment. The assessment computer system may also receive the input about the operation of the FCS from a remote computer device, via a computer network, such as in a cloud environment. In such circumstances, the assessment computer system transmits to the remote computer system one or more electronic files that include results from its assessment of the model. The assessment computer system can also transmit an electronic file(s) with the model code to the remote computer system. Also, the assessment computer system can transmit the executable simulator files to the remote computer system, which can then execute them.

The above-described methods can be employed for a number of different FCSs and for a number of different assessment types. Different types of FCSs that the invention could be used for include:

Trading forums (or venues) where financial instruments (e.g., securities) are traded, such as public exchanges and various types of private exchanges.

Risk gate components of a FCS (such as a sponsored access framework computer system) that submits trades to a trading forum. The risk gate component of such a system is software that executes to apply prescribed limits on the orders submitted to the forum.

A router or other type of computerized trade-submitting system that routes or otherwise submits trade orders to one or more trading forums. The router may be a smart order router that routes trades according to programmed routing rules or logic.

An algorithmic trading computing system that implements an algorithmic trading strategy.

An agency (e.g., broker/dealer) computerized trading system that trades on behalf of a client of the agency.

A principal trading computer system of a firm that executes a trading process that commits capital of the firm utilizing automatic risk management decisions.

A collateral management computer system for a firm that manages collateral usage constrained by its obligations and its available asset.

Various assessment types that could be performed for the various FCSs according to the methods of the present invention include:

Simulating operational aspects of the FCS.

Determine whether a model verification property (MVP) for an operational aspect of the FCS is satisfied.

Generating a counter-example that shows that a model verification property (MVP) does not hold for the model of the FCS.

Determine whether a particular state in an operational state space for the FCS can be reached from an initial or current state with the model.

Validating the presence or absence of a certain data input to the model on specific operations performed with the model.

Generate a test suite for the model that comprises inputs and expected output of the model.

For example, in the case where the FCS is a trading forum or venue, such as a public or private trading exchange, the assessment computer system can simulate the trade matching logic of the trading forum and/or determine whether a MVP for the trade matching logic is satisfied. The MVP could relate to compliance with a government regulation applicable to the trade matching logic or some other operational aspect of the trade matching logic, such as compliance with fairness conditions or internal limits.

In various implementations, the assessment computer system may first determine whether the MVP is satisfied and then, if it is not satisfied, generate a counter-example that shows an instance (or event trace) where the MVP does not hold. Theorem proving systems can be used for these steps, as described above. Moreover, an untyped, computer-assisted theorem proving system that does not explicitly use types, such as ACL2, Prover9, SPASS, Isabelle/Hol or Coq, can be used for determine whether the MVP is satisfied, and a typed theorem proving system, such as Z3 or other SMT solvers, can be used to generate the counter-example. Since the model uses a type-system, the model should be encoded for use by an untyped, computer-assisted theorem proving system as described herein in such circumstances.

In another general aspect, a computer system according to the present invention for assessing operation of a financial computer system (FCS), the computer system comprises: (i) means for generating code for the model of the FCS; (ii) means for generating the mathematical axioms that describe the operation of the FCS by compiling the model code; and (iii) means for assessing the operation of the financial computer system by analyzing the mathematical axioms.

Accordingly, in one general aspect the present invention is directed to computer-implemented systems and methods for assessing an operational aspect of a financial computing system (FCS). The method may be implemented with the operational aspect assessment computer system 100. The method may include the step of receiving, by the operational aspect assessment computer system 100 through a user interface, user inputs about the operational aspect of the FCS. The method may also comprise the step of generating, by the operational aspect assessment computer system 100, a model specification (FCSM) for the operational aspect of the FCS that is written in a type-based logical programming language (e.g., IML). The method may also comprise the step of generating a model of the operational aspect of the FCS, where the model comprises at least (i) the model specification (FCSM) for the FCS and (ii) a model environment for the FCS, where the model environment (FCSME) comprises an axiomatized library for generating the model, including executable source code about generic characteristics of the FCS. The method may also comprise the step of assessing and/or simulating, by the operational aspect assessment computer system, the operational aspect of the FCS based on the generated model of the operational aspect of the FCS.

In various implementations, the type-based logical programming language has the property that each function written in the language that returns a single Boolean variable can be turned into a proof obligation. Also, the source code for the model environment may be written in the same language as the model specification (e.g., IML).

Assessing the operational aspect of the FCS based on the generated model could comprise, for example: simulating, by the operational aspect assessment computer system, the operational aspect of the FCS based on the model. It could also comprise verifying, by a reasoning engine of the operational aspect assessment computer system, a property (e.g., an MVP) of the model. It could also comprise generating, by the reasoning engine of the operational aspect assessment computer system, a counter-example that shows that a property (e.g., an MVP) does not hold for the model. It could also comprise determining, by a reasoning engine of the operational aspect assessment computer system, whether a particular state can be reached with the model. It could also comprise generating, by a reasoning engine of the operational aspect assessment computer system, a test case able to address an aspect of the model. It could also comprise validating, by a reasoning engine of the operational aspect assessment computer system, the presence or absence of a certain data input to the model on specific operations performed with the model.

The FCSs that can be modeled include, for example: the trade matching systems of trading forums; risk gate components that apply prescribed limits on orders submitted to a trading forum, such as for a sponsored access framework (which may be implemented on FPGA); routers (such as smart order routers) that route trade orders to trading forums; algorithmic trading computing systems that implement an algorithmic trading strategies; broker/dealer computing systems that trade on behalf of a client of the broker/dealer; a principal trading computer system of a firm that executes a trading process that commits capital of the firm utilizing automatic risk management decisions; a low-latency and complex event processing system (DCEP); and/or a collateral usage optimizer computer system for a firm that manages collateral usage constrained by its obligations (including regulatory constraints and counter-party requirements) and its available assets (including clients' assets and collateral posted by its counterparties).

The various databases described herein may be implemented with database servers with adequate CPU power and memory capacity (either primary or second memory) to store the data. Each database may have an associated database management system that allows the definition, creation, querying, update, and administration of databases. The data network(s) may include a computer data network such as an IP network, such as the Internet, an intranet, an extranet, a LAN(s), a WAN(s), etc. It could also use other types of communication protocols, such as Ethernet, ATM, etc., and it could include wired and/or wireless links.

In general, it will be apparent to one of ordinary skill in the art that at least some of the embodiments described herein may be implemented in many different embodiments of software, firmware, and/or hardware. The software and firmware code may be executed by a processor or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm," cloud computing environment, or other grouping of networked servers (such as server blades) that are located and configured for cooperative functions. It can be appreciated that a server farm or cloud computing environment may serve to distribute workload between/among individual components of the farm or cloud, as the case may be, and may expedite computing processes by harnessing the collective and cooperative power of multiple servers. Such server farms or clouds may employ load-balancing software that accomplishes tasks such as, for example, tracking demand for processing power from different machines, prioritizing and scheduling tasks based on network demand and/or providing backup contingency in the event of component failure or reduction in operability.

While various embodiments have been described herein, it should be apparent that various modifications, alterations, and adaptations to those embodiments might occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer-implemented method for assessing operation of a computerized trading forum where financial instruments are traded, the method comprising:
    generating, by an assessment computer system, code for a model of the trading forum that comprises:
        a model specification for the trading forum that defines operational aspects of the trading forum; and
        a model environment for the trading forum that comprises an axiomatized library of executable source code about one or more characteristics of the trading forum,
        wherein the code for the model comprises a type-system based logical programming language;
    generating mathematical axioms that describe the operation of the trading forum by compiling, by the assessment computer system, the code for the model, wherein the mathematical axioms are generated in part based on axiomatic operational semantics of the type-system based logical programming language of the code for the model; and
    assessing the operation of the trading forum by analyzing, by the assessment computer system, the mathematical axioms that describe the operation of the trading forum.

2. The computer-implemented method of claim 1, wherein the type-system based logical programming language:
    has the property that each function written in the language that returns a single Boolean variable that can be turned into a proof obligation; and
    supports typed recursive functions.

3. The computer-implemented method of claim 1, further comprising simulating by the assessment computer system operation of the trading forum by performing steps comprising:
    extracting executable simulator files from the model code; and
    executing the simulator files to simulate the operation of the trading forum, wherein the simulator files, when executed by the assessment computer system, simulate the operation of the trading forum.

4. The computer-implemented method of claim 3, wherein simulating the operation of the trading forum comprises simulating trade matching logic of the trading forum.

5. The computer-implemented method of claim 1, wherein analyzing the mathematical axioms comprises analyzing the mathematical axioms to determine whether a model verification property (MVP) for an operational aspect of the trading forum is satisfied.

6. The computer-implemented method of claim 5, wherein the MVP relates to compliance with a regulation applicable to the trading forum.

7. The computer-implemented method of claim 5, wherein operational aspect of the MVP relates to trade matching logic of the trading forum.

8. The computer-implemented method of claim 7, wherein the MVP relates to a fairness condition for matching trades in the trade matching logic.

9. The computer-implemented method of claim 7, wherein the MVP relates to non-existence of a violation of a trade matching regulation applicable to the trading forum.

10. The computer-implemented method of claim 7, wherein the MVP relates to non-existence of a violation of a fairness condition of the trade matching logic of the trading forum.

11. The computer-implemented method of claim 10, wherein the fairness condition is that client-specific information is not used in calculating a price of a fill in the trade matching logic.

12. The computer-implemented method of claim 5, wherein analyzing the mathematical axioms to determine whether the MVP for an operational aspect of the trading forum is satisfied comprises:
    encoding the type-system based model specification for an untyped, computer-assisted theorem proving system that does not use types; and
    using the untyped, computer-assisted theorem proving system to analyze the mathematical axioms to determine whether the MVP is satisfied.

13. The computer-implemented method of claim 1, wherein analyzing the mathematical axioms comprises analyzing the mathematical axioms to generate a counter-example that shows that a model verification property (MVP) does not hold for an operational aspect of the trading forum.

14. The computer-implemented method of claim 13, wherein the operation aspect of the trading forum relates to trade matching logic of the trading forum.

15. The computer-implemented method of claim 14, wherein the counter-example shows that the trade matching logic of the trading forum is not in compliance with an applicable regulation.

16. The computer-implemented method of claim 1, wherein analyzing the mathematical axioms comprises analyzing the mathematical axioms to determine whether a particular state in an operational state space for trade matching logic of the trading forum can be reached from an initial state of the trading forum.

17. The computer-implemented method of claim 1, wherein analyzing the mathematical axioms comprises analyzing the mathematical axioms to generate a test suite for an operational aspect of the trading forum, wherein the test suite comprises sets of inputs and expected outputs of the trading forum.

18. The computer-implemented method of claim 17, wherein the operation aspect of the trading forum relates to trade matching logic of the trading forum.

19. The computer-implemented method of claim 1, wherein analyzing the mathematical axioms comprises analyzing the mathematical axioms to validate the presence or absence of effects of a certain data input in a specific operation by the trading forum.

20. The computer-implemented method of claim 1, wherein analyzing the mathematical axioms comprises:
   analyzing the mathematical axioms to determine whether a model verification property (MVP) for trade matching logic of the trading forum is satisfied; and
   upon a determination that the MVP is not satisfied, analyzing the mathematical axioms to generate a counter-example that shows that the MVP does not hold for the trade matching logic.

21. The computer-implemented method of claim 20, wherein analyzing the mathematical axioms to determine whether the MVP is satisfied comprises:
   encoding the type-system based model specification for an untyped, computer-assisted theorem proving system that does not use types; and
   using the untyped, computer-assisted theorem proving system to analyzing the mathematical axioms to determine whether the MVP is satisfied.

22. The computer-implemented method of claim 21, wherein analyzing the mathematical axioms to generate a counter-example that shows that the MVP does not hold for the trading forum comprises using a typed theorem proving system.

23. The computer-implemented method of claim 1, wherein the trading forum comprises an exchange selected from the group consisting of a public exchange, a private exchange, a dark pool and a multilateral trading facility.

24. A computer system for assessing operation of a computerized trading forum where financial instruments are traded, the computer system comprising:
   an assessment computer system that comprises:
      at least one processor; and
      at least one memory unit in communication with the at least one processor, wherein the at least one memory unit stores software that when executed by the at least one processor causes the at least one processor to:
         generate code for a model of the trading forum that comprises:
            a model specification for the trading forum that defines operational aspects of the trading forum; and
            a model environment for the trading forum that comprises an axiomatized library of executable source code about one or more characteristics of the trading forum,
            wherein the code for the model comprises a type-system based logical programming language;
         generate mathematical axioms that describe the operation of the trading forum by compiling the code for the model, wherein the mathematical axioms are generated in part based on axiomatic operational semantics of the type-system based logical programming language of the code for the model; and
         assess the operation of the trading forum by analyzing the mathematical axioms that describe the operation of the trading forum.

25. The computer system of claim 24, further comprising a remote computer system that is in communication with the assessment computer system via a computer network, and wherein:
   the assessment computer system receives inputs about the operational aspects of the trading forum from the remote computer system via the computer network; and
   the assessment computer system transmits one or more files to the remote computer system via the computer network, wherein the one or more files comprise an output of the assessment computer system's assessment of the operation of the financial computer system.

26. The computer system of claim 24, wherein the assessment computer system assesses the operation of the trading forum by:
   analyzing the mathematical axioms to determine whether a model verification property (MVP) for trade matching logic of the trading forum is satisfied; and
   upon a determination that the MVP is not satisfied, analyzing the mathematical axioms to generate a counter-example that shows that the MVP does not hold for the trade matching logic.

27. The computer system of claim 26, wherein the assessment computer system determines whether the MVP for an operational aspect of the trading forum is satisfied by:
   encoding the type-system based model specification for an untyped, computer-assisted theorem proving system that does not use types; and
   using the untyped, computer-assisted theorem proving system to analyzing the mathematical axioms to determine whether the MVP is satisfied.

28. The computer system of claim 27, wherein the assessment computer system uses a typed theorem proving system to generate the counter-example showing that the MVP does not hold for the trade matching logic.

29. A computer-implemented method for assessing operation of a computerized trading forum, the method comprising:
   generating, by an assessment computer system, code for a model of the trading forum that comprises:
      a model specification for the trading forum that defines operational aspects of the trading forum; and
      a model environment for the trading forum that comprises an axiomatized library of executable source code about one or more characteristics of the trading forum,
      wherein the code for the model comprises a type-system based logical programming language; and
   simulating, by the assessment computer system, operation of the trading forum based on the trading forum model by performing steps that comprise:
      extracting executable simulator files from the trading forum model code; and
      executing the simulator files to simulate the operation of the trading forum.

30. A computer system for assessing operation of a computerized trading forum, the computer system comprising:

an assessment computer system that comprises:
- at least one processor; and
- at least one memory unit in communication with the at least one processor, wherein the at least one memory unit stores software that when executed by the at least one processor causes the at least one processor to:
  - generate code for a model of the trading forum that comprises:
    - a model specification for the trading forum that defines operational aspects of the trading forum; and
    - a model environment for the trading forum that comprises an axiomatized library of executable source code about one or more characteristics of the trading forum,
    - wherein the code for the model comprises a type-system based logical programming language; and
  - simulate operation of the trading forum based on the trading forum model by performing steps that comprise:
    - extracting executable simulator files from the trading forum model code; and
    - executing the simulator files to simulate the operation of the trading forum.

* * * * *